United States Patent
Lindbo et al.

(10) Patent No.: US 10,947,043 B2
(45) Date of Patent: Mar. 16, 2021

(54) STORAGE CONTAINERS, BINS AND DEVICES

(71) Applicant: OCADO INNOVATION LIMITED, Herts (GB)

(72) Inventors: Lars Sverker Ture Lindbo, Herts (GB); Andrew John Ingram-Tedd, Herts (GB)

(73) Assignee: OCADO INNOVATION LIMITED, Hatfield (GB)

( * ) Notice: Subject to any disclaimer, the term of this patent is extended or adjusted under 35 U.S.C. 154(b) by 104 days.

(21) Appl. No.: 15/773,803

(22) PCT Filed: Nov. 11, 2016

(86) PCT No.: PCT/EP2016/077465
§ 371 (c)(1),
(2) Date: May 4, 2018

(87) PCT Pub. No.: WO2017/081273
PCT Pub. Date: May 18, 2017

(65) Prior Publication Data
US 2018/0319590 A1    Nov. 8, 2018

(30) Foreign Application Priority Data

Nov. 11, 2015  (GB) .................................... 1519929
Nov. 11, 2015  (GB) .................................... 1519930
Nov. 11, 2015  (GB) .................................... 1519931

(51) Int. Cl.
*B65G 1/04*    (2006.01)
*B65G 1/137*   (2006.01)

(52) U.S. Cl.
CPC ......... *B65G 1/0478* (2013.01); *B65G 1/0464* (2013.01); *B65G 1/0492* (2013.01); *B65G 1/1373* (2013.01); *B65G 2201/0235* (2013.01)

(58) Field of Classification Search
CPC ............... B65G 1/0464; B65G 1/1373; B65G 2201/0235; G07F 11/62
(Continued)

(56) References Cited

U.S. PATENT DOCUMENTS 737,963 A  *  9/1903  Reich ............... H01L 21/67781
                                                414/404
2,681,842 A  *  6/1954  Rabkin ................... G07F 11/16
                                                221/125
(Continued)

FOREIGN PATENT DOCUMENTS

CA   2 785 502 A1   2/2014
DE   91 14 894 U1   2/1992
(Continued)

OTHER PUBLICATIONS

International Search Report (PCT/ISA/210) dated Feb. 22, 2017, by the European Patent Office as the International Searching Authority for International Application No. PCT/EP2016/077465.
(Continued)

*Primary Examiner* — James Keenan
(74) *Attorney, Agent, or Firm* — Buchanan Ingersoll & Rooney PC

(57) ABSTRACT

A mechanised container for use in a robotic storage and picking system is described. The container includes a base openable to deposit at least one item from the container in to a further container positioned by a load handling device beneath the first container. Each item can be stored in such mechanised containers in stacks within a robotic storage and picking system.

17 Claims, 40 Drawing Sheets

(58) Field of Classification Search
USPC ......... 220/527, 630; 414/404, 406; 221/123, 221/131
See application file for complete search history.

(56) References Cited

U.S. PATENT DOCUMENTS

| | | | | |
|---|---|---|---|---|
| 2,701,065 | A | | 2/1955 | Bertel |
| 4,017,001 | A | * | 4/1977 | Barthalon ............... B65G 1/08 221/5 |
| 4,870,799 | A | * | 10/1989 | Bergerioux .......... B65G 1/1376 221/123 |
| 4,874,281 | A | * | 10/1989 | Bergerioux .......... B65G 1/1376 414/285 |
| 5,228,591 | A | * | 7/1993 | Jones ..................... B65F 1/125 220/262 |
| 5,478,186 | A | * | 12/1995 | Zuidema ................ B65F 1/004 414/404 |
| 5,482,423 | A | * | 1/1996 | Tawara .................... B65G 1/08 220/529 |
| 5,582,324 | A | * | 12/1996 | Pippin .................. B65G 1/1376 221/131 |
| 5,943,841 | A | * | 8/1999 | Wunscher ............ B65G 1/1376 414/268 |
| 6,654,662 | B1 | | 11/2003 | Hognaland |
| 7,925,376 | B2 | * | 4/2011 | Lewis .................. B65G 1/1376 186/2 |
| 9,796,080 | B2 | * | 10/2017 | Lindbo .................. B65G 1/065 |
| 10,745,164 | B2 | * | 8/2020 | Prahlad ............. B65D 21/0233 |
| 10,759,597 | B2 | * | 9/2020 | Lindbo ................. G07F 11/165 |
| 2004/0089657 | A1 | | 5/2004 | Waszak |
| 2015/0098775 | A1 | | 4/2015 | Razumov |

FOREIGN PATENT DOCUMENTS

| | | |
|---|---|---|
| EP | 0 767 113 A2 | 4/1997 |
| EP | 1 037 828 A1 | 9/2000 |
| FR | 2 759 680 A1 | 8/1998 |
| GB | 2514930 A | 12/2014 |
| GB | 2517264 A | 2/2015 |
| GB | 2518259 A | 3/2015 |
| GB | 2520104 A | 5/2015 |
| GB | 2524383 A | 9/2015 |
| GB | 2528568 A | 1/2016 |
| JP | 2002-265020 A | 9/2002 |
| JP | 2006-102881 A | 4/2006 |
| JP | 2010-23944 A | 2/2010 |
| NO | 317366 B1 | 10/2004 |
| WO | WO 98/49075 A1 | 11/1998 |
| WO | WO 2014/116947 A1 | 7/2014 |

OTHER PUBLICATIONS

Written Opinion (PCT/ISA/237) dated Feb. 22, 2017, by the European Patent Office as the International Searching Authority for International Application No. PCT/EP2016/077465.
GB Combined Search and Examination Report dated May 31, 2016.
Ebbets et al., "Lunch atop a Skyscraper", from Wikipedia, 1932, pp. 1-3.

* cited by examiner

STORAGE CONTAINERS, BINS AND DEVICES

The present invention relates to storage containers, bins and devices. More specifically but not exclusively, it relates to storage containers, bins and devices used in robotic picking systems for picking objects from storage systems having storage bins in stacks, the stacks being located within a grid structure.

The present application claims priority from UK Patent Application Nos. GB1519931.8, GB1519930.0 and GB1519929.2 filed on 11 Nov. 2015, the entire contents of which are hereby incorporated by reference.

Some commercial and industrial activities require systems that enable the storage and retrieval of a large number of different products. One known type of system for the storage and retrieval of items in multiple product lines involves arranging storage bins or containers in stacks on top of one another, the stacks being arranged in rows. The storage bins are removed from the stacks and accessed from above by load handling devices, removing the need for aisles between the rows and allowing more containers to be stored in a given space.

Methods of handling containers stacked in rows have been well known for decades. In some such systems, for example as described in U.S. Pat. No. 2,701,065, to Bertel comprise free-standing stacks of containers arranged in rows in order to reduce the storage volume associated with storing such containers but yet still providing access to a specific container if required. Access to a given container is made possible by providing relatively complicated hoisting mechanisms which can be used to stack and remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B to Cimcorp. '113 discloses a mechanism for removing a plurality of stacked containers, using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack).

In the system described in '113, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler.

EP 1037828 B1 (Autostore) the contents of which are incorporated herein by reference, describes a system in which stacks of containers are arranged within a frame structure. A system of this type is illustrated schematically in FIGS. 1 to 4 of the accompanying drawings. Robotic load handling devices can be controllably moved around the stack on a system of tracks on the upper most surface of the stack.

Other forms of robotic load handling device are further described in, for example, Norwegian patent number 317366, the contents of which are incorporated herein by reference. FIGS. 3(a) and 3(b) are schematic perspective views of a load handling device from the rear and front, respectively, and FIG. 3(c) is a schematic front perspective view of a load handling device lifting a bin.

A further development of load handling device is described in UK Patent Application No. GB1314313.6—Ocado Innovation Limited—where each robotic load handler only covers one grid space, thus allowing higher density of load handlers and thus higher throughput of a given size system. However, any suitable form of load handling device may be used.

In the known robotic picking systems described above, robotic load handling devices are controllably moved around the top of the stacks on a track system forming a grid. A given load handling device lifts a bin from the stack, the container being lifter containing inventory items needed to fulfil a customer order. The container is carried to a pick station where the required inventory item may be manually removed from the bin and placed in a delivery container, the delivery container forming part of the customer order, and being manually filled for dispatch at the appropriate time. At the pick station, the items may also be picked by industrial robots, suitable for such work, for example as described in UK Patent Application No GB1502123.1—Ocado Innovation Limited.

It will be appreciated that this picking of inventory items from storage bins in to delivery containers can cause delays at pick stations, causing congestion at the pick stations and delays in the assembly of customer orders. In addition, the pick stations themselves represent a significant investment, whether design for manual or robotic picking.

According to the invention there is provided a container for storing at least one item within in a storage system, the storage system comprising: a first set of parallel rails or tracks and a second set of parallel rails or tracks extending substantially perpendicularly to the first set in a substantially horizontal plane to form a grid pattern comprising a plurality of grid spaces; a set of uprights, the uprights supporting the tracks, the uprights and tracks together defining a framework; and a plurality of said containers being located beneath the tracks and within the framework, a portion of said containers occupying a space below a grid space; characterised in that the container comprises means for transferring the or each item from the container to at least one second container.

In this way, parts of customer orders, or some or all customer orders may be picked robotically directly on the grid. This reduces the amount of manual intervention required in the system which improves efficiency and reduces costs.

In this way, the present invention overcomes the problems of the prior art and provides a system and method of increasing the speed at which customer orders are compiled and reduce the overall cost and improve the efficiency of large bin handling storage and picking systems.

The invention will now be described with reference to the accompanying diagrammatic drawings in which.

Figure 1:
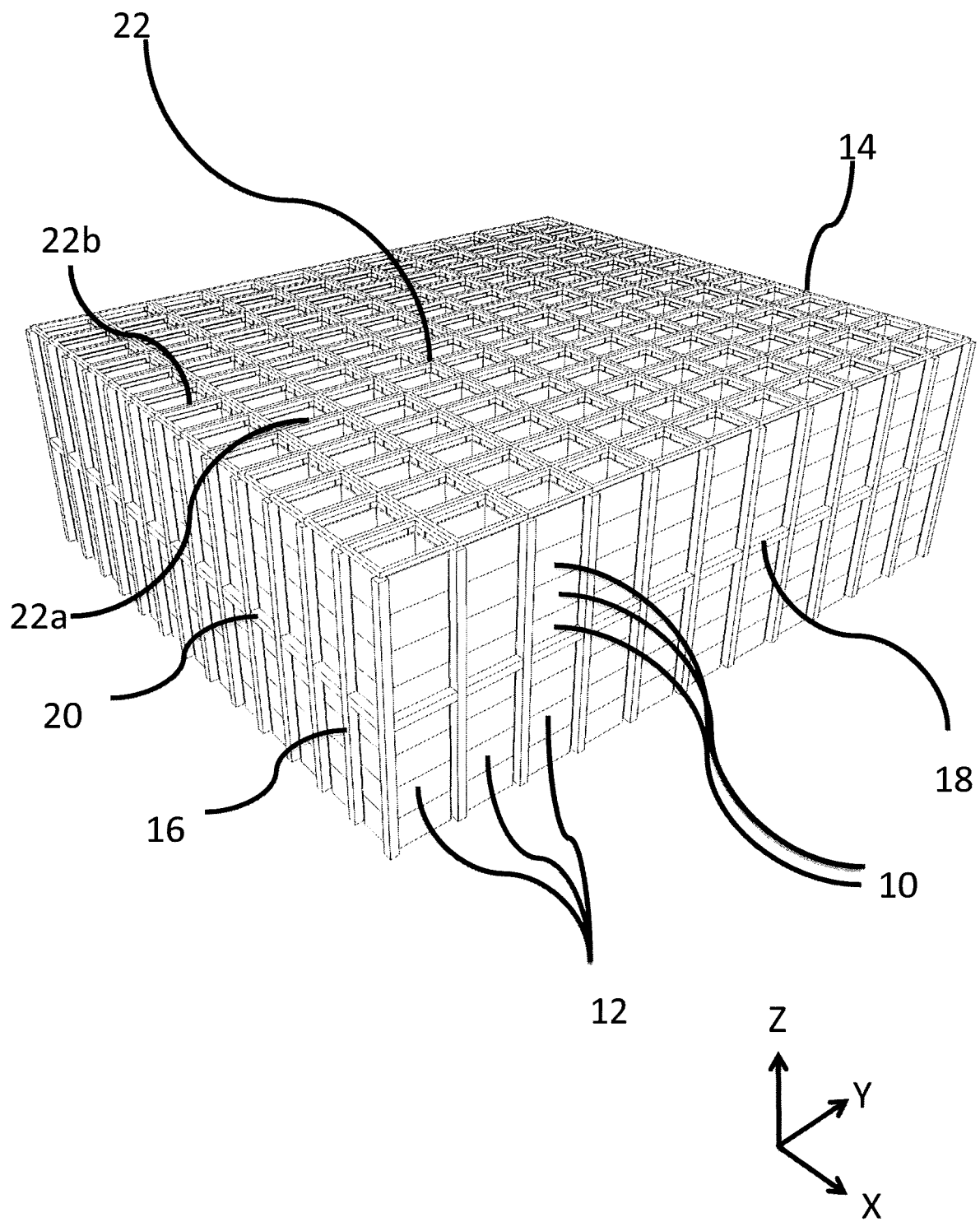
FIG. 1 is a schematic, perspective view of a frame structure for housing a plurality of stacks of bins in a storage system.
Figure 2:
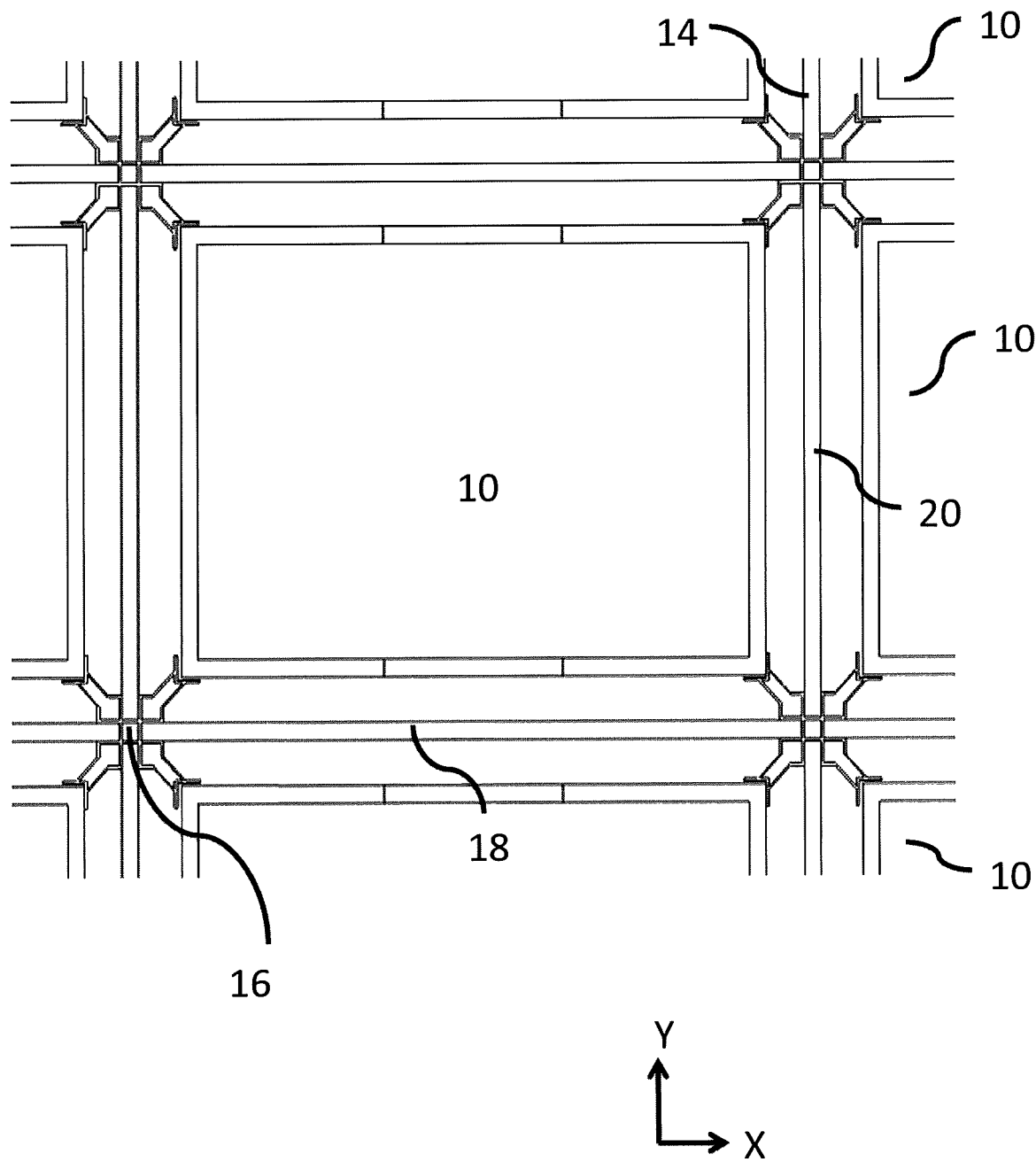
FIG. 2 is a schematic, plan view of part of the frame structure of FIG. 1.
Figure 3A:
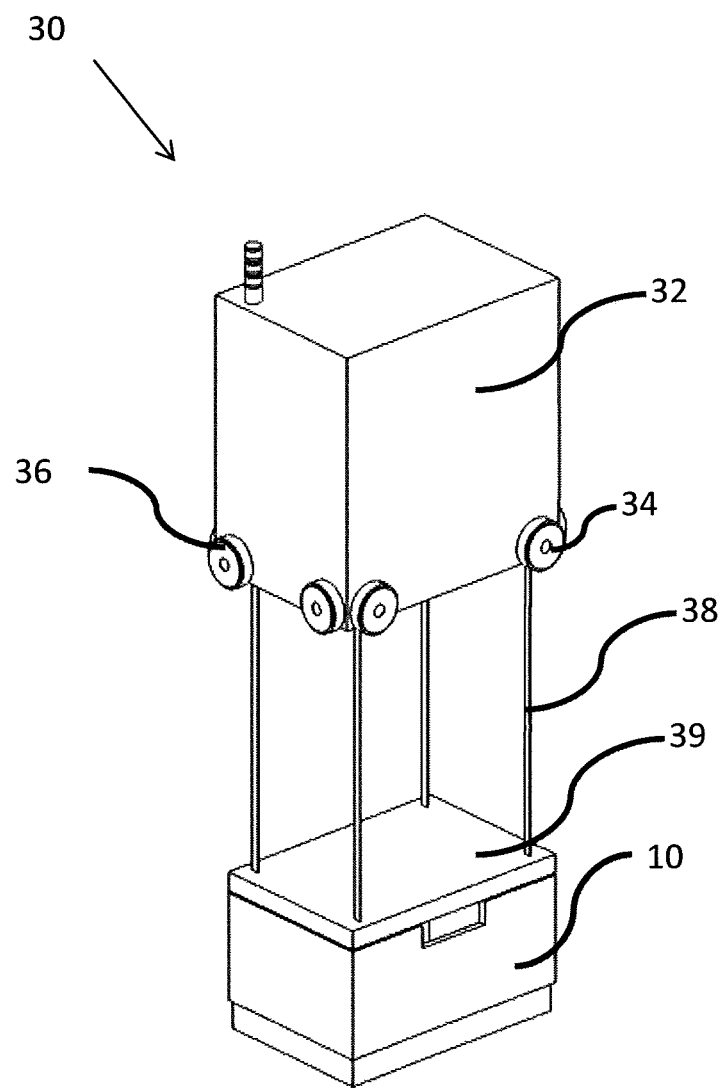
Figures 3B, 3C:
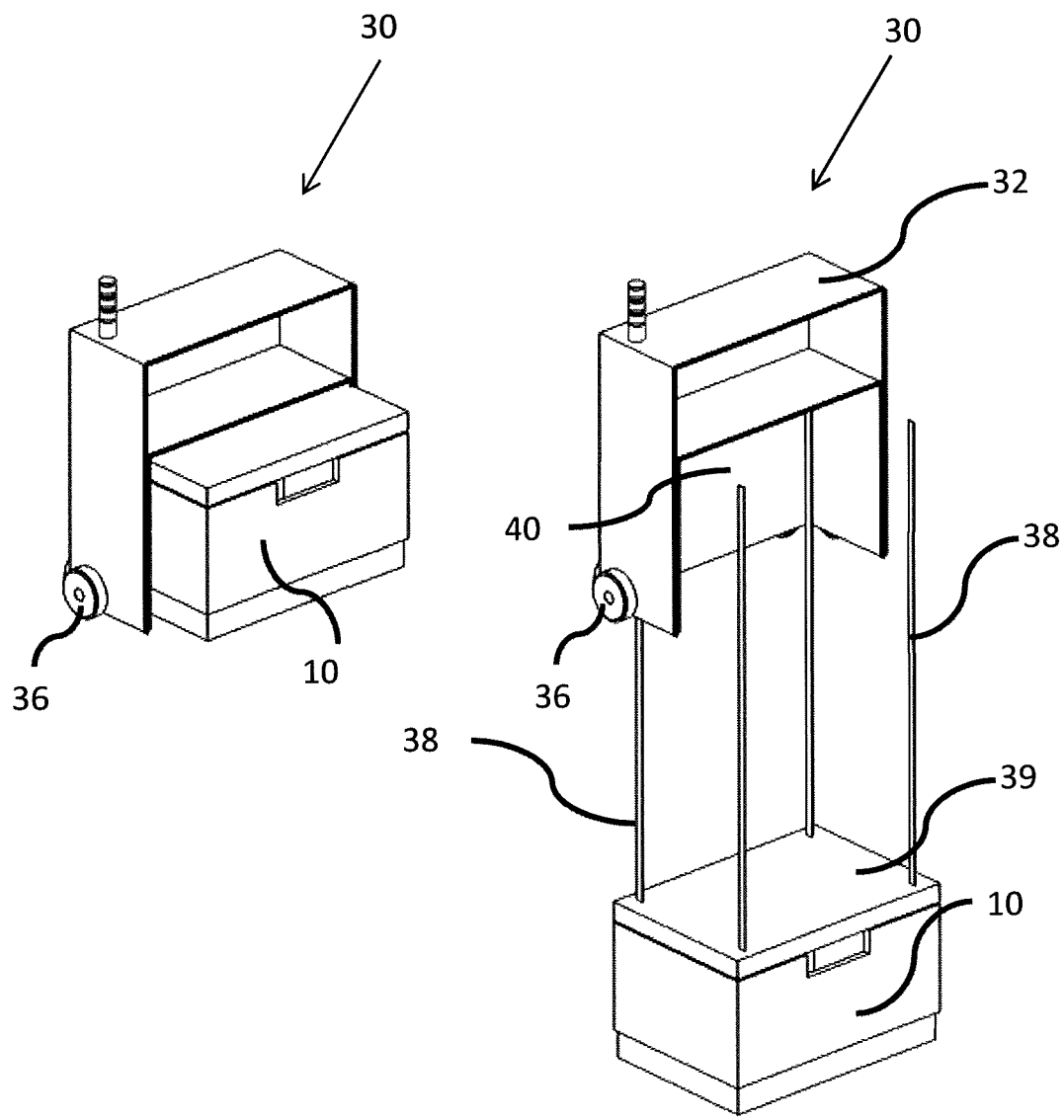
Figure 4:
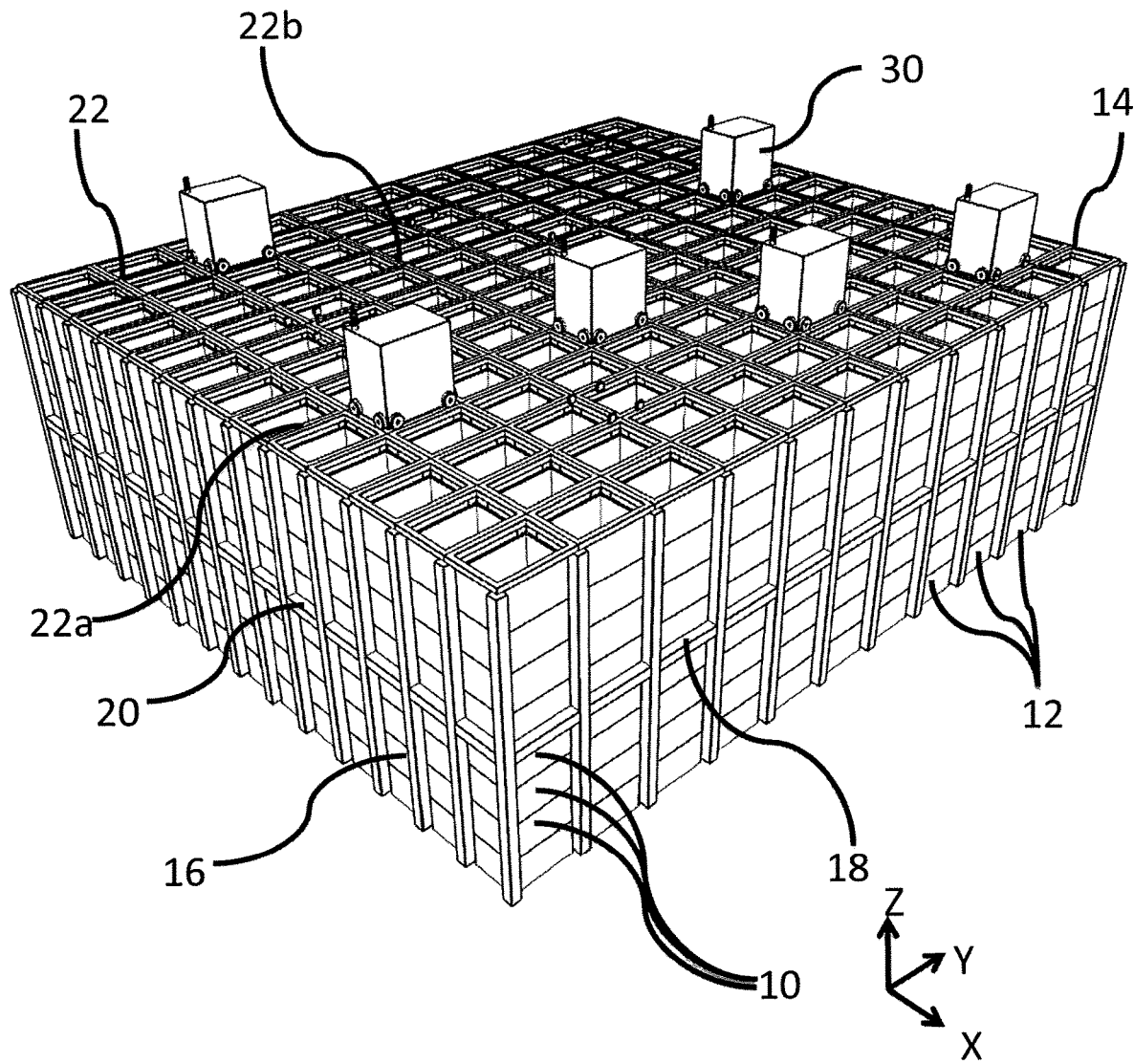

FIGS. 3(a) and 3(b) are schematic, perspective views, from the rear and front respectively, of one form of robotic load handling device for use with the frame structure of FIGS. 1 and 2, and FIG. 3(*c*) is a schematic perspective view of the known load handler device in use lifting a bin;

FIG. 4 is a schematic, perspective view of a known storage system comprising a plurality of load handler devices of the type shown in FIGS. 3(*a*), 3(*b*) and 3(*c*), installed on the frame structure of FIGS. 1 and 2, together with a robotic load handling device in accordance with one form of the invention.

Figure 5:
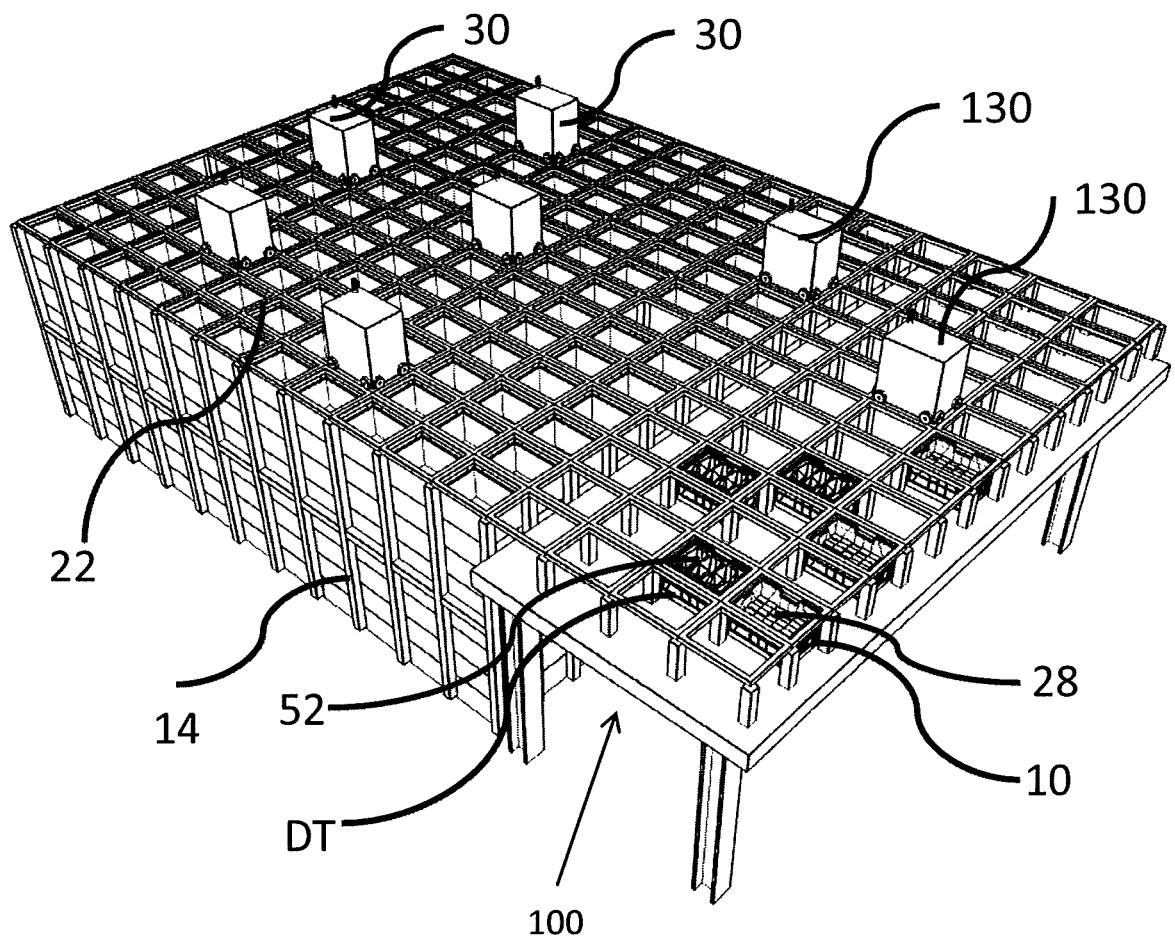
Figure 6A:
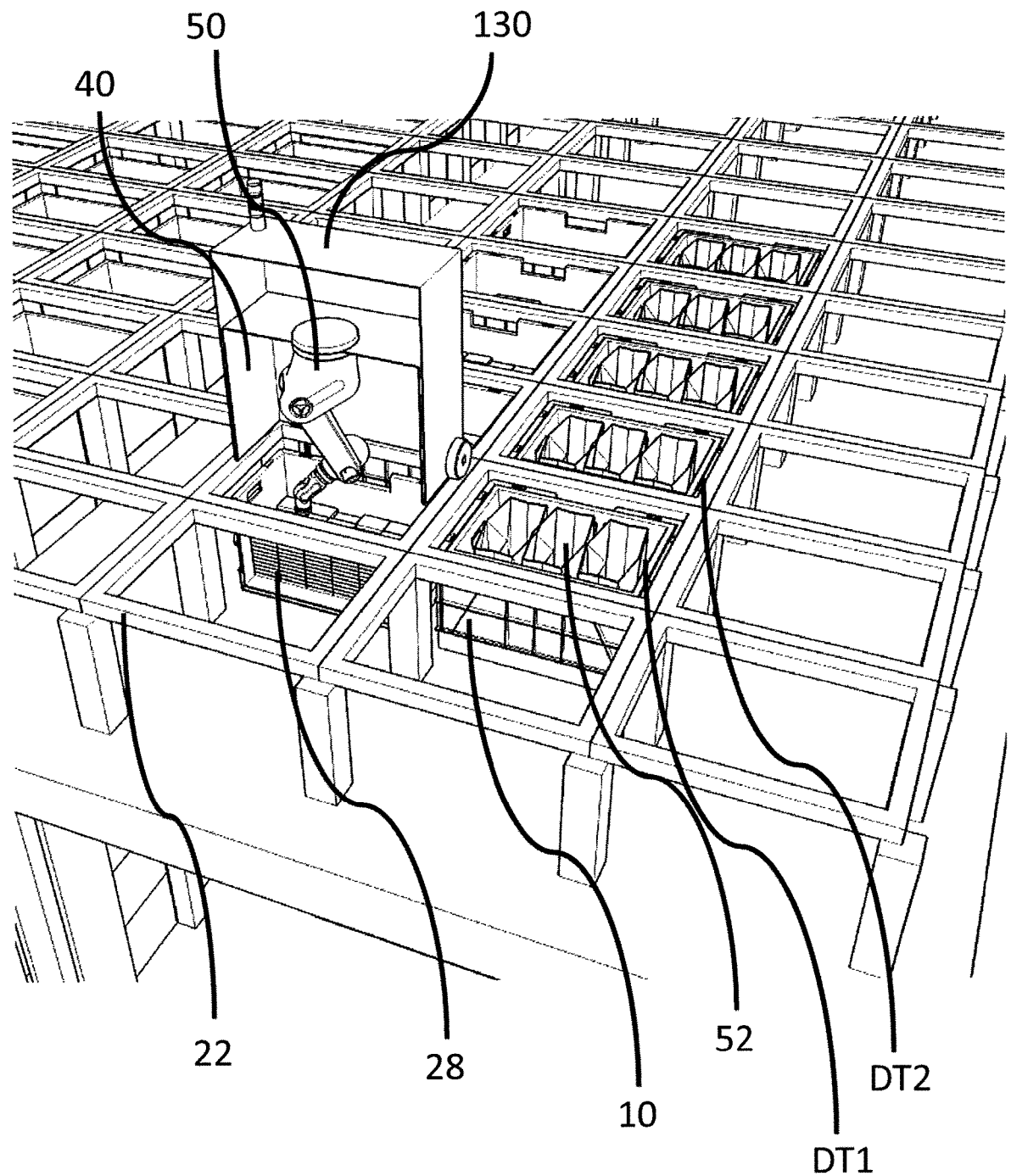
Figure 6B:
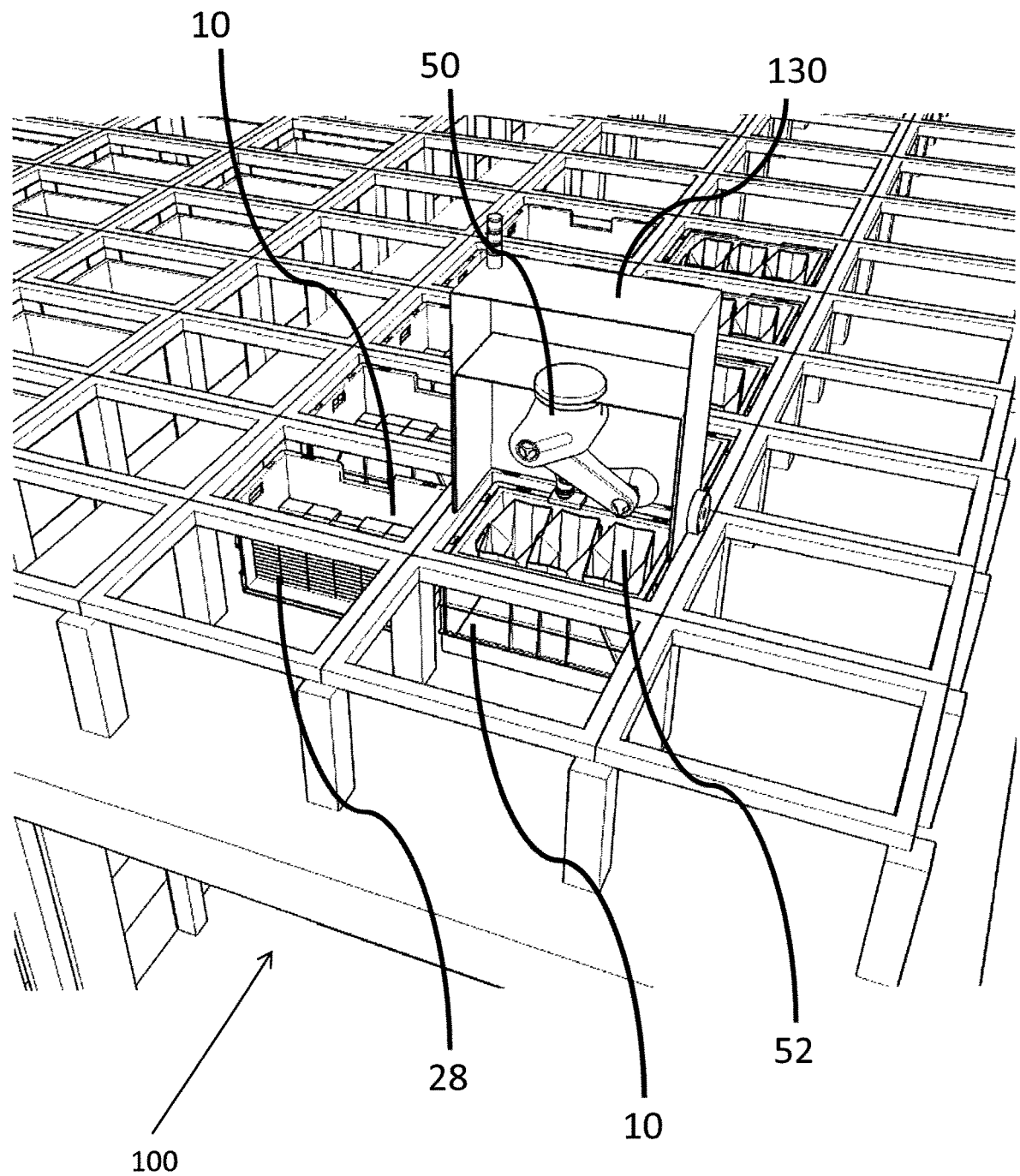
Figure 7:
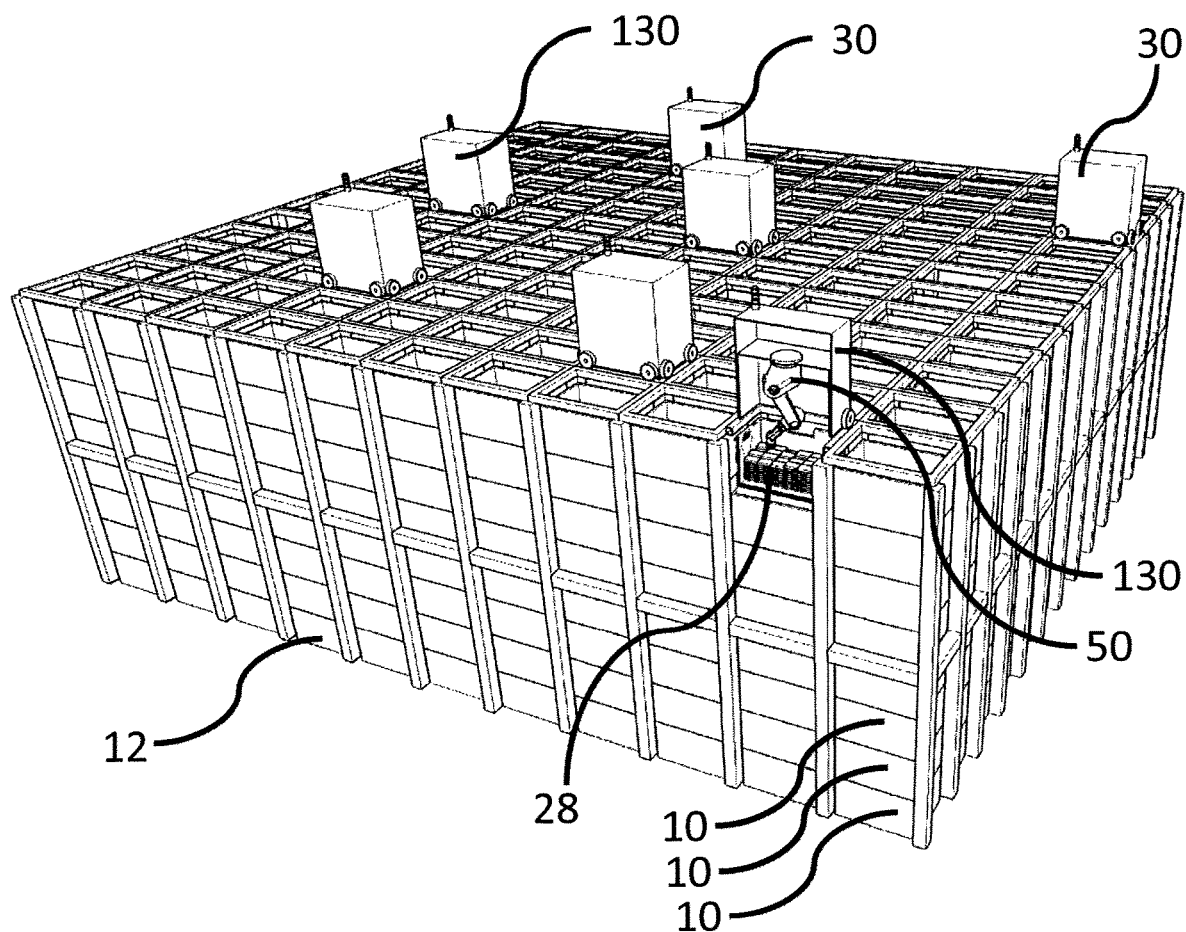
Figure 8A:
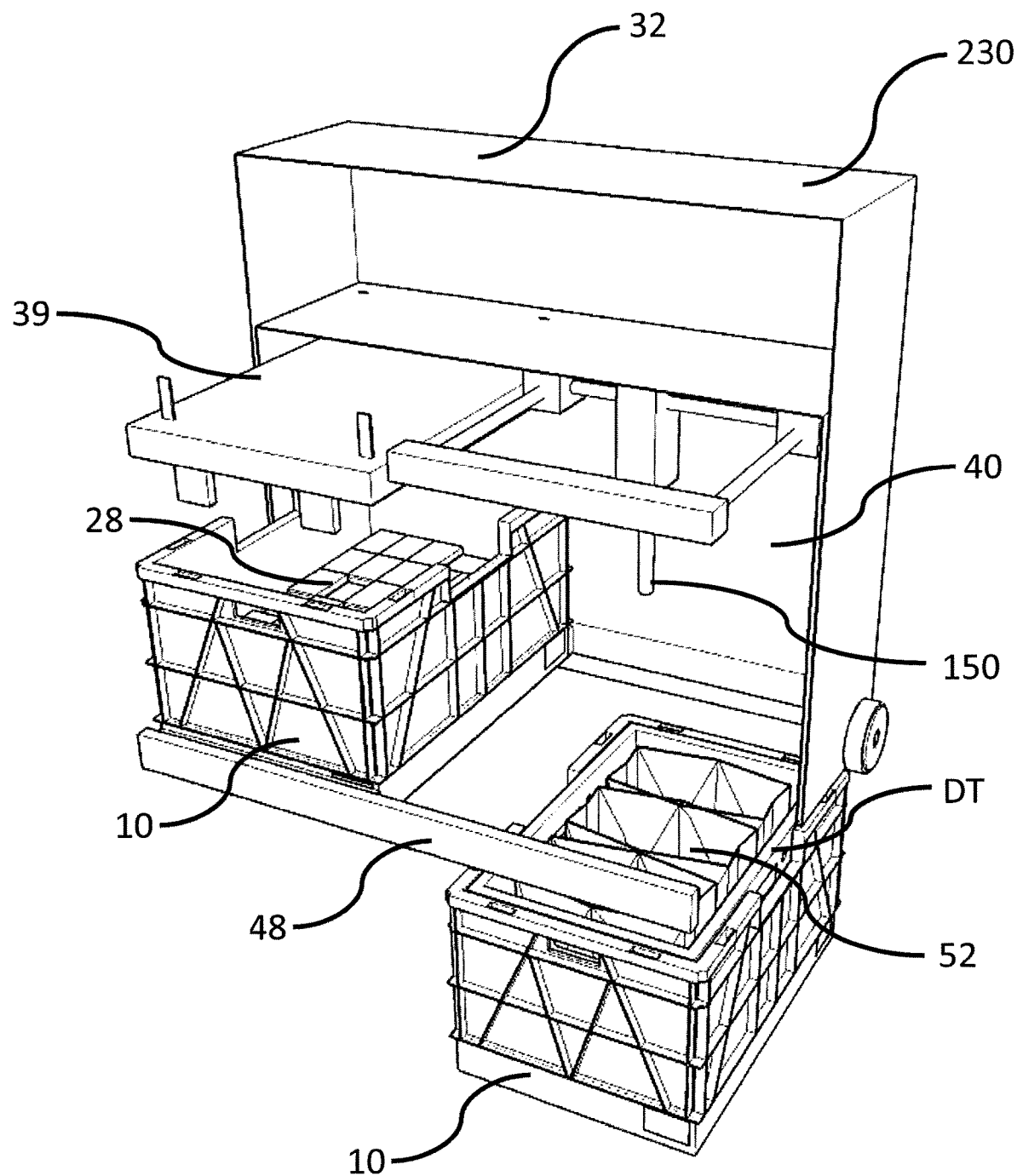
Figure 8B:
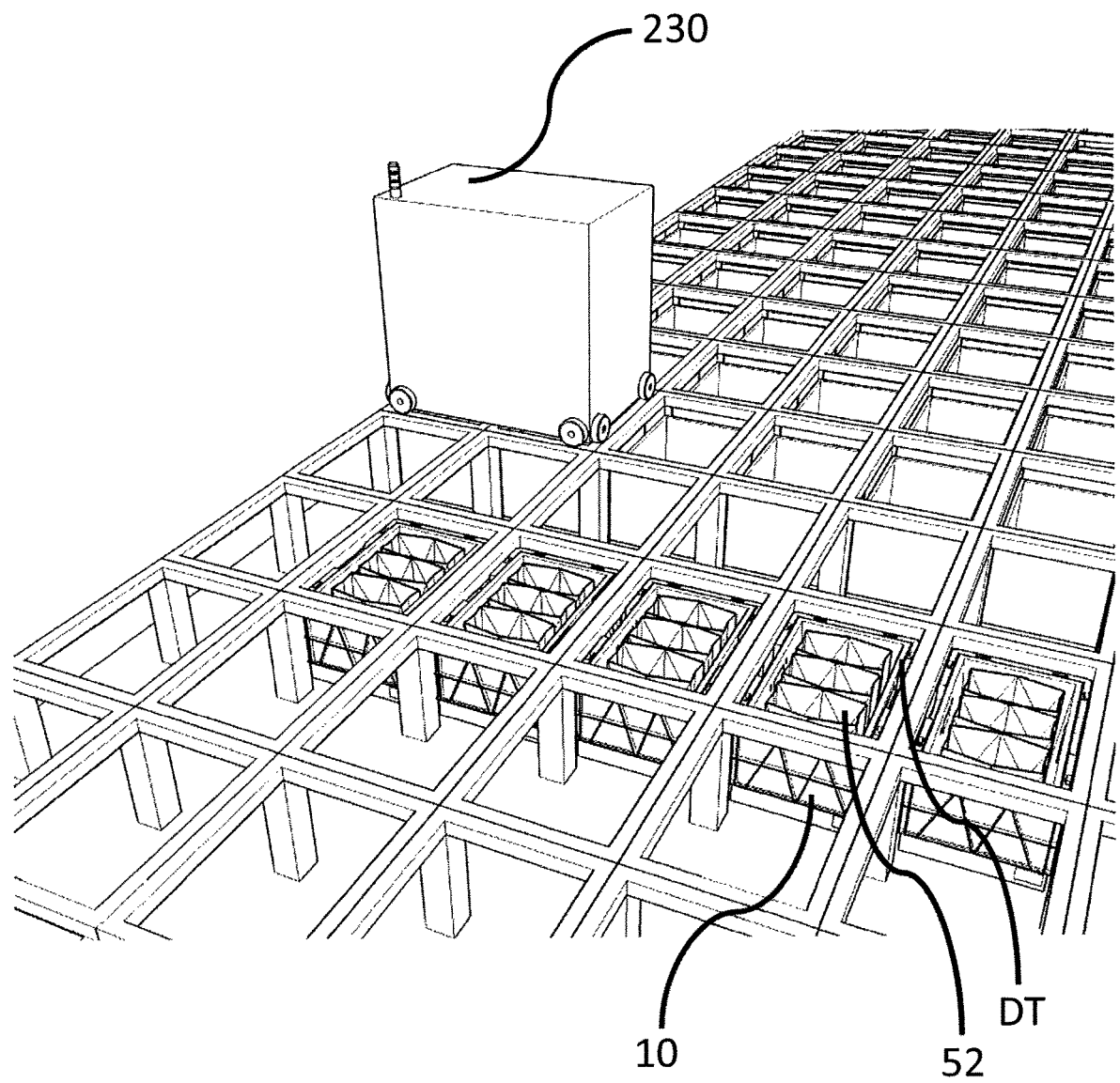
Figure 8C:
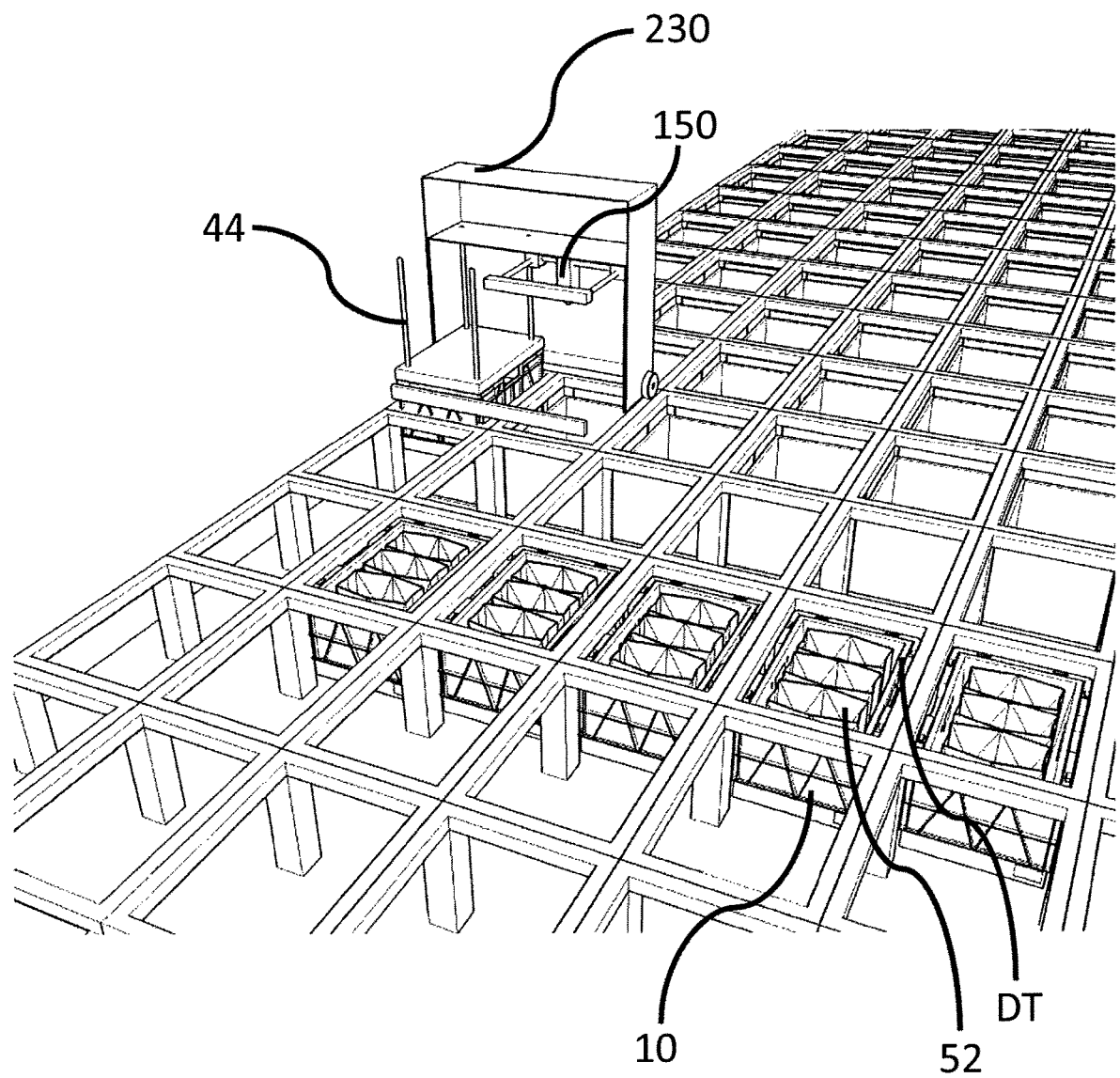
Figure 8D:
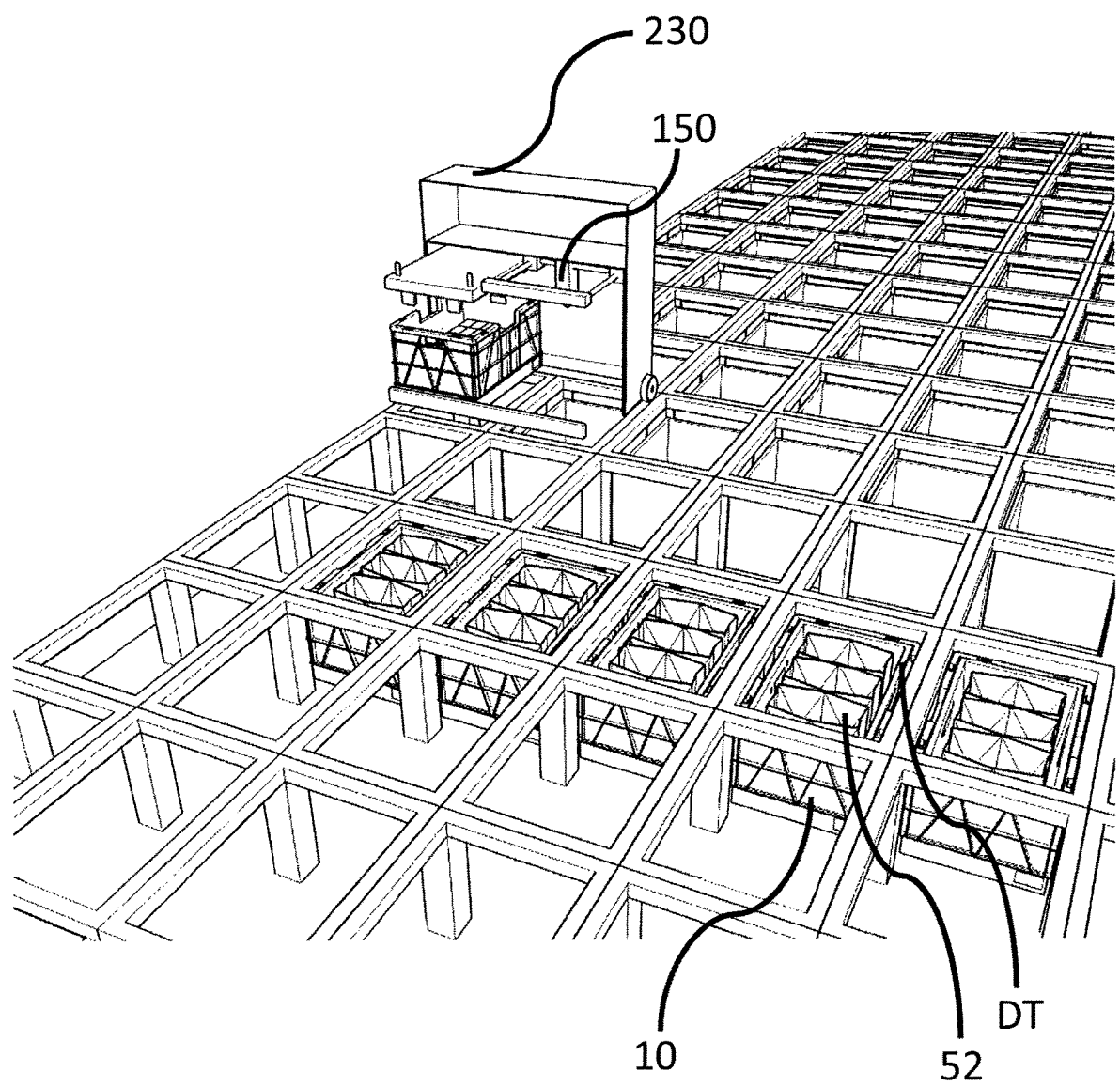
Figure 8E:
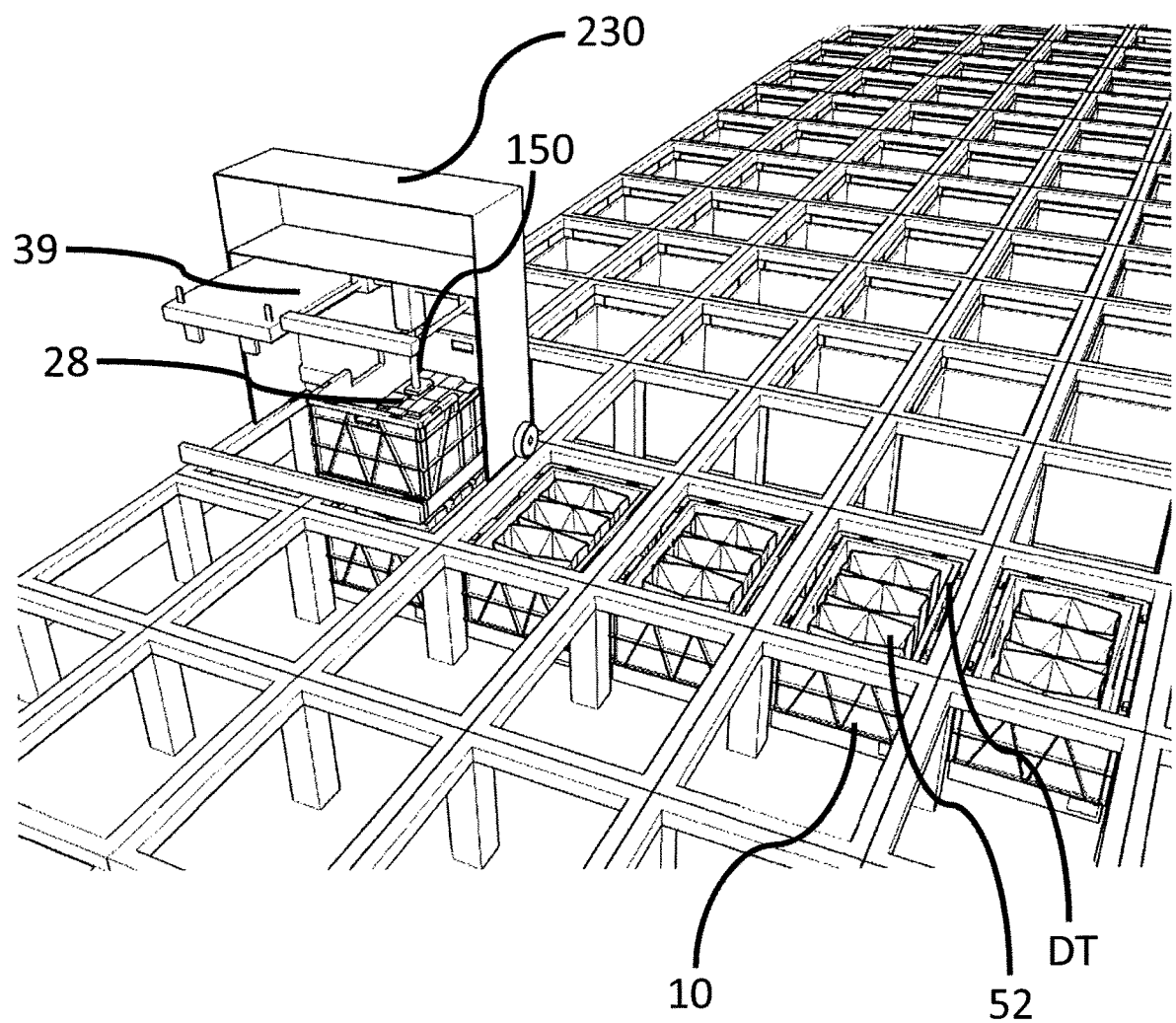
Figure 8F:
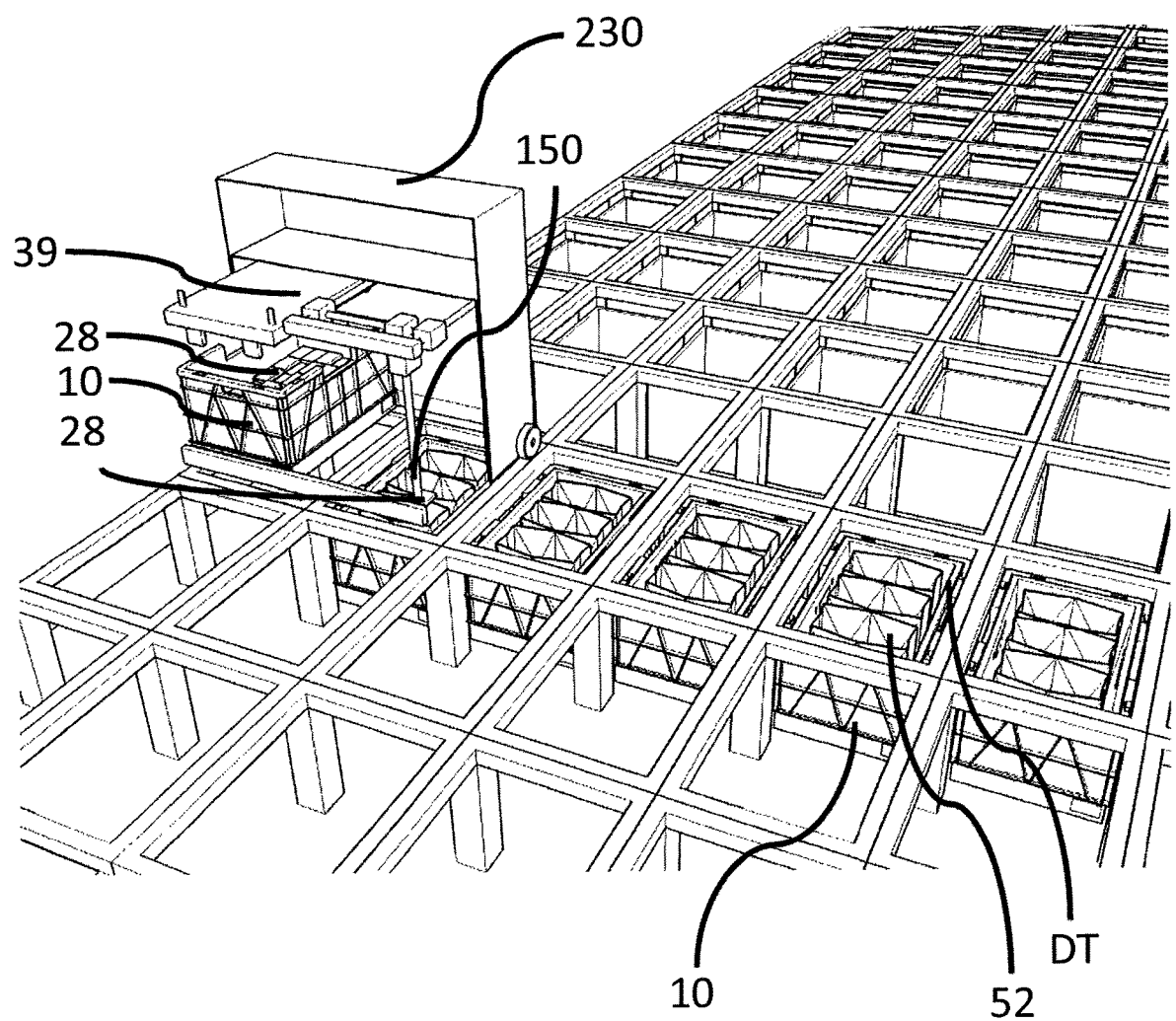
Figure 8G:
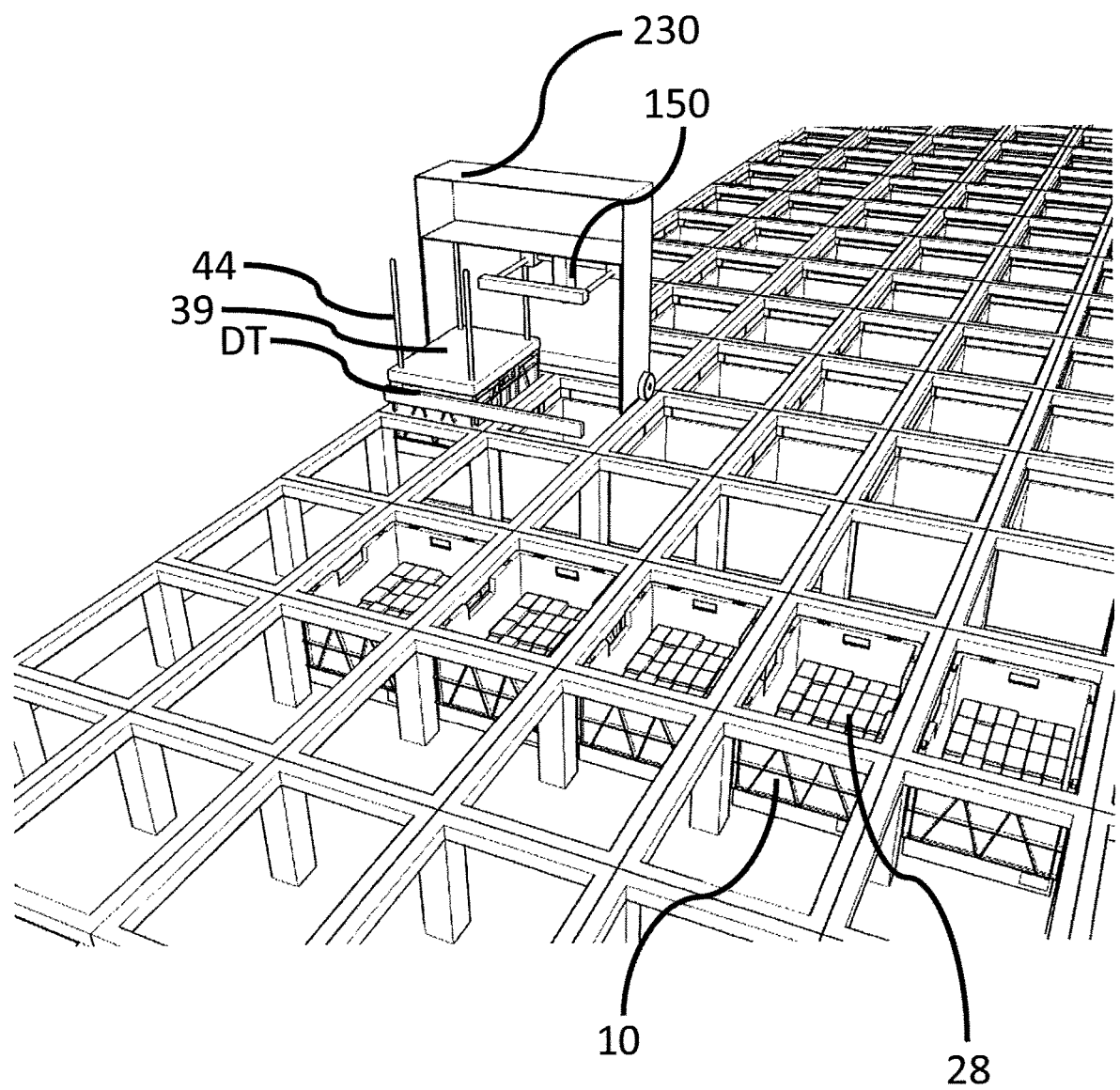
Figure 8H:
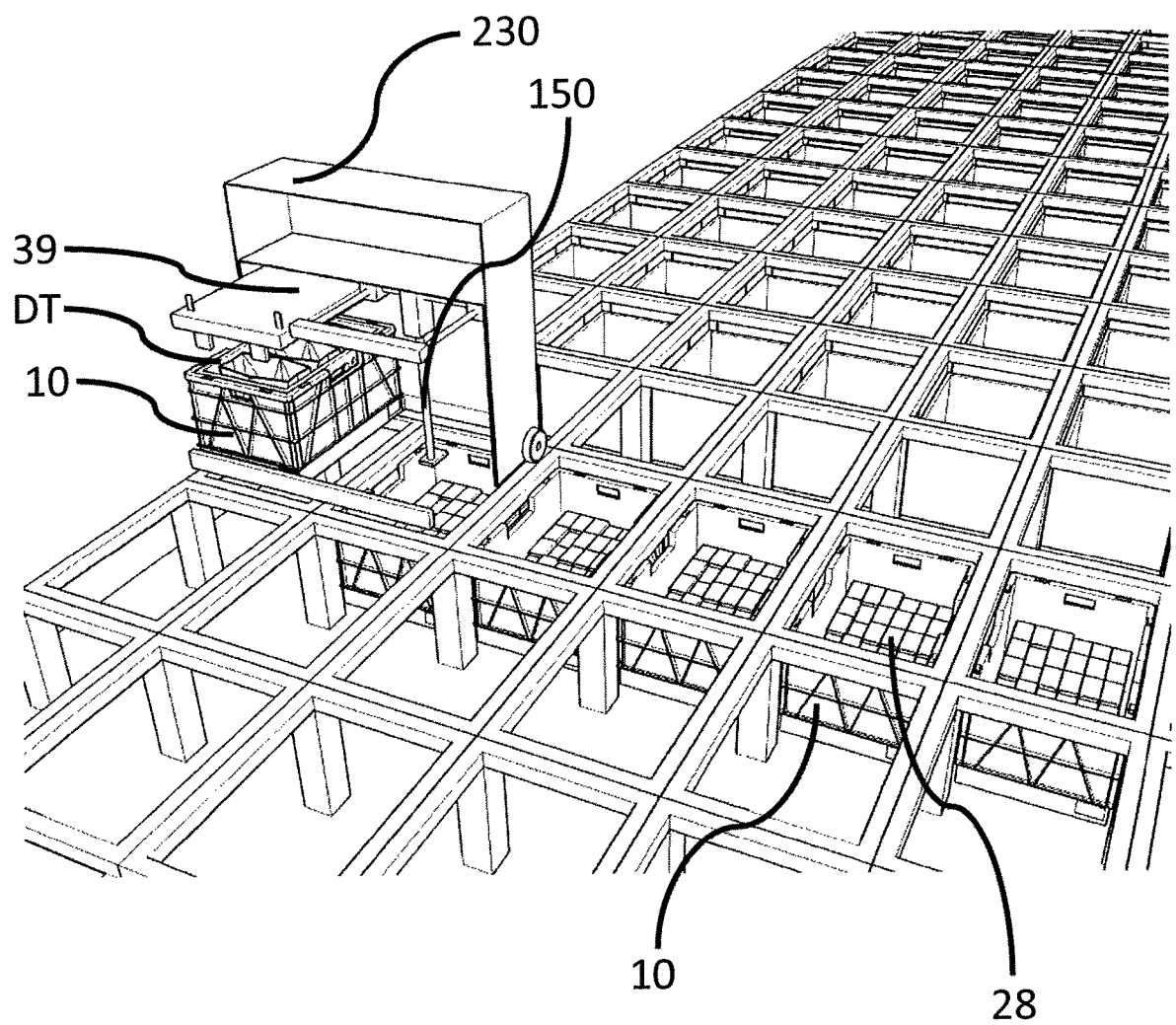
Figure 8I:
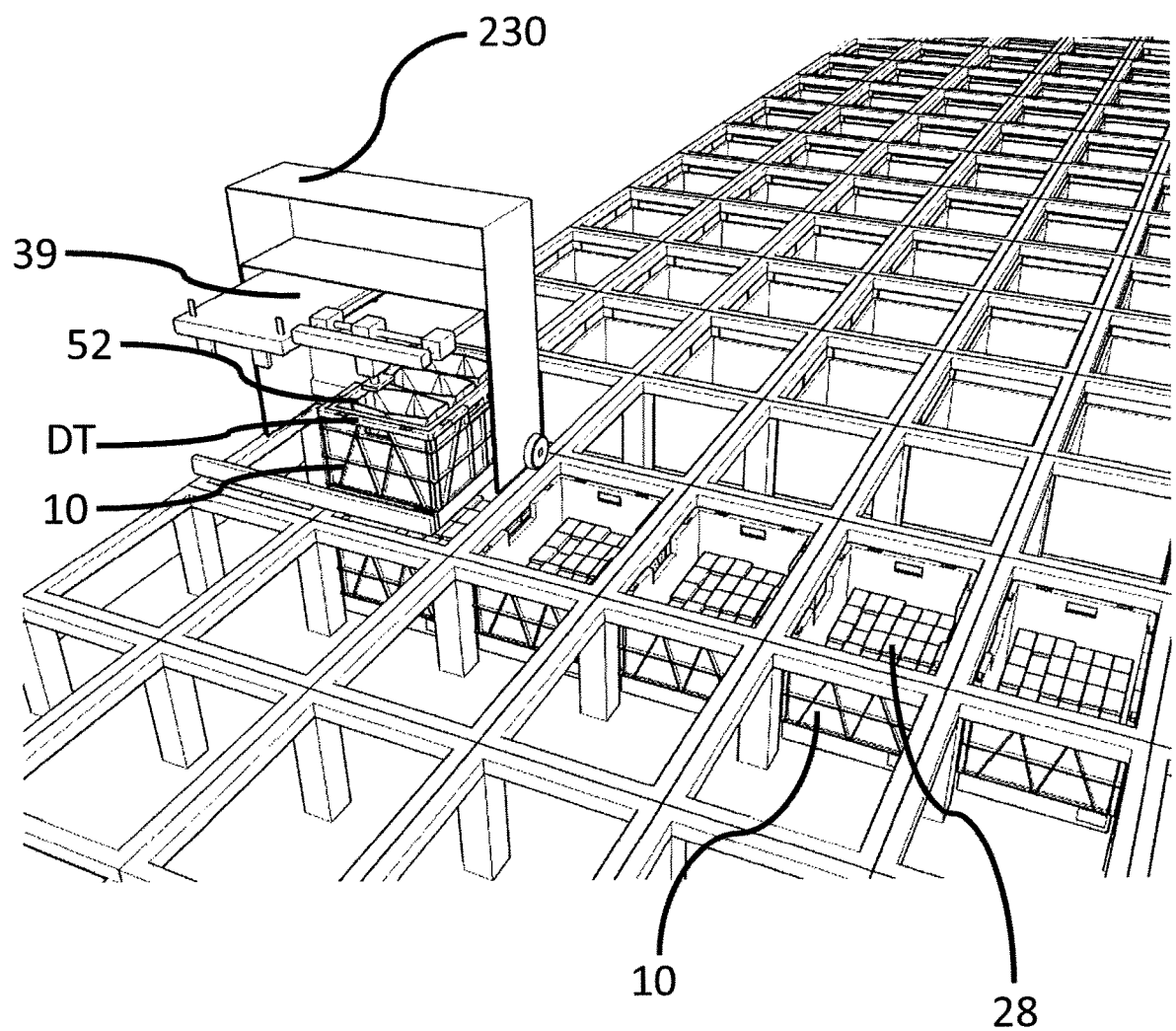
Figure 10A:
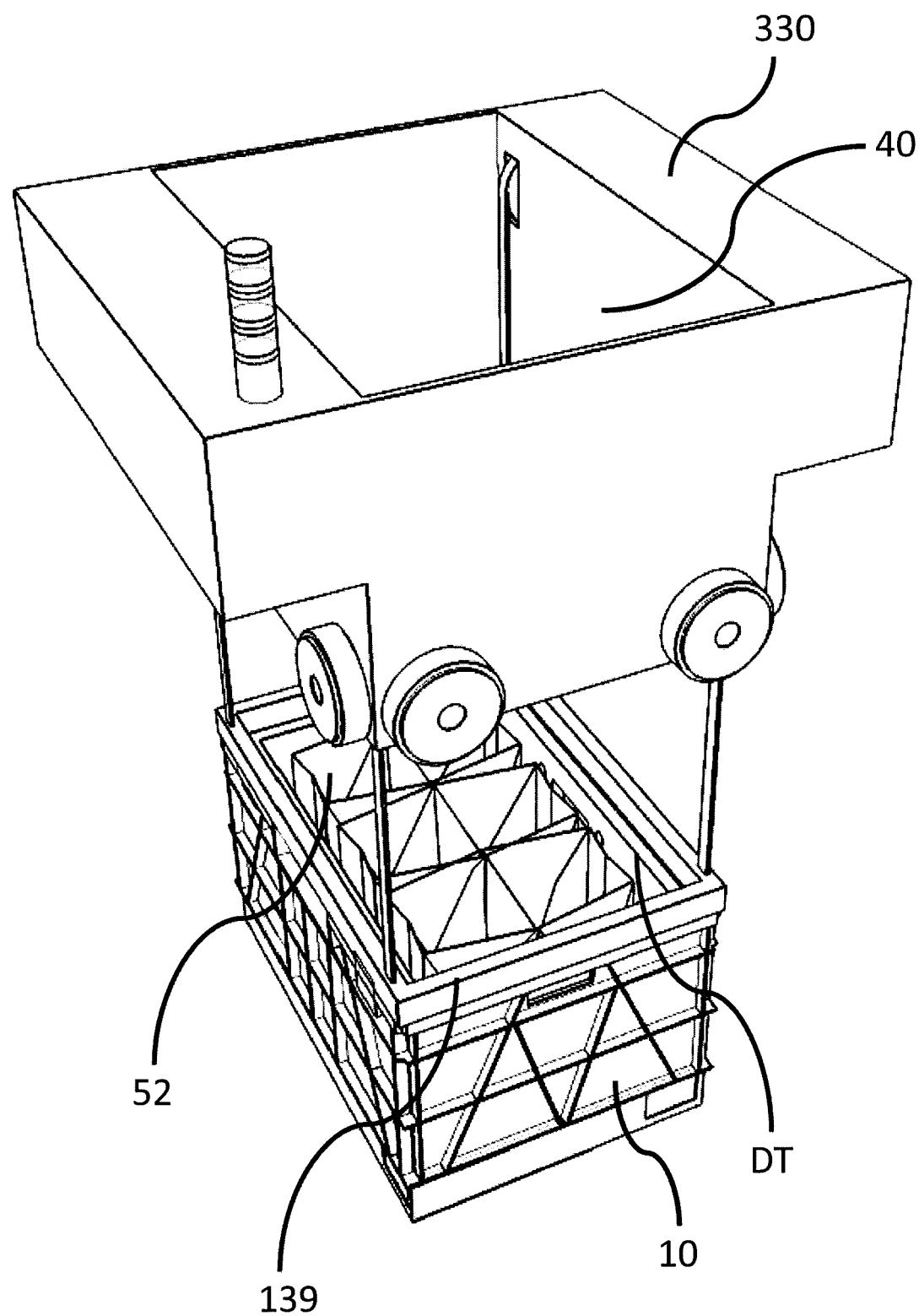
Figure 10B:
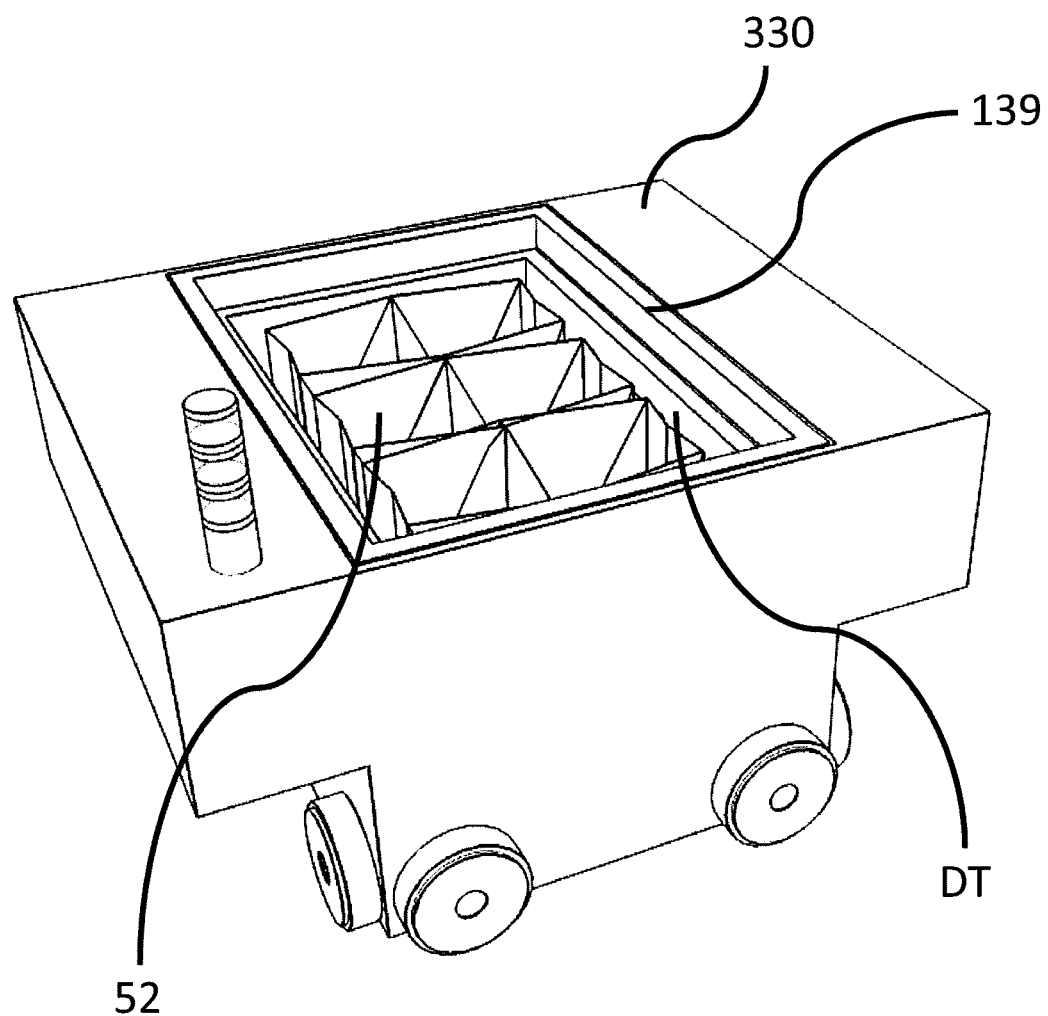
Figure 10C:
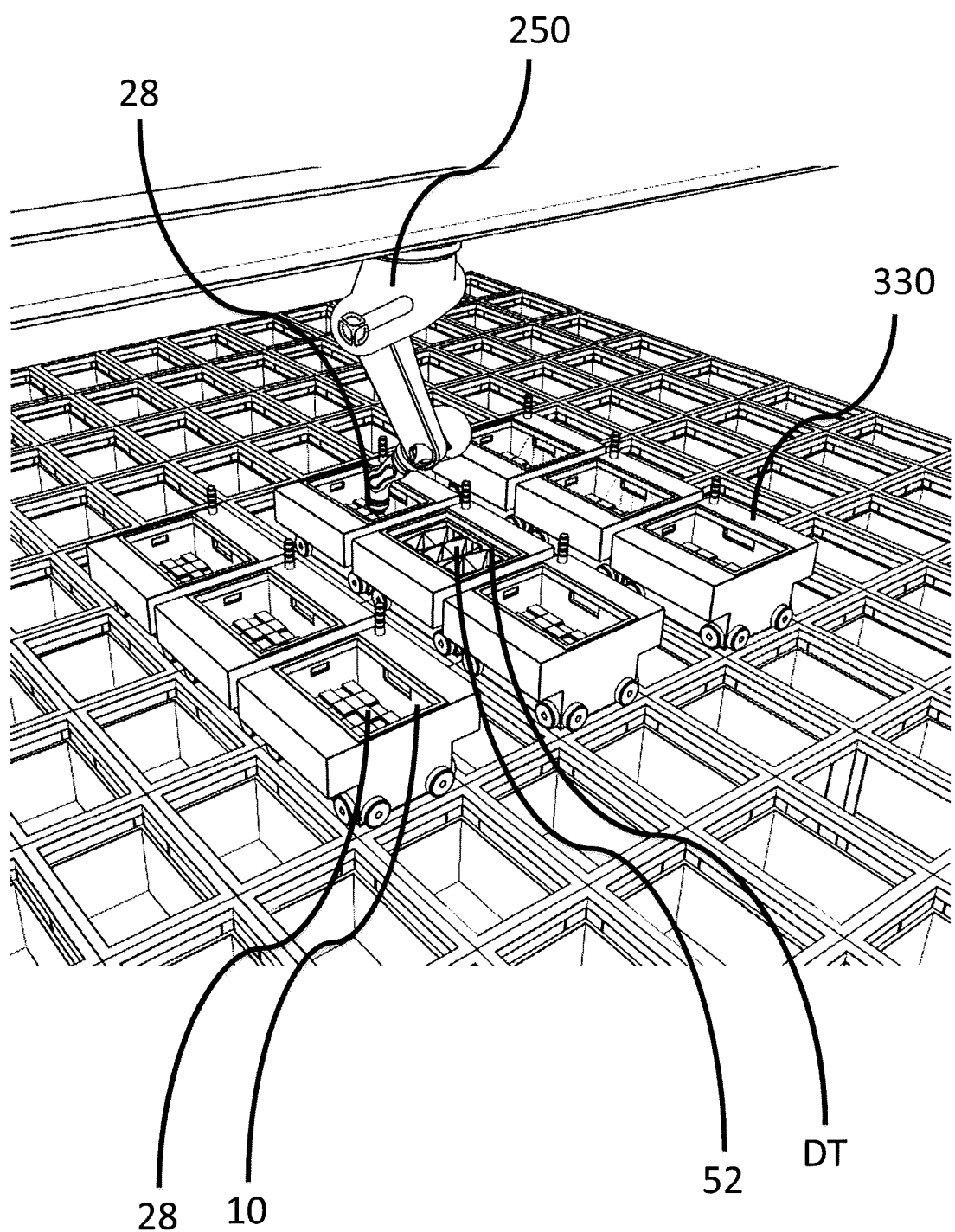
Figure 10D:
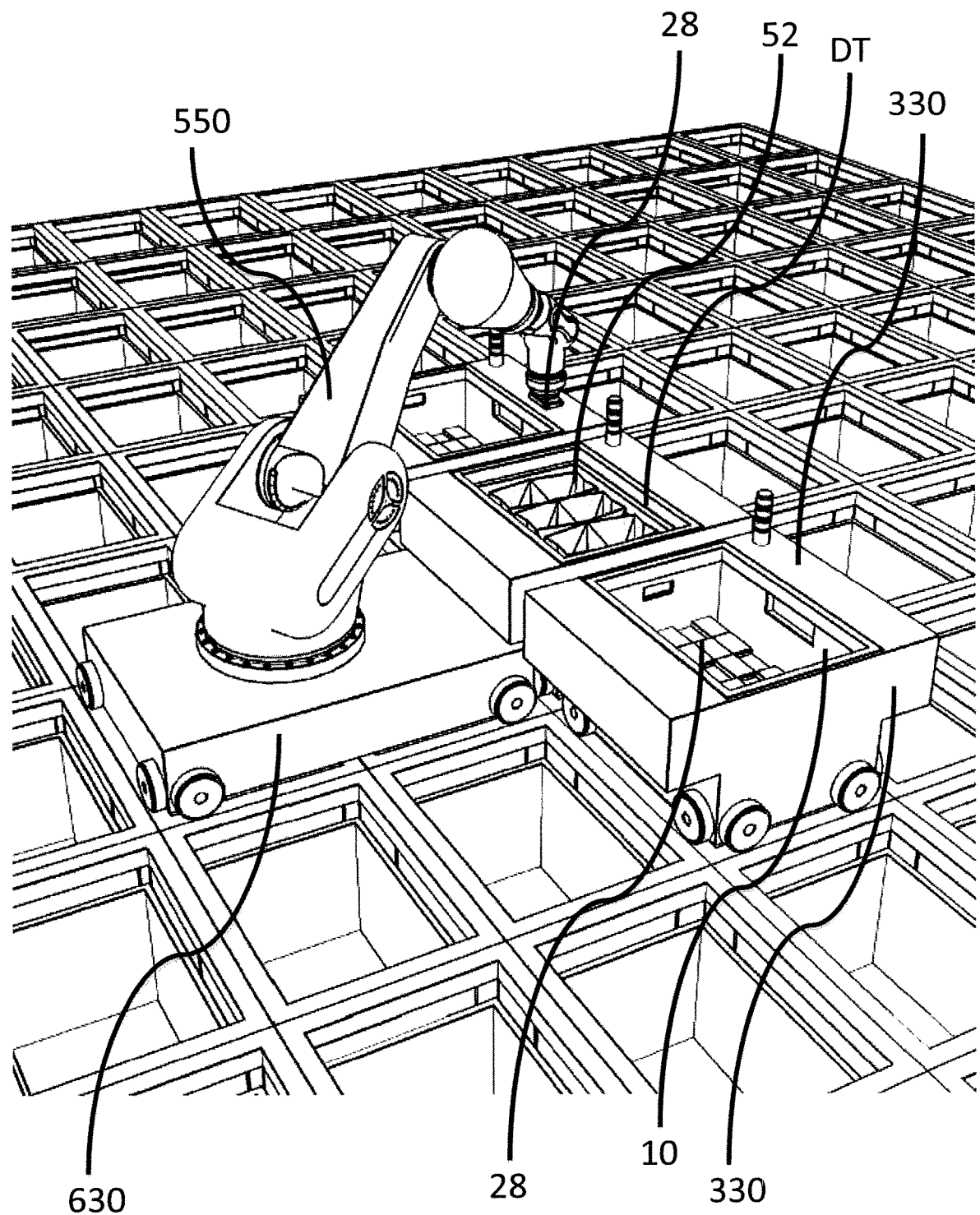
Figure 11A:
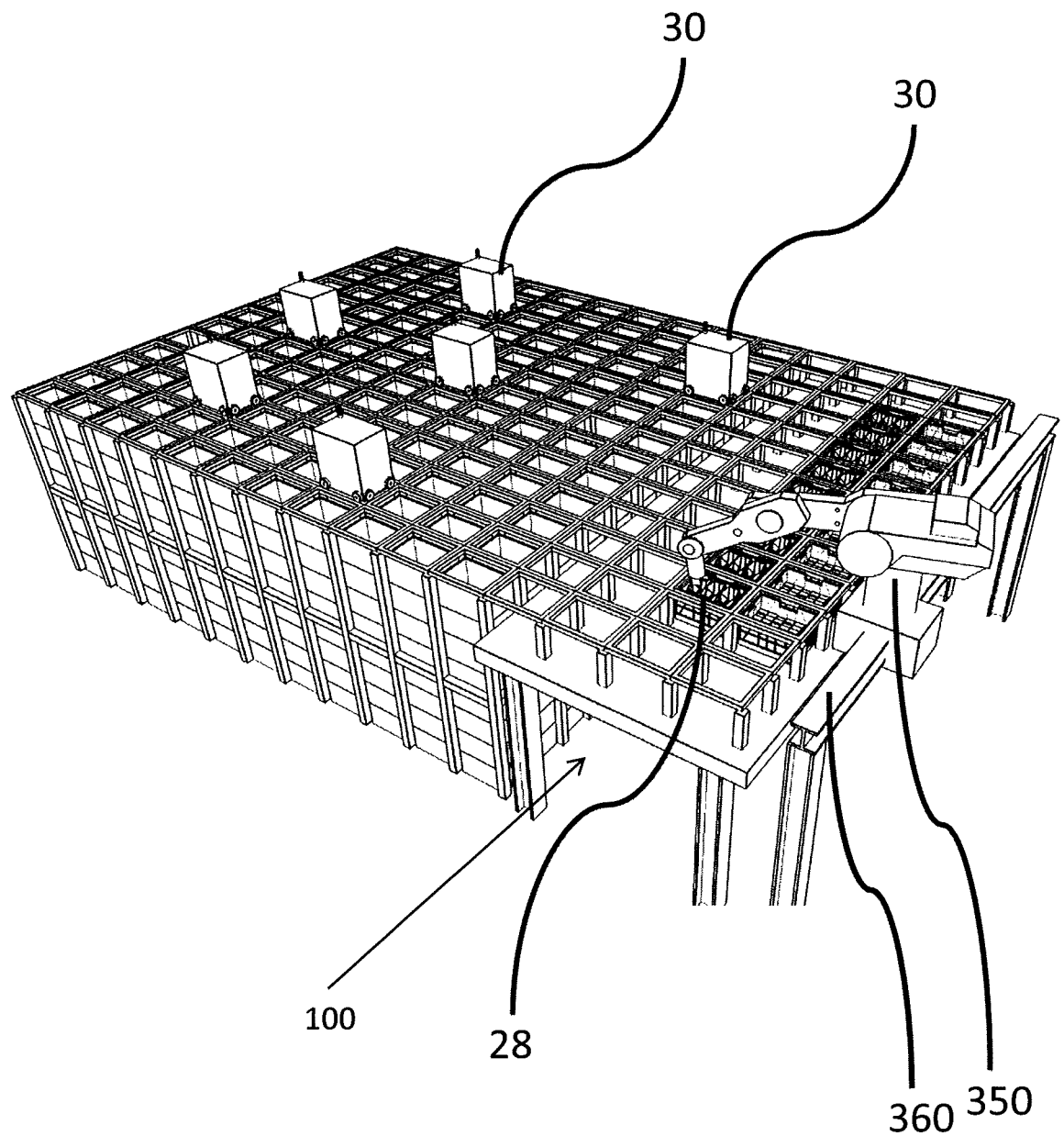
Figure 11B:
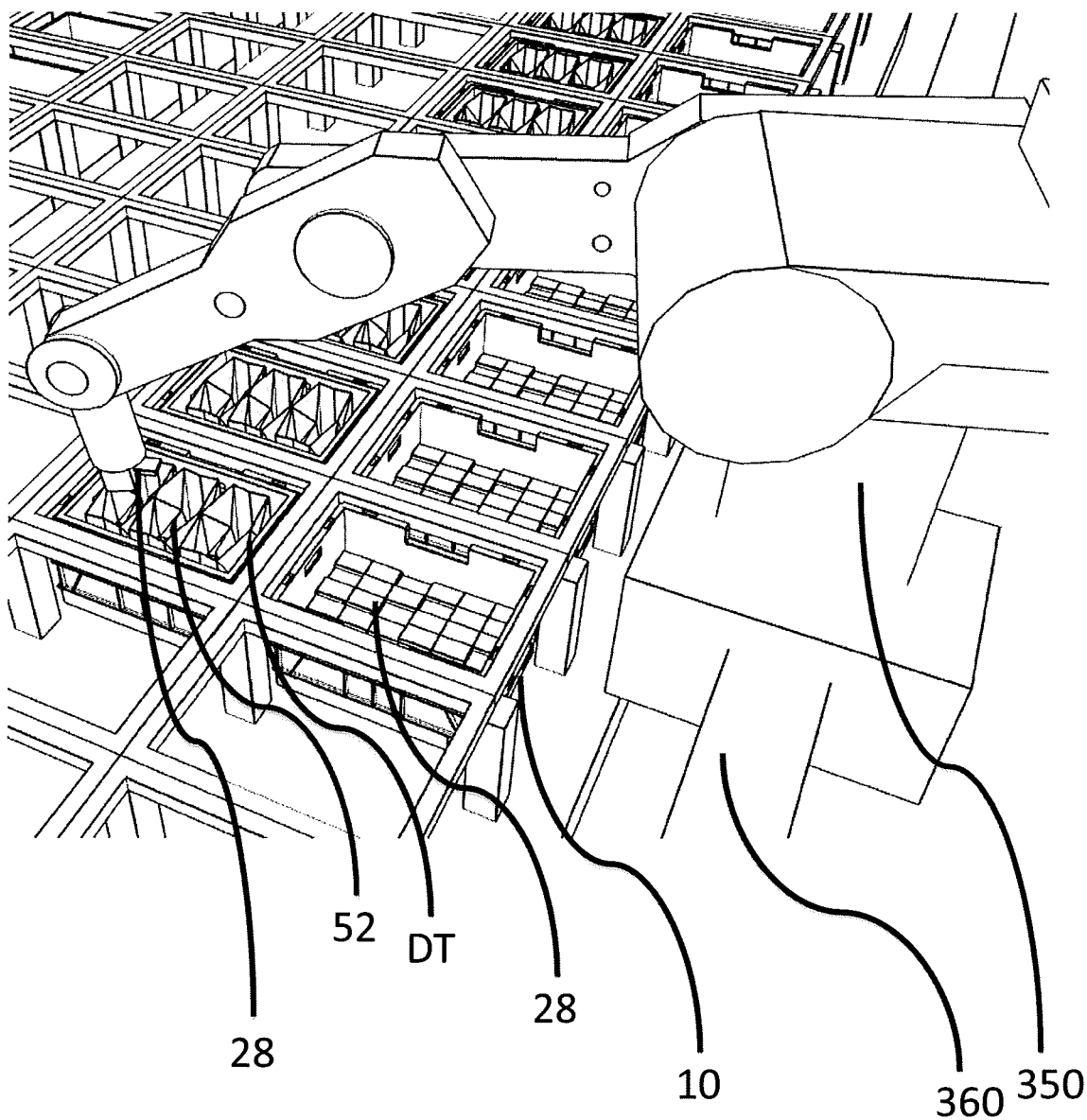
Figure 12A:
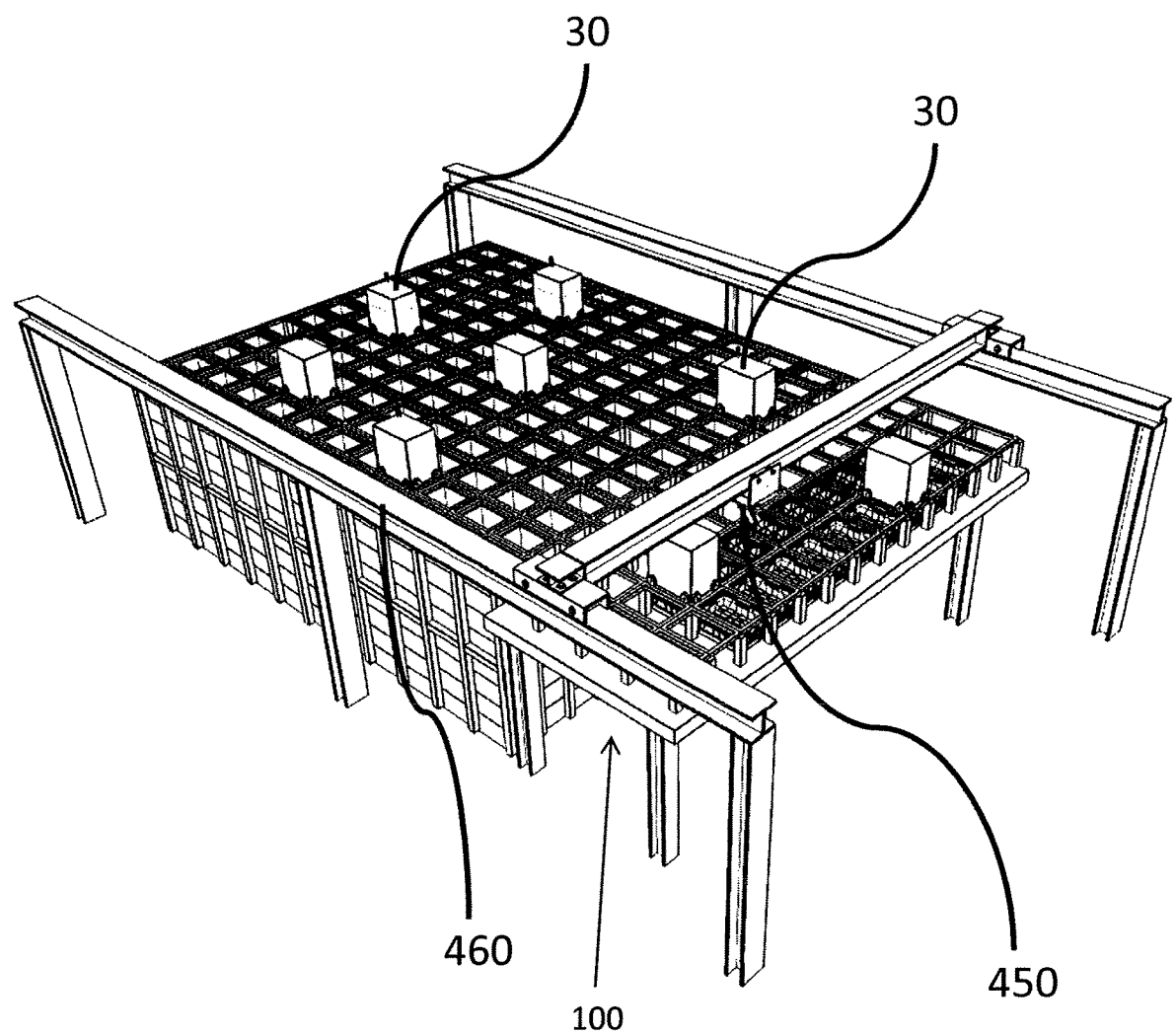
Figure 12B:
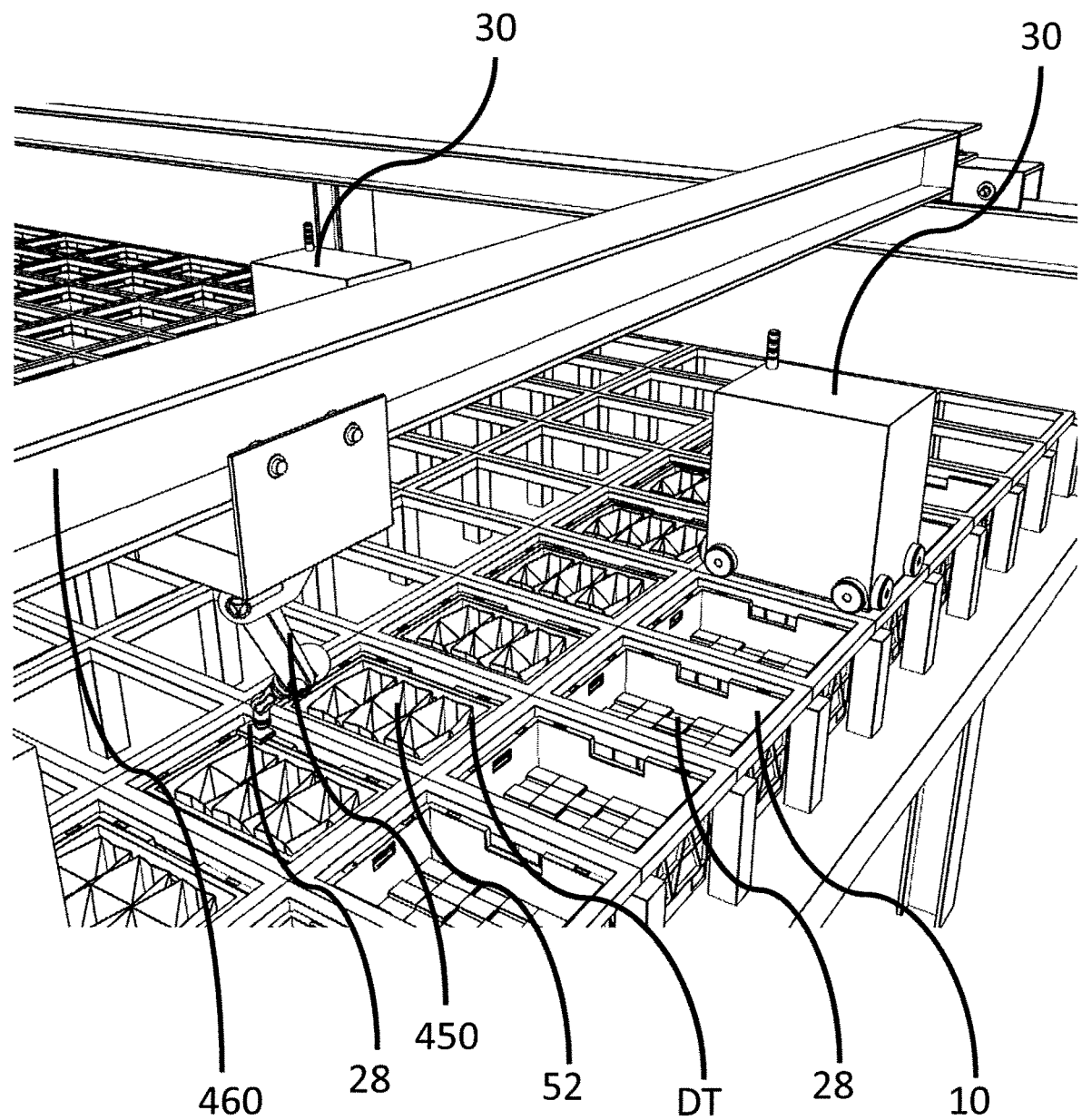
Figure 13A:
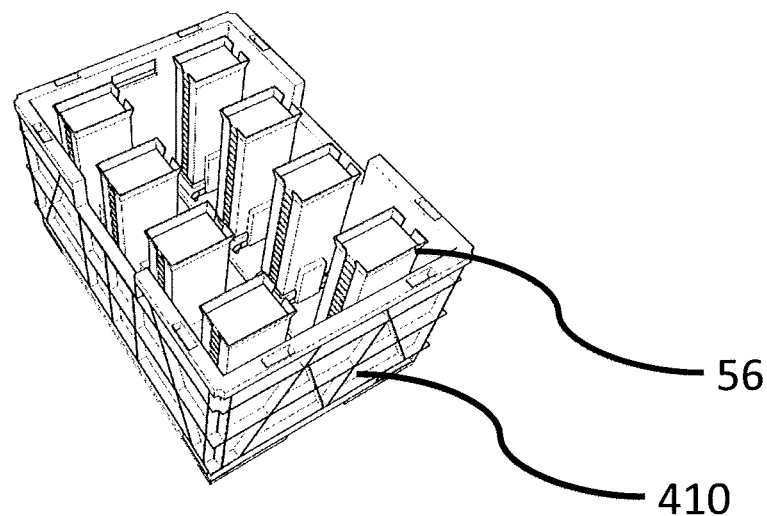
Figure 13B:
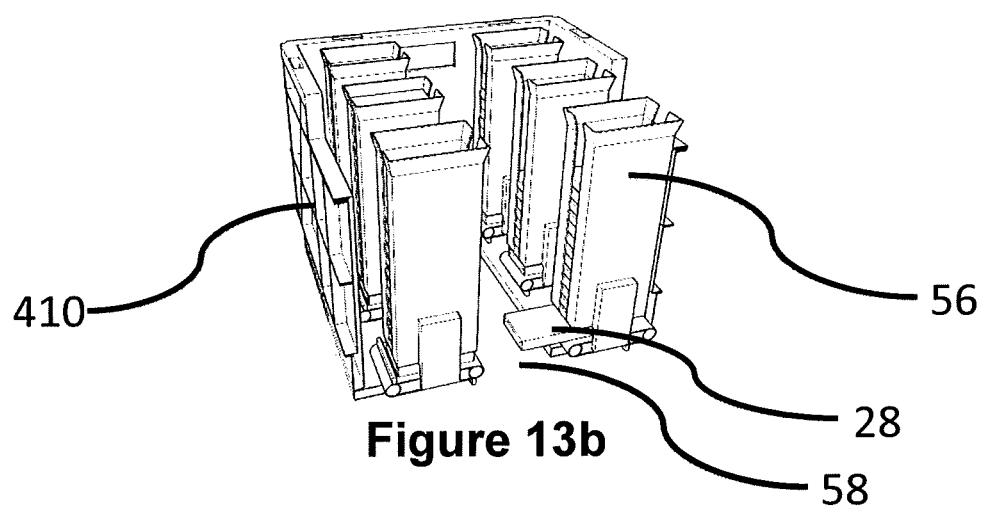
Figure 13C:
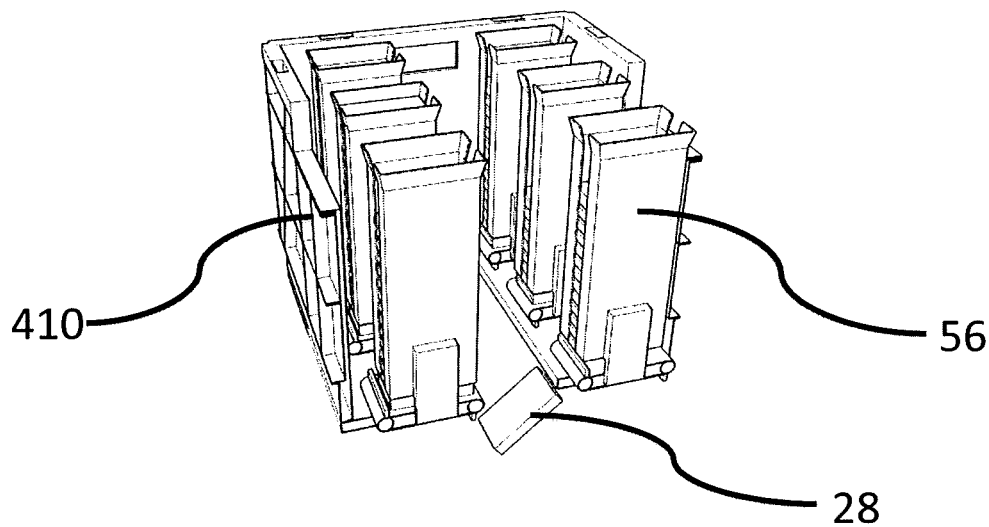
Figure 13D:
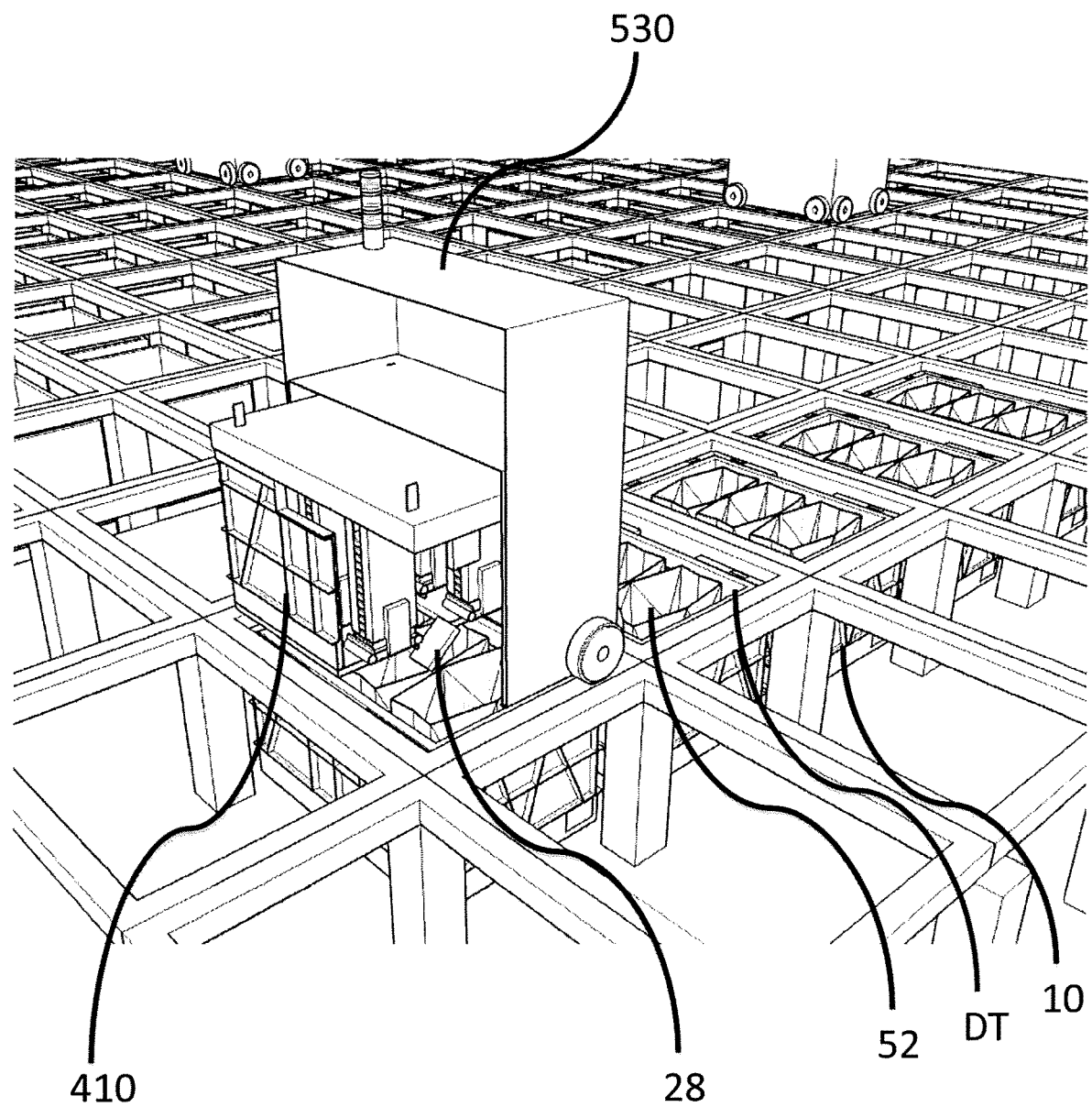
Figure 14A:
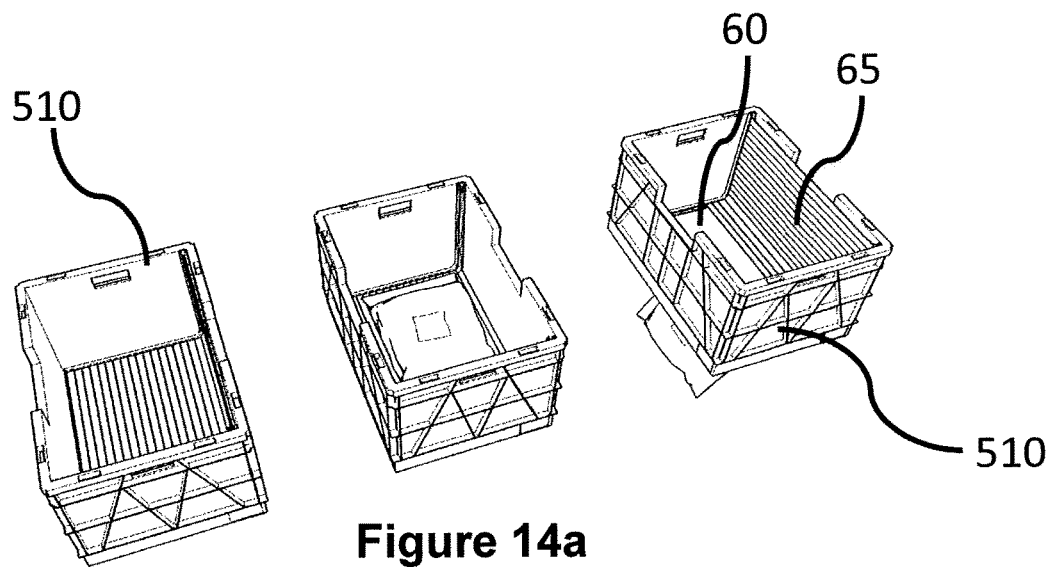
Figure 14B:
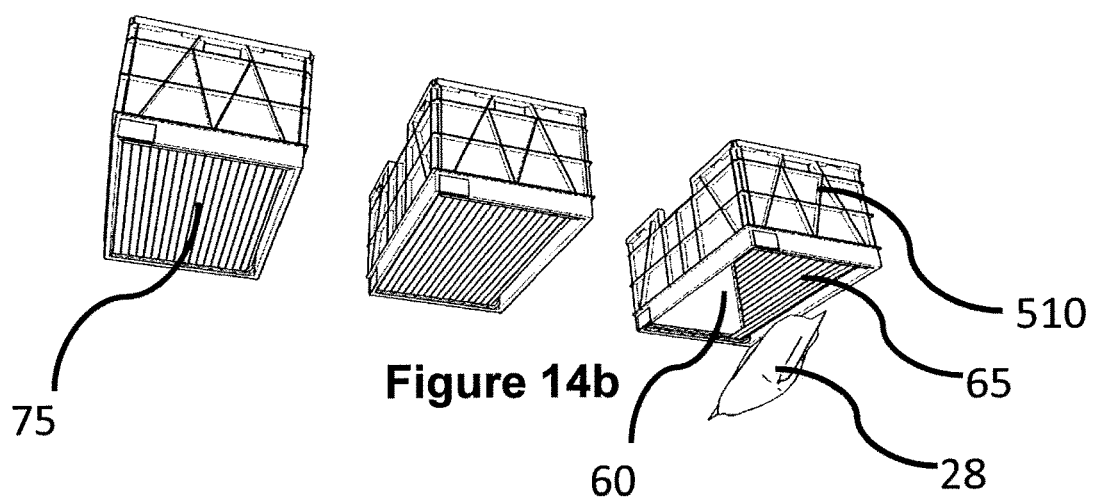
Figure 14C:
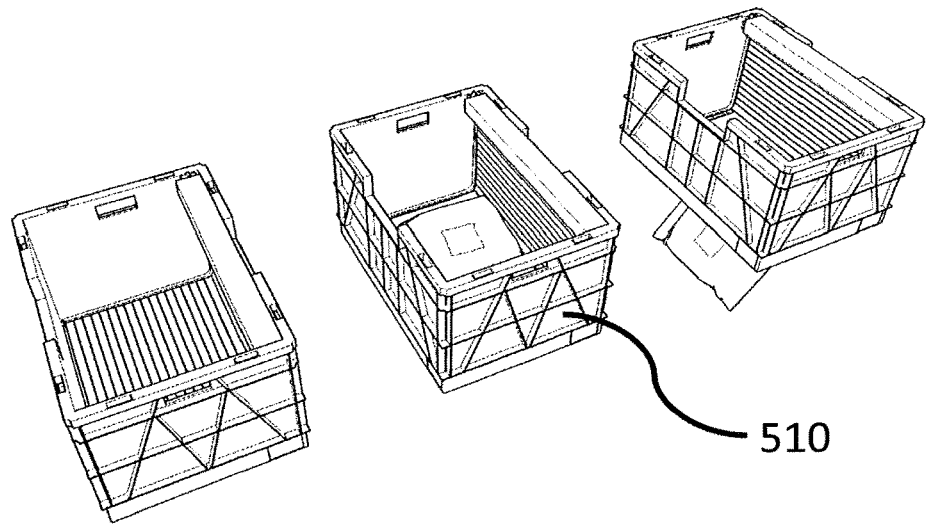
Figure 14D:
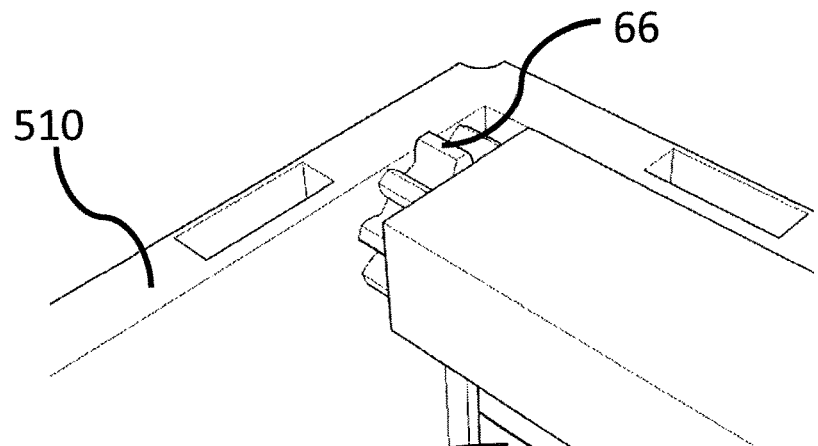
Figure 14E:
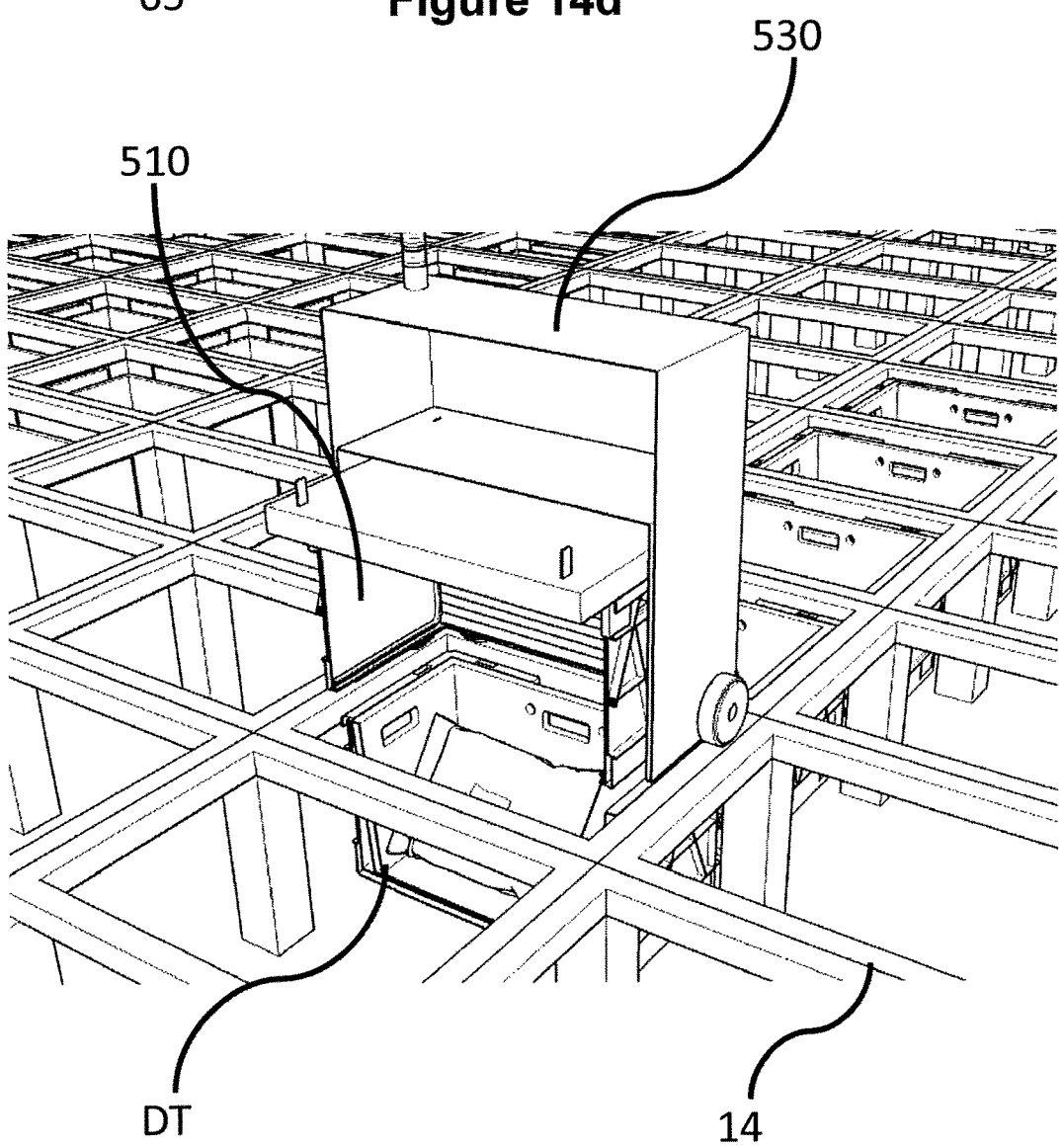
Figure 15A:
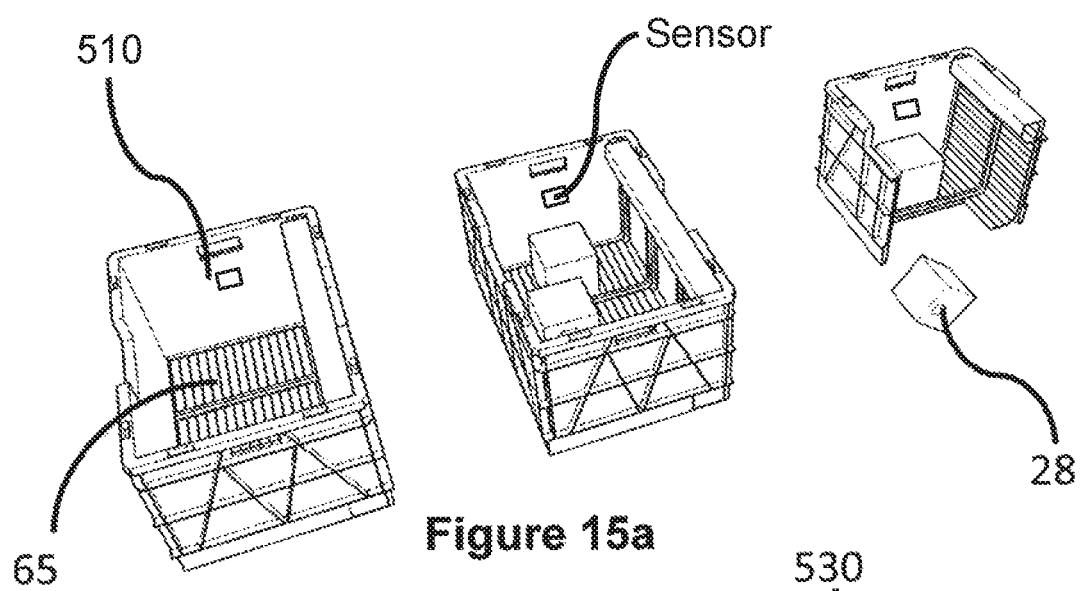
Figure 15B:
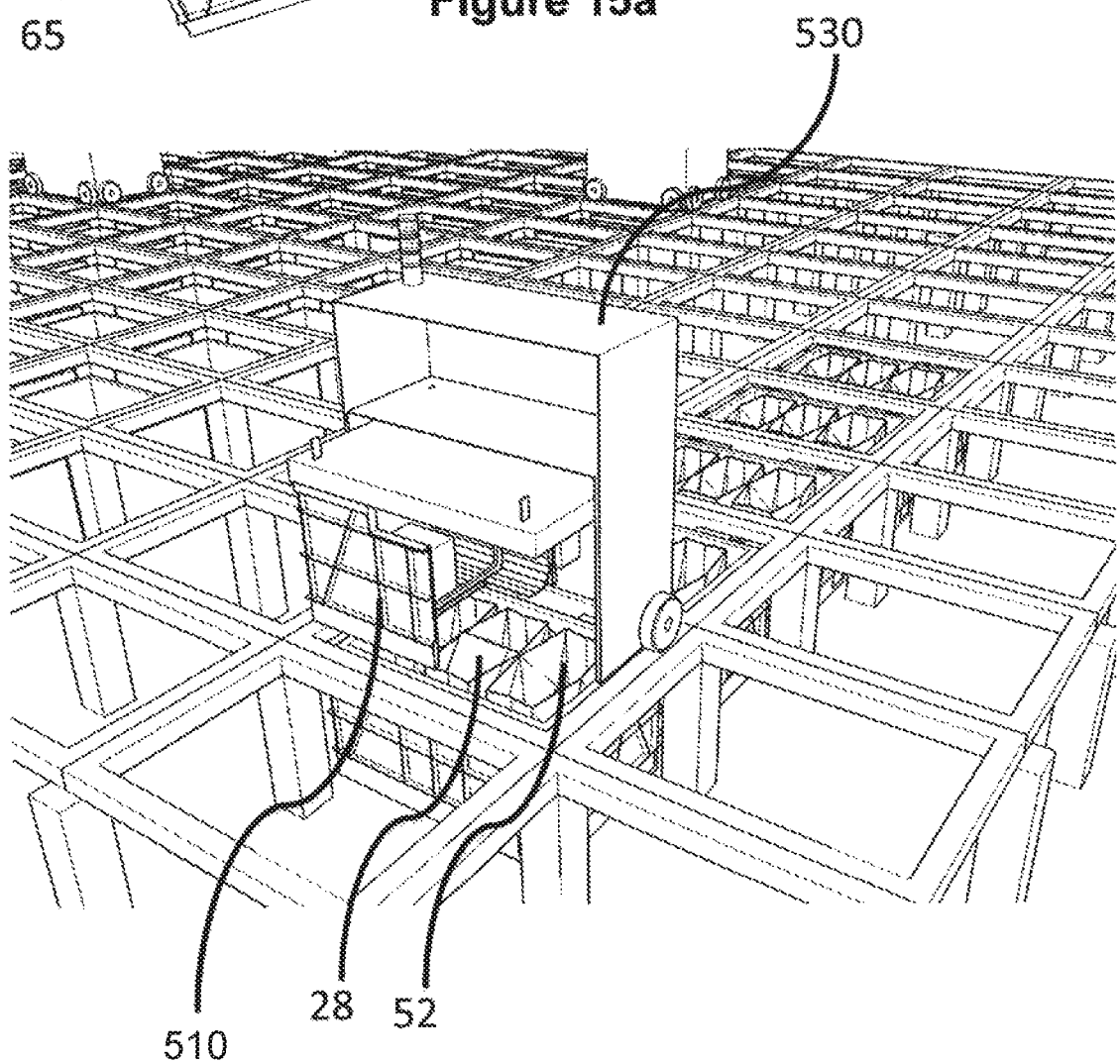
Figure 16A:
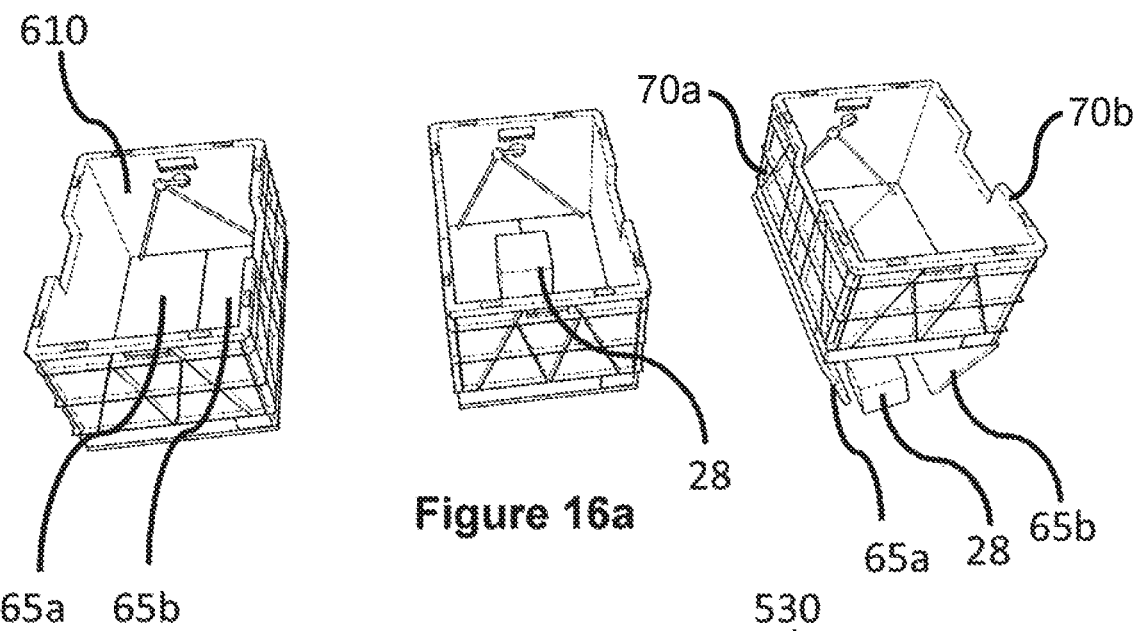
Figure 16B:
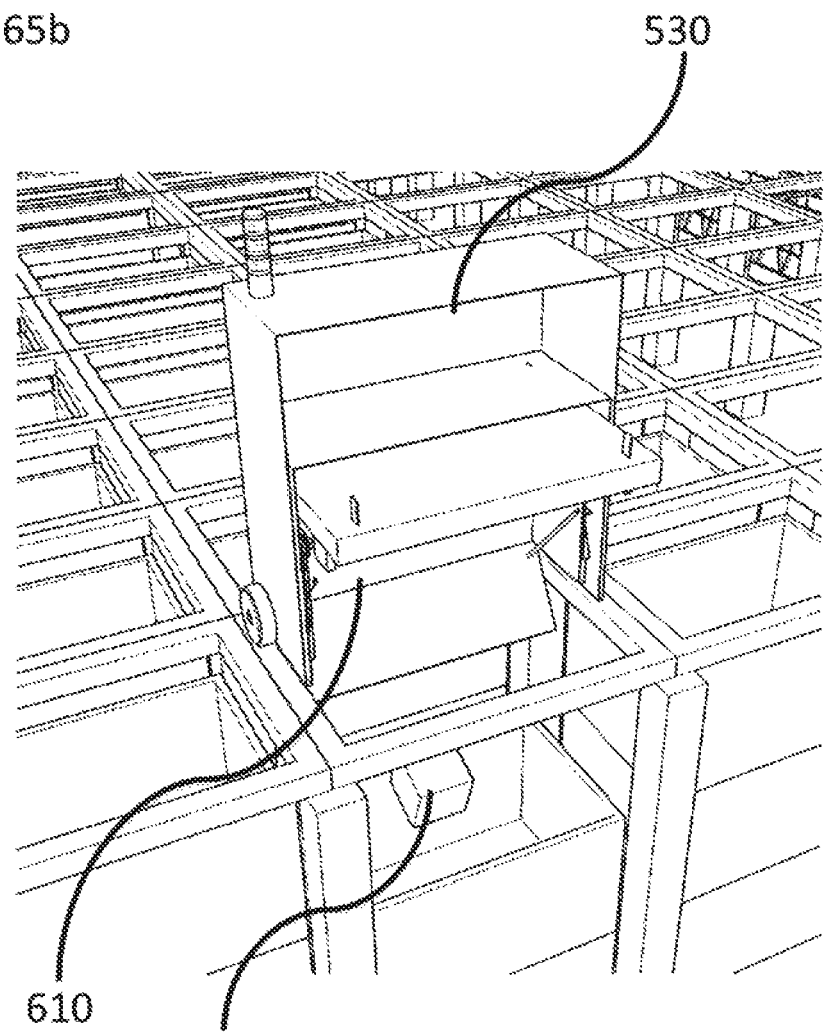
Figure 17:
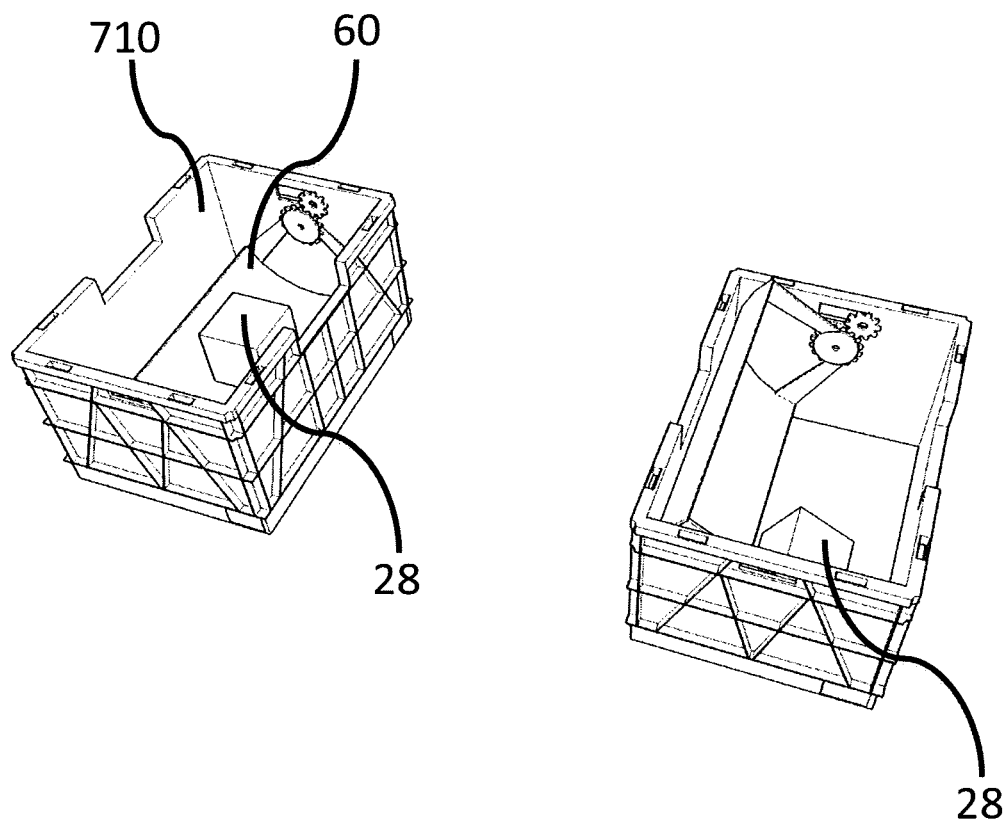
Figure 18A:
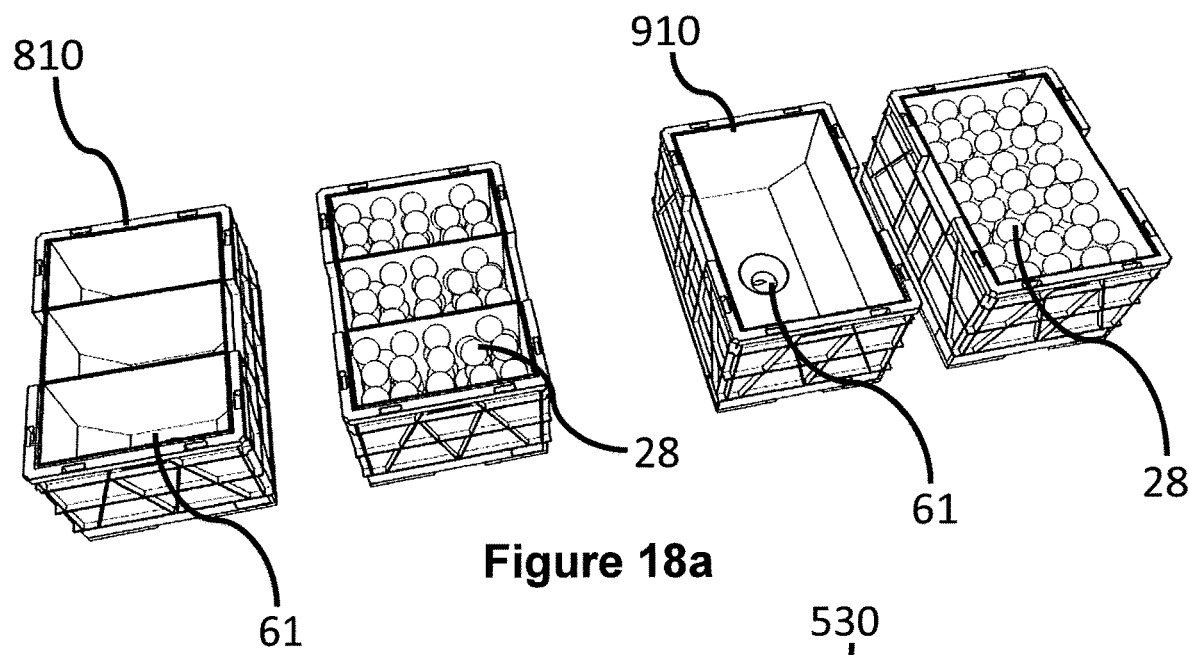
Figure 18B:
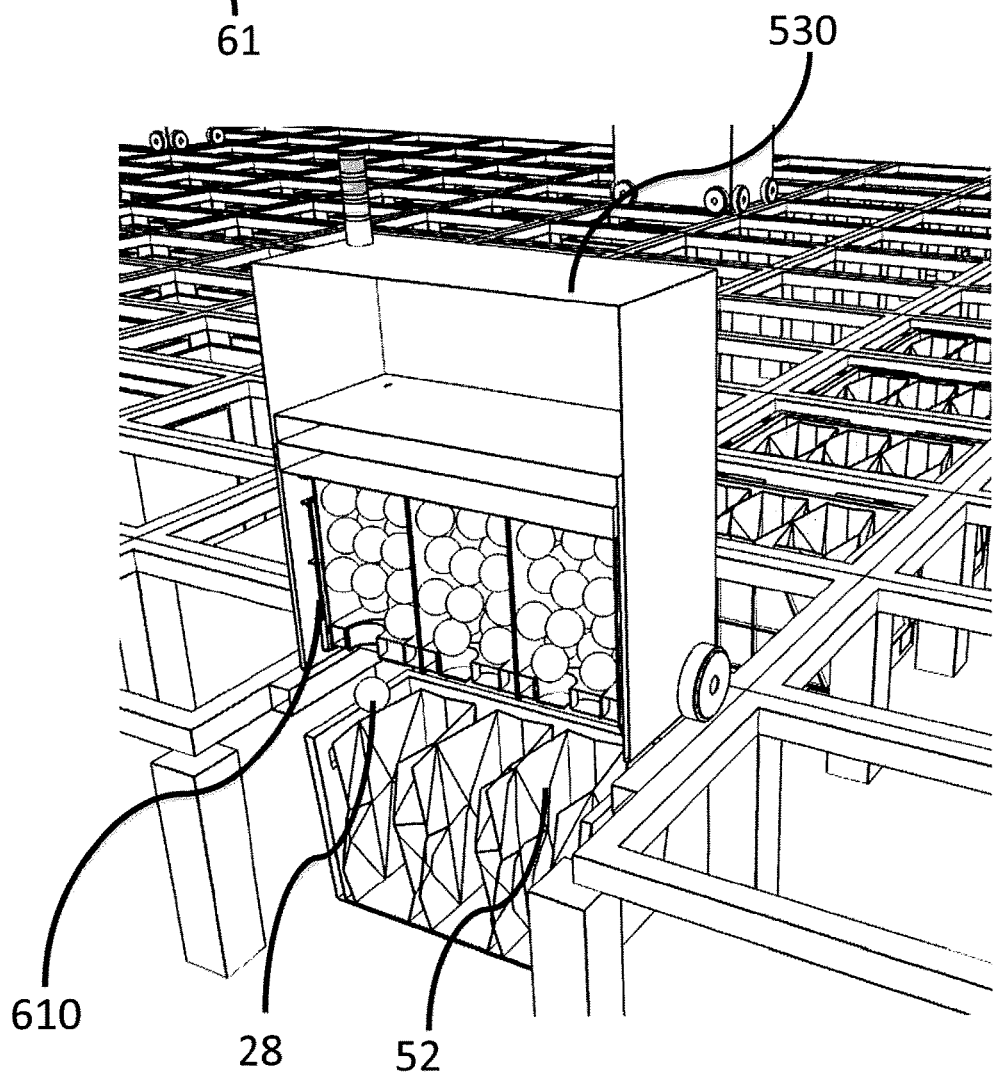

FIG. 5 is a schematic, perspective view of one form of robotic picking area in accordance with one aspect of the invention the robotic picking area being located above a dispatch dock, the picking area comprising a series of grids forming tracks above a plurality of delivery containers;

FIG. 6*a* is a schematic, cut-away, perspective view of one form of robotic picking device in accordance with a first embodiment of the invention, the robotic picking device picking an inventory item 28 from a bin located in the robotic picking area of FIG. 5;

FIG. 6*b* is a schematic, cut-away, perspective view of one form of robotic picking device in accordance with a first embodiment of the invention, the robotic picking device depositing the picked item from FIG. 6*a* in a delivery container located in the robotic picking area of FIG. 5, the delivery container being pre-loaded with delivery bags;

FIG. 7 is a schematic, perspective view of a robotic picking device in accordance with a first embodiment of the invention, picking an inventory item from a bin in a stack within the main storage system;

FIG. 8*a* is a schematic, cut-away, perspective view of a robotic picking device in accordance with a further invention, the robotic picking device being adapted to lift a bin containing inventory items from the storage system, pick an inventory item from the bin and deposit the picked item in to a delivery container, the delivery container being in a dispatch portion of the grid, a robotic picking area or within the storage system;

FIGS. 8*b* to 8*f* are cut-away, schematic views of the dispatch portion of FIG. 8, showing the robotic picking device of FIG. 8*a* depositing an inventory item robotically picked from the storage system directly in to a delivery bin;

FIGS. 8*g* to 8*i* are cut-away, schematic views of a portion of the storage system of FIG. 5, showing the robotic picking device of FIG. 8*a* picking inventory items from bins within the grid and depositing them with a delivery container held within the body of the robotic picking device;

FIGS. 9*a* to 9*f* are cut-away perspective, schematic views of a robotic picking device in accordance with a further aspect of the invention, the robotic picking device being adapted to receive a bin containing inventory items from the storage system, pick an inventory item from the bin and deposit the picked item in to a delivery container, the delivery container being in a dispatch portion of the grid, a robotic picking area of the grid or within the storage system;

FIG. 10*a* is a schematic, perspective view of a further form of robotic device, in accordance with the invention, the robotic device comprising an opening in the top surface of the vehicle body, thereby extending a cavity through the robotic device, the extended cavity enabling the content of the bin or delivery container to be accessed through the top of the device;

FIG. 10*b* is a schematic, perspective view of the robotic device of FIG. 10*a* showing a delivery container in situ in the extended cavity;

FIG. 10*c* is a schematic, perspective view of the robotic device of FIGS. 10*a* and 10*b* on the grid of the storage system, the system further comprising robotic picking means adapted so as to access the content of the delivery container or bin located within the cavity of the robotic device, the robotic picking means picking an inventory item from one of a number of robotic devices located on the grid of the storage system;

FIG. 10*d* is a schematic, perspective view of the robotic device of FIGS. 10*a* and 10*b* on the grid of the storage system, the system further comprising robotic picking means adapted so as to be carried on a further form of robotic device, the robotic picking means picking an inventory item from one of a number of robotic devices located on the grid of the storage system and placing said inventory item in a robotic device comprising a delivery container;

FIGS. 11*a* and 11*b* are schematic, perspective views of a robotic picking device in accordance with a further aspect of the invention, the robotic picking device being moveably mounted on an edge of the storage system, the robotic picking device picking an inventory item from within a portion of the storage system of FIG. 5 and depositing the inventory item within a delivery container located in the storage system;

FIGS. 12*a* and 12*b* are schematic, perspective views of a robotic picking device in accordance with a further aspect of the invention, the robotic picking device being moveably mounted above the storage system, the robotic picking device being movable to positions above any storage bin or delivery container within the storage system, the robotic picking device being adapted so as to pick inventory items directly from at least one storage bin and deposit the or each item in at least one delivery container;

FIGS. 13*a*, 13*b* and 13*c* are perspective, schematic cut-away views of a bin in accordance with a further invention, the bin comprising a number of dispenser mechanisms capable of automatically and under remote control, depositing items from the bin in to delivery containers;

FIG. 13*d* is a schematic, perspective view of a robotic handling device in accordance with a further invention, the robotic handling device comprising means for lifting and carrying the bin of FIGS. 13*a*, *b* and *c* the bin dispensing inventory items contained therein, in to delivery containers located in a portion of the storage system;

FIGS. 14*a*, 14*b* and 14*c* are schematic views of further aspects of an invention showing a bin comprising a mechanism for withdrawing a base section of the bin, the base section moving between a first and second position such that in the first position an inventory item is held within the bin, and in the second position the inventory item is released from the bin;

FIG. 14*d* is a schematic view of one form of mechanism for moving the base section of the bin of FIGS. 14*a*, *b*, and *c* from the first position to the second position;

FIG. 14*e* is a schematic, cut away view of a further form of robotic handling device carrying a bin, the bin comprising a base movable from a first closed position to a second open position, showing an inventory item having dropped from the bin to a delivery container on movement of the base of the bin in to the second open position;

FIG. 15*a* is a schematic view of a further form of bin having a base section that is movable from a first to a second position, the bin having a base comprising a plurality of portions independently movable from first to second positions in order to allow inventory items located within said bin to be controllably deposited in to a specific part of a delivery container;

FIG. 15*b* is a schematic, cut-away view of a further form of robotic load handling device in accordance with one form of the invention, the load handling device carrying the bin of FIG. 15a showing the inventory item being deposited in to a given bagged part of a delivery container below;

FIG. 16a is a schematic view of a further bin in accordance with a further aspect of the invention, the bin comprising an alternative embodiment of mechanism for moving the base section of the bin from a first position to a second position such that an inventory item held within the bin may fall into the delivery container below;

FIG. 16b is a schematic, cut-away view of a further form of robotic load handling device in accordance with one form of the invention, the load handling device carrying the bin of FIG. 16a showing the inventory item being deposited in a delivery container below;

FIG. 17 is a schematic view of a further bin in accordance with a further aspect of the invention, the bin comprising an alternative embodiment of mechanism moving the base section of the bin from a first position to a second position such that an inventory item held within the bin falls into the delivery container below;

FIG. 18a is a schematic view of a bin in accordance with a further aspect of the invention, the bin comprising an alternative mechanism for depositing inventory items located within the storage container to be deposited in to a delivery container below, the inventory item being of the flowing type; and FIG. 18b is a schematic cut-away view of a further form of robotic load handling device in accordance with one form of the invention, the load handling device carrying the bin of FIG. 18a showing the inventory items being deposited in a delivery container below.

As shown in FIGS. 1 and 2, stackable storage containers, known as bins 10, are stacked on top of one another to form stacks 12. The stacks 12 are arranged in a frame structure 14 in a warehousing or manufacturing environment. FIG. 1 is a schematic perspective view of the frame structure 14, and FIG. 2 is a top-down view showing a single stack 12 of bins 10 arranged within the frame structure 14. Each bin 10 typically holds a plurality of product or inventory items 28, and the inventory items within a bin 10 may be identical, or may be of different product types depending on the application. Furthermore, the bins 10 may be physically subdivided to accommodate a plurality of different inventory items 28.

In the description below, bins 10 will be used to denote containers intended for the storage of inventory items 28, whilst delivery containers DT will be used to denote containers intended to be filled to fulfil customer orders placed by customers. It will be appreciated that this terminology is used for ease of reference and explanation within this document. However, it should be noted that the bins 10 and the containers DT may be of the same shape and configuration. Furthermore, delivery containers DT may be stored in bins 10 within the storage system or any part thereof.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 are lifted clear of the rails 22, and the second set of wheels 36 are lowered into engagement with the second set of rails 22a. The drive mechanism can then be used to drive the second set of wheels 36 to achieve movement in the Y direction.

In this way, one or more robotic load handling devices 30 can move around the top surface of the stacks 12 on the frame structure 14, as shown in FIG. 4 under the control of a centralised control utility (not shown). Each robotic load handling device 30 is provided with lifting means 38 for lifting one or more bins 10 from the stack 12 to access the required products.

The body of the vehicle 32 comprises a cavity 40, the cavity 40 being of a size capable of holding a bin 10. The lifting means 38 comprises winch means and a bin gripper assembly 39. The lifting means lifts a bin 10 from the stack 12 to within the cavity 40 within the body of the vehicle 32.

In this way, multiple products can be accessed from multiple locations in the grid and stacks at any one time.

The robotic load handling devices 30 remove bins 10 containing inventory items 28 (not shown) therein and transport the bins 10 to picking stations (not shown) where the required inventory items 28 are removed from the bins 10 and placed into bins 10 comprising delivery containers DT. It is important to note that a delivery container DT may fit within a bin 10. The bins 10 may comprise inventory items 28 or may comprise delivery containers DT. Furthermore, the delivery containers DT may comprise at least one bag 52, the inventory items 28 being picked directly in to a bag 52 at a pick station (not shown).

The empty bins 10 or the bins comprising delivery containers DT or the bins comprising delivery containers DT and bags 52 may all be stored within the stacks 12. It will be appreciated that all the bins 10 have substantially the same external shape and configuration.

FIG. 4 shows a typical storage system as described above, the system having a plurality of load handling devices 30 active on the grid above the stacks 12.

FIGS. 1 and 4 show the bins 10 in stacks 12 within the storage system. It will be appreciated that there may be a large number of bins 10 in any given storage system and that many different items 28 may be stored in the bins 10 in the stacks 12, each bin 10 may contain different categories of inventory items 28 within a single stack 12.

In one system described above and further in UK Patent Application Number GB1410441.8—Ocado Innovation Limited, hereby incorporated by reference, the storage system comprises a series of bins 10 that may further comprise delivery containers DT with customer orders contained therein or may further comprise bins 10 with inventory items 28 awaiting picking contained therein. These different bins 10 and combinations thereof may be contained in the storage system and be accessed by the robotic load handling devices 30 as described above.

In a first aspect of the invention, the robotic picking and storage system described above, with reference to FIGS. 1 to 4, comprises a robotic picking system, apparatus, and method to enable inventory items 28 to be picked on the storage system described above, thereby avoiding bins 10 being transferred to pick stations for manual or robotic picking of inventory items 28 in to customer orders.

As shown in FIG. 5, a portion of the storage system 100 may be set aside for the express purpose of robotic on grid picking. Any such area will comprise delivery containers DT located beneath the dedicated portion of grid, which may be remotely located from, but linked to the main portion of the framework 14 and grid 22 system by an extension of the grid 22, on which the robotic load handlers 30 operate. The portion 100 of the grid 22 may act as a dedicated robotic picking area. However, it will be appreciated that the main storage system may be used in the manner described below, as long as at least some delivery containers DT are located at the top of at least some of the stacks 12 of bins 10.

A plurality of robotic handling devices 30, for instance as described above and in UK Patent Application No. GB1413155.1—Ocado Innovation Limited, hereby incorporated by reference, are operative on the grid 22 system and under control of a separate centralised control utility as described in UK Patent Application No. GB1509613.4—Ocado Innovation Limited, hereby incorporated by reference.

In addition to the robotic load handling devices 30 there are, according to the present invention, a plurality of additional, similarly looking robotic picking devices 130 which may be used to pick inventory items 28 from bins 10 and to deposit items directly in the delivery containers DT.

As shown in FIG. 6a, one form of a robotic picking device 130 in accordance with one aspect of the invention, comprises robotic picking means 50 within the cavity 40 of the body of the load handling device 30. The external shape and configuration of the device 130 substantially matches that of the load handling device 30 such that it may operate on the grid 22 in the same manner. However, it will be appreciated, that in this form of robotic picking device 130, the picking means 50 takes the space previously used for the location of the bin 10 being lifted from a stack 12. As described below, the purpose of the robotic picking device 130 is different to that of the load handling device 30.

In one aspect of the present invention, a robotic load handling device 30 is remotely instructed by a centralised control utility (not shown) to collect a bin 10 from a stack 12 in the main storage system, the bin 10 containing inventory items 28 required for a customer order. The load handling device 30 deposits the bin 10 containing inventory items 28 required for the customer order, in a vacant position in the robotic picking portion 100 or any other suitable position in beneath the grid 22 of the storage system. A robotic picking device 130 is positioned above the deposited bin 10, containing inventory items 28, by the centralised utility. Under remote control from the centralised utility, potentially assisted by on-board sensors, cameras and processing means, the robotic picking means 50 located within the cavity 40 of the picking device 130 is instructed to pick at least one inventory item 28 from the bin 10. The item picked is withdrawn in to the cavity 40 of the robotic picking device 130. The picking device 130 is then moved to a position on the robotic picking portion of the system or any other part of the storage system above a delivery container DT. The delivery container DT may comprise a number of bags 52 in which the inventory item 28 may be placed. Alternatively, the delivery container DT may comprise an empty delivery container DT. The robotic picking device 130 places the inventory item 28 in the delivery container DT or a bin 10 comprising a delivery container DT contained therein.

It will be appreciated that the delivery container DT may already comprise inventory items 28 either previously picked robotically or manually on grid, or at pick stations, or picked manually at pick stations. It will be appreciated that the delivery container DT associated with a given customer order may be filled via many separate picking steps across a period of time. Furthermore, a customer order may comprise multiple delivery containers DT, therefore a delivery container DT in the picking portion of the system 100 may comprise only part of a customer order. Multiple delivery containers DT may be consolidated at a dispatch location immediately prior to the order being loaded on to a vehicle for delivery.

It will also be appreciated that this form of robotic picking device 130 substantially occupies a single grid space on the horizontal grid 22 of the framework 14. However, other forms of robotic picker device 130 may occupy more grid spaces. For example, a robotic picking device 130 may occupy 2×1 grid spaces or 2×2 grid spaces or more as required to perform the function described.

Furthermore, the robotic picking device 130 may comprise picking means 50 of a different form to that shown in FIGS. 6 and 7. Any suitable form of remotely controllable or autonomously capable picking means 50 may be used. It will be appreciated that the picking means 50 may have different grippers or hands to pick inventory items 28 from bins 10. For example, hands (not shown) may comprise suction cups activated by vacuum means or may comprise remotely controllable grippers activated by the central control utility.

Using the robotic picking device 130, comprising the picking means 50, removes the requirement to transport a bin 10 from a stack 12 to a pick station (not shown) and remove the required inventory item 28 and place it in an allocated delivery container DT.

In a further aspect of the invention, with reference to FIGS. 6a and 6b, the robotic load handling device 130 may comprise a robotic picker device 130 as shown in FIG. 6a. Such a robotic picker device 130 may be provided with picking means 50 within the cavity 40 of the body of the device 130. The picking means may comprise a robotic arm capable of remote or autonomous manipulation such that inventory items 28 may be picked from bins 10 or delivery containers DT and deposited in bins 10 or delivery containers DT.

In use, and as shown in FIGS. 6a and 6b such a robotic picker device 130 would be positioned above a bin 10 transported to or located in the picking portion of the storage system. The device 130 would be used to rapidly pick inventory items 28 from bins 10 and deposit the inventory items 28 in the delivery containers DT located adjacent the bins 10. As shown in FIGS. 6a and 6b it is possible for inventory items 28 to be picked from bins 10 and deposited in delivery containers with relatively little movement of the picking device 130.

Using this method, it would also be possible to consolidate customer orders in delivery containers DT located in the picking portion of the grid. For example, the robotic picker device 130 may be positioned over a first delivery container DT1 and the picking means 48 remotely activated to pick up an inventory item from the delivery container DT1. The robotic picker device 130 may then be moved in to position over a second delivery container DT2 and the picking device activated to place the inventory item in to the second delivery container DT2. This will be particularly relevant to customer orders where bulky items may have been inefficiently stored in delivery containers DT and can be moved around in order to provide a more efficient packing regime for a given order.

In this aspect of the invention, the use of robotic load handlers in the manner described in, for example, UK Patent Application No GB1410127.3 may be envisaged, and such load handling devices are hereby incorporated by reference.

This is advantageous as the delivery containers DT are packed in to delivery vans for onward delivery to customers, therefore the more efficiently the containers DT are packed, the more efficiently the vans may be packed.

In the above ways, it will be appreciated that it is beneficial to pick popular items from one bin 10 in to multiple delivery containers DT. Using robotic picker devices 330, reduces congestion at manual pick stations, increases throughput and reduces costs.

In further aspects of the invention, the robotic picking and storage system described above with reference to FIGS. 1 to 4 comprises different forms of robotic picking devices 130, 230, 330, 430

As explained with reference to FIGS. 1 to 7, the robotic load handling devices 30 described above act co-operatively, under the control of a suitable centralised control utility, to remove bins 10 from the stacks 12 of the storage system. The function of each robotic handling device 30 is to collect and transport a bin 10 containing the required inventory item 28 or items to a pick station from where the required inventory item 28 or items are loaded in to a delivery container DT. It will be appreciated that robotic load handling devices 30 may have additional functions such as removing bins 10 from stacks 12 and moving said bins 10 to alternative locations within the stacks 12 of bins 10, as well as periodically rearranging the bins 10 in the stacks 12 in a form of housekeeping task.

In a further aspect of the invention another derivative of a robotic load handling device 230 may be provided with alternative picking means 150 within the body of the device 230, which can be used for picking and lifting an inventory item 28 directly from a storage bin 10, located within the stacks 12, in the main portion of the storage system and transferring the inventory item 28 directly to a delivery container DT.

The alternative form of robotic picking device 230 is shown in FIG. 8a. The picking device 230 in the following example comprises a 2×1 grid spacing device. However, it will be appreciated that devices 230 of alternative sizes may be envisaged.

As can be seen in FIG. 8a, the picking device 230 comprises a cavity 40, lifting means, a bin gripper assembly 39 and picking means 150. The lifting means together with the bin gripper assembly 39 act so as to releasably attach to a bin 10 to enable the bin 10 to be lifted from the stack 12 by the robotic picking device 230, in a similar manner to that described with reference to FIG. 3. The lifting means may take the form of a torpedo engageable with co-operating portions of the bins 10 to enable the lifting means to pick the bin 10 from a stack 12. It will be appreciated that any suitable form of lifting means 44 may be used that enables the robotic picking device 230 to engage a bin and then raise it from its position in the stack 12 or in the picking area of the system. The bin 10 is retained in the cavity 40 by suitable retaining means movable from a first position, to allow the lifting means and the bin gripper assembly 39 to withdraw the bin 10 in to the cavity 40, to a second position where the bin 10 is held in situ in the cavity 40 of the device 230.

The picking means 150 acts so as to pick inventory items from the bin 10 lifted in to the cavity 40 within the picking device 230. The picking device 230 further comprises moving means 48 for sliding the bin 10 from a first position where it is located after lifting, to a second position where it is located beneath the picking means 150. It will be appreciated that the moving means 48 may additionally act to retain the bin 10 in the cavity 40.

In use, the lifting means 44 of the picking device 230 is placed over a bin 10 in a stack 12 or in a picking area. The lifting means 44 and bin gripper assembly 39 together lift the bin 10 in to the cavity 40 of the device 230, as shown in FIGS. 8c and 8d. Once lifted, the bin 10 is transferred by the moving means 48 from the first, lifted position to the adjacent second position within the cavity 40 as shown in FIG. 8e. It should be noted that the first position substantially corresponds to a first grid square 22 in the horizontal part of the framework 14 and the second position substantially corresponds to a second grid square 22' adjacent the first grid square 22.

The picking means 150 is disposed above the second position within the cavity 40 of the device 230. The picking means 150 comprises a suitable grabbing means for locating and engaging at least one inventory item 28 from the bin 10 as shown in FIG. 9d. It will be appreciated that the picking means 150 comprises means for engaging inventory items 28 of numerous shapes and sizes. Indeed, different engaging means may be required for different inventory items 28 to be picked. Furthermore, the picking means 150 is required to be movable in at least x-y-z directions.

As shown in FIG. 8f, once an inventory item is engaged by the picking means 150, the bin 10 is moved from the second position to the first position by the moving means 48. The inventory item 28 is retained on the picking means 150. The robotic picking device 230 is then moved to a position such that the second position within the device is above a target delivery container DT. The picking means 150 is then extended toward the delivery container DT identified as requiring the inventory item picked, as required, depending on the size and shape of the inventory item.

Once picked, the inventory item is placed in a delivery container DT, shown in FIG. 8f are positioned beneath the cavity 40 in the second of the two grid spaces occupied by the picking device 230. However, it will be appreciated that the robotic picking device 230 may be moved such that the picking device 230 is disposed above an alternative delivery container DT in the robotic picking area 100 or on the main storage system.

FIGS. 8g, 8h and 8i show an alternative method of robotic, on grid picking in which the delivery container DT is lifted by the robotic picking device 230 in to the cavity 40, the inventory items 28 being disposed within bins 10 within the robotic picking area or in the main system.

In this alternative embodiment it will be appreciated that the robotic picking device 230 may travel on the grid 22 carrying the delivery container DT, the picking means 150 being used to pick inventory items from bins 10 within the storage system. In this way, multiple inventory items may be picked in to a single delivery container DT being carried by a single robotic picking device 230.

It will be appreciated that such robotic picker devices 230 may be used to retrieve a bin 10 from the main storage system in which the required inventory items 28 were located. Alternatively, load handling devices 30 may be used to lift bins 10 from the main storage system and transport them to a dedicated robotic picking area 100 of the system, the dedicated picking area 100 having only a single layer of bins 10 or delivery containers DT disposed within the framework 14.

The picker device 230 would, under remote control from the centralised control utility potentially assisted by on-board sensors camera and processing means, be positioned above the bin 10 deposited by the robotic load handling device 30 and act as described above with reference to FIGS. 8g, 8h and 8i. Inventory items 28 picked being deposited in target delivery containers DT in the dedicated portion 100 of the storage system. It will be appreciated that means to identify the correct delivery container DT and as appropriate the correct position within the delivery container DT, is provided on the picking device 230 if necessary, using remotely controlled automatic positioning means. In this way, the inventory item 28 is robotically picked from a bin 10 and deposited in a delivery container DT without the need for any bins 10 or delivery containers DT to be transported to picking stations.

It will be appreciated that the robotic picker handling device 230 may be of any size capable of carrying a bin 10 whilst also containing picking means 150. This may be achievable with regard to the device 230 if the device 230 was adapted to have limited winch capabilities with respect to other robotic load handling devices 30 operating on the storage system. In this specific example, it may be that the picker handling device 230 need only be provided with telescopic grippers on two sides of the cavity within the body of the device 230.

Figure 9A:
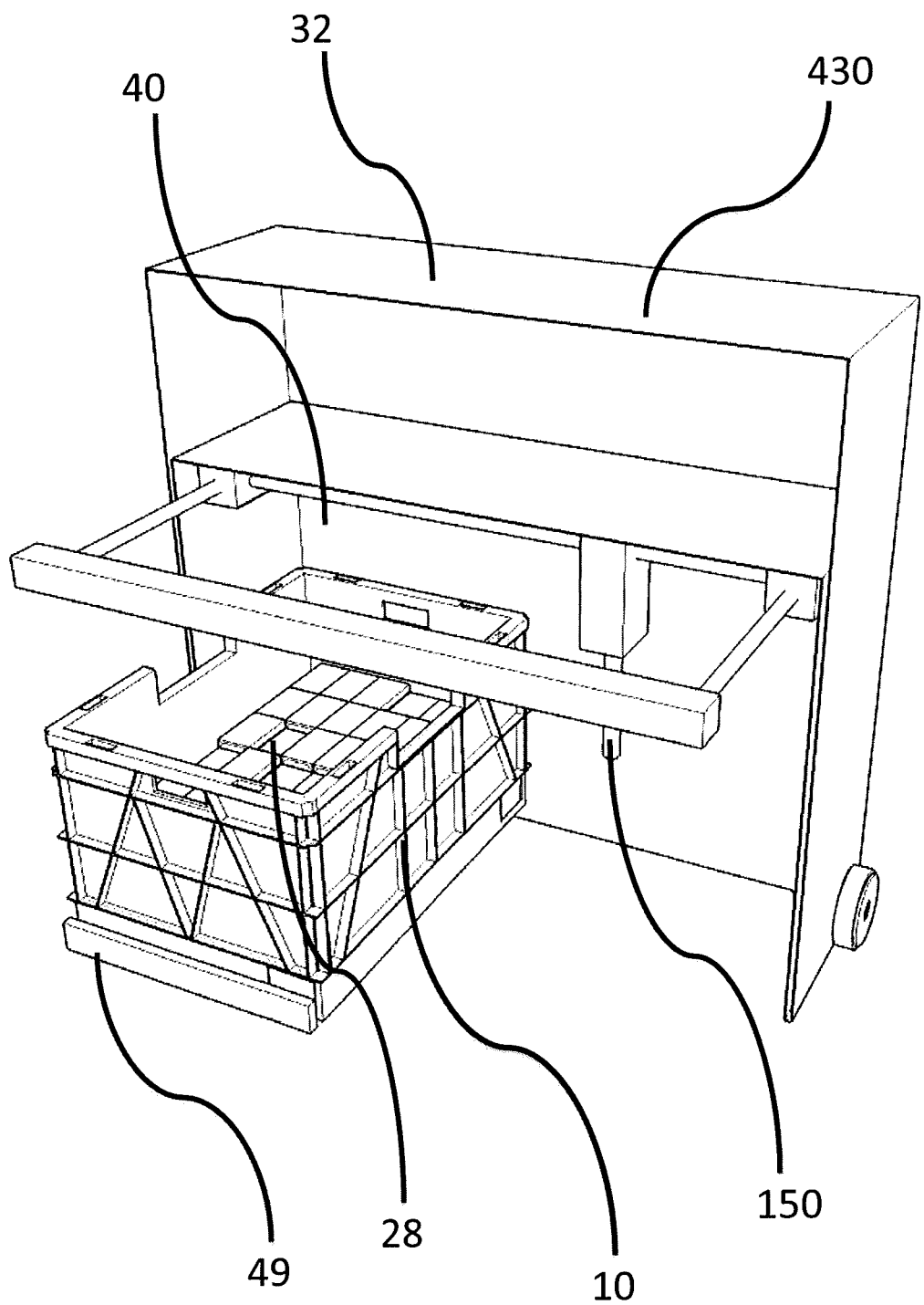
Figure 9B:
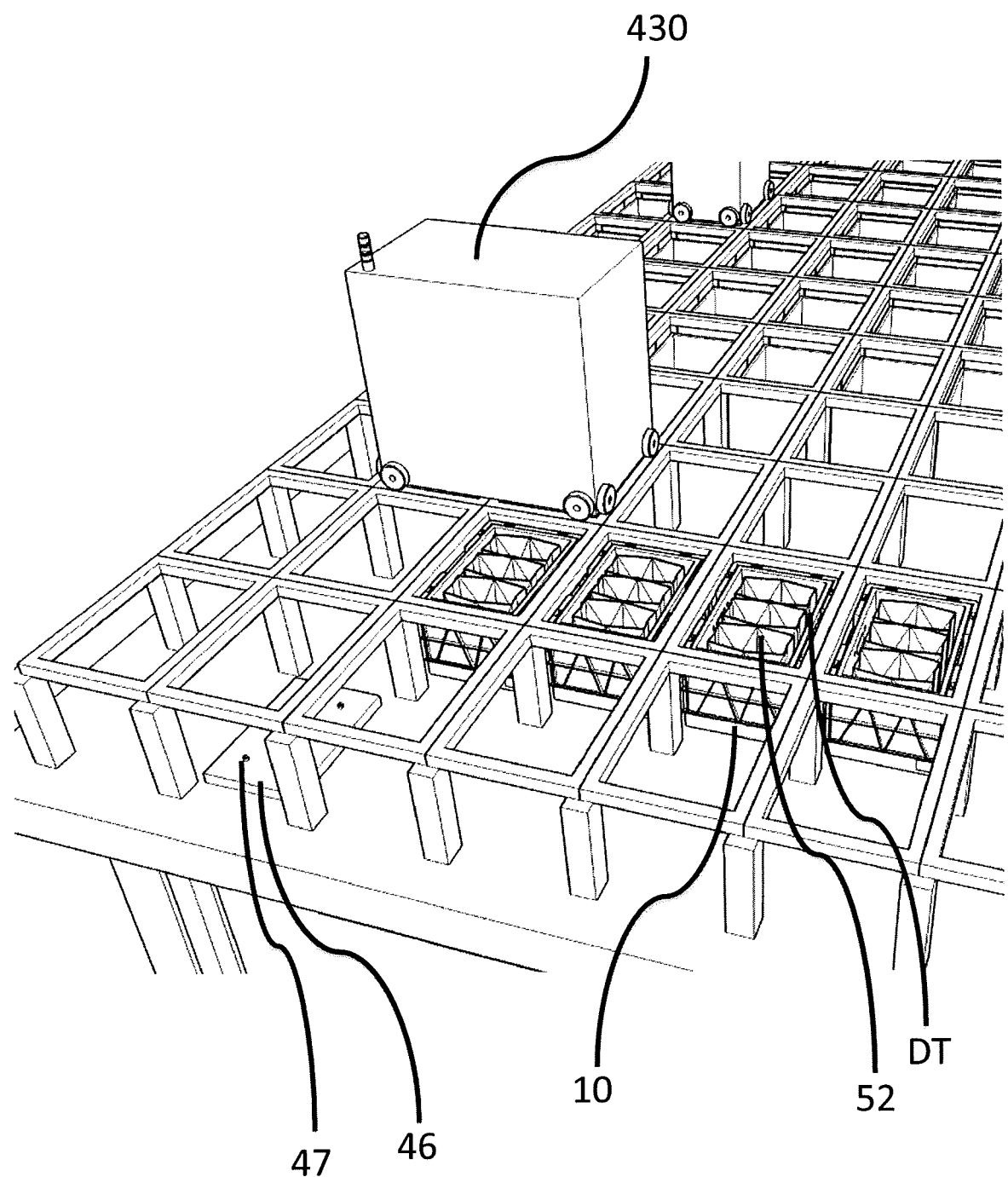
Figure 9C:
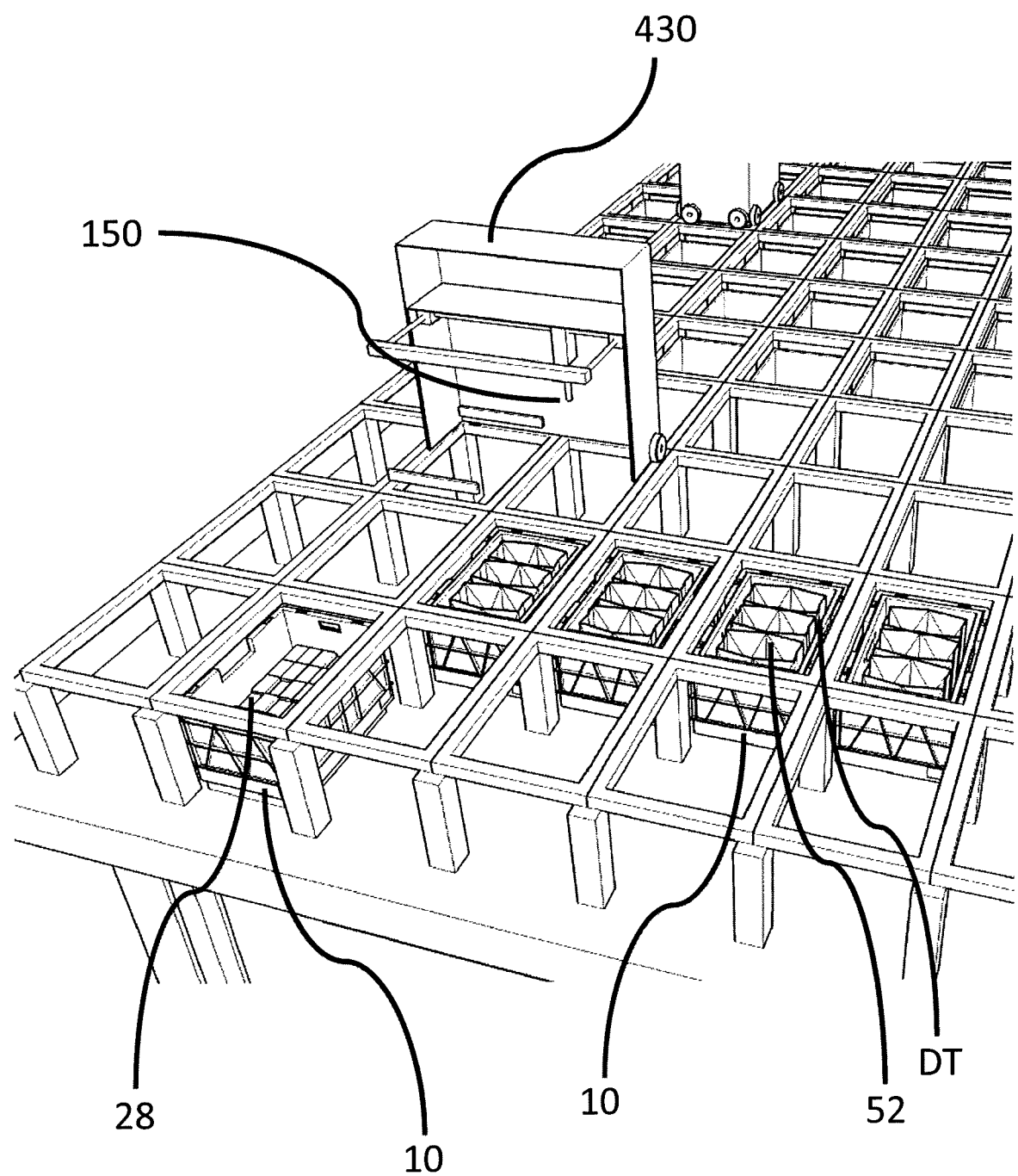
Figure 9D:
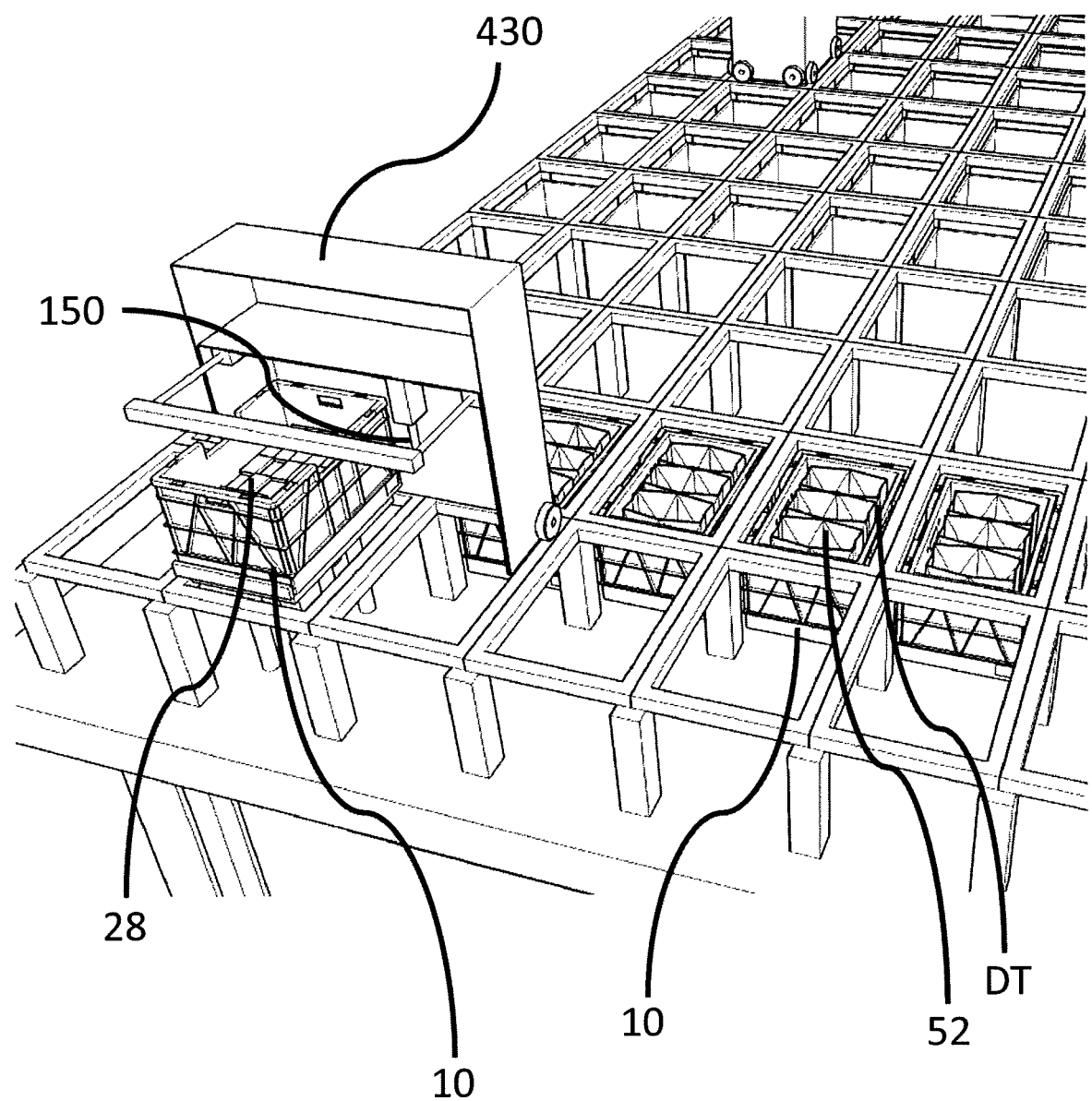
Figure 9E:
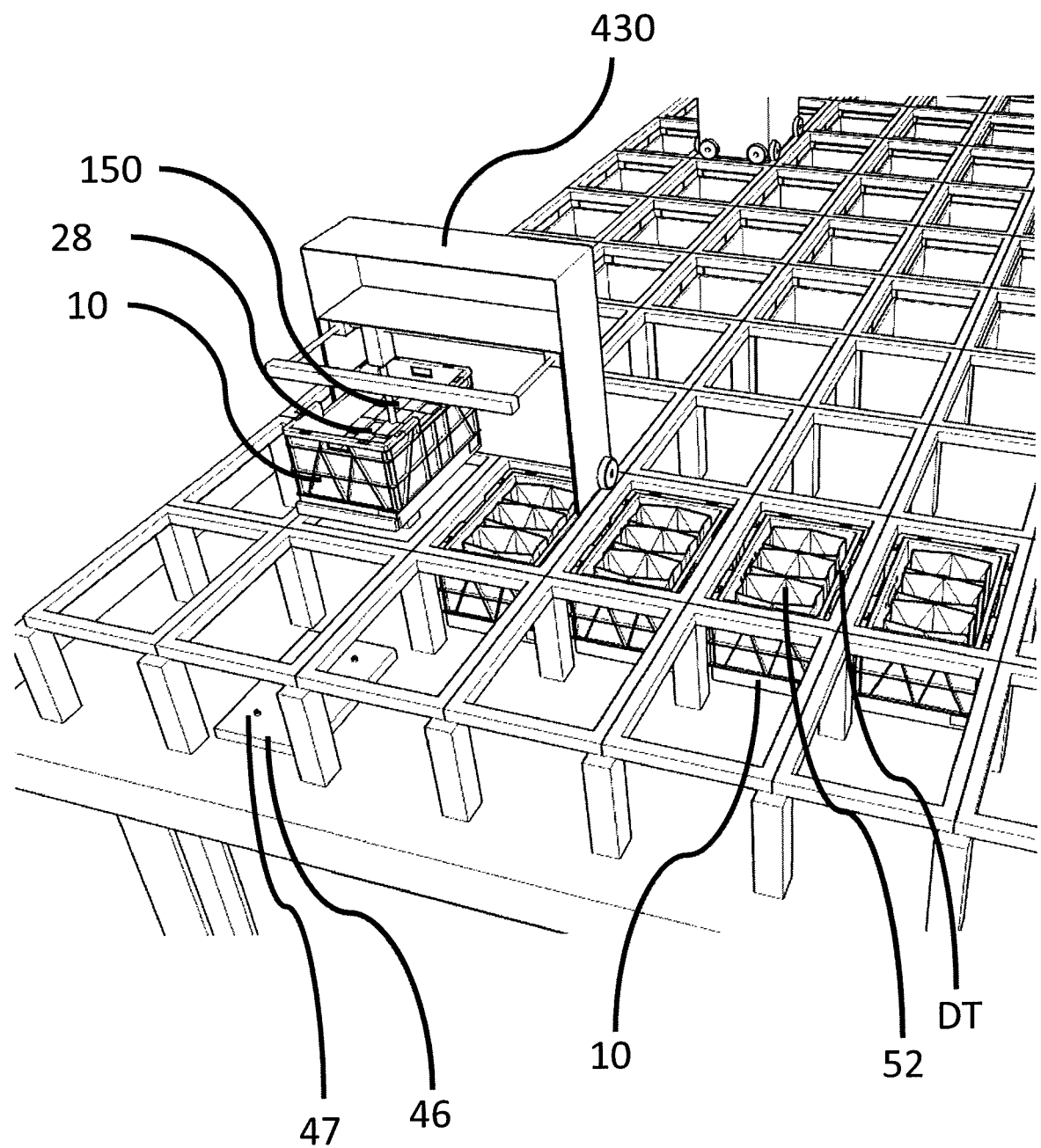
Figure 9F:
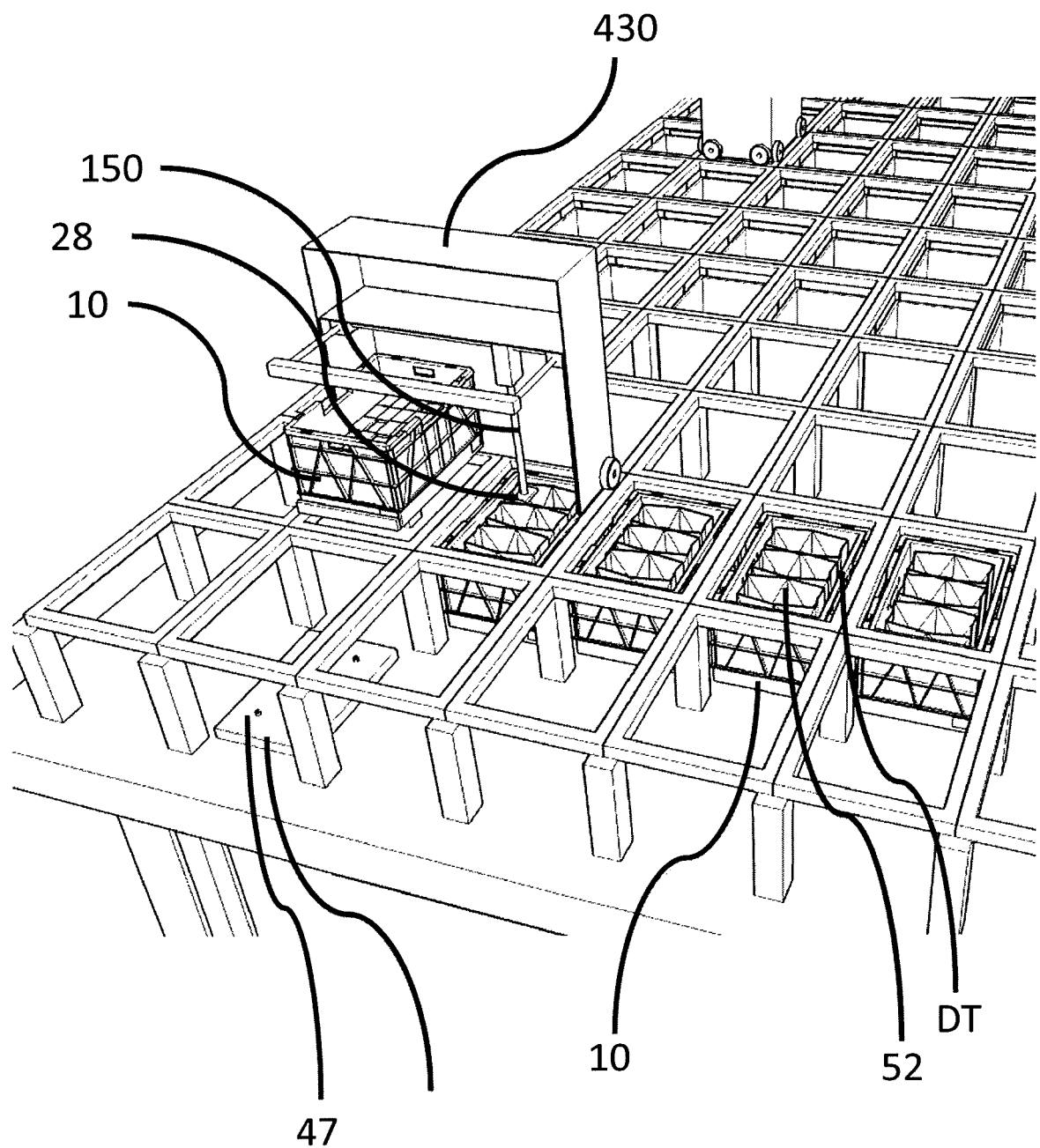

Given the limited space within the robotic picking device 230 an alternative robotic picking device 430 is shown in FIGS. 9a to 9f. In this robotic picking device 430 the bin 10 is not lifted in to the cavity 40 of the device 430 by lifting means 44 and bin gripper assembly 39 rather the bin 10 is pushed up in to the cavity 40 by raising means 46 located in the base of the storage system. The raising means 46 occupies a grid space as shown in FIG. 9c, for example.

The raising means 46 comprises a substantially flat plate having locating pins 47 for co-operating with suitable co-operating means on the underside of the or each bin 10 in order to stabilise the bin 10 on lifting. The raising means 46 may be raised by any suitable means, for example via hydraulically activated pistons extending in a telescopic manner upwardly toward the grid.

In use, as shown in FIGS. 9b to 9f, a robotic load handling device 30 (not shown in FIG. 9b) retrieves a bin 10 from the storage system and deposits said bin 10 on the raising means 46. A robotic picking device 430 is moved in to position over the bin 10 on the raising means 46. The raising means 46 is activated, for example by the centralised control utility, and the bin 10 is raised in to the cavity 40 of the device 430. The device 430 comprises releasable latching means 49 that act so as to retain the bin 10 within the cavity 40 during the picking process. The latching means 49 may comprise movable arms that locate beneath the bin 10, once the bin 10 is in situ. Alternatively the latching means 49 may comprise electromagnetic catches operable by solenoids or any other suitable means. It will be appreciated that any number of releasable latching mechanisms may be used performing the required function of retaining the bin 10 in the cavity 40.

Once the bin 10 is in situ, the picking means 150 may be used in a manner similar to that described above with reference to the previous robotic picking device 230. Namely, the picking means 150, movable in x-y-z directions is manipulated in to position above an inventory item 28 in the bin 10 under the control of the central control utility or any other suitable control means. The picking means 150 is then lowered downwardly and engages an inventory item 28. It will be appreciated that the picking means 150 is provided with suitable gripping means to engage with an inventory item 28. Once engaged, the picking means 150 is lifted upwardly and moved in to position above a delivery container DT located beneath the grid space adjacent the raised bin 10.

Once the picking means 150 is in the correct location above the required delivery container DT, assisted by sensor or camera means as appropriate, the inventory item 28 is either released in to the delivery container DT or placed by movement in the z-axis of the picking means 150 in to the delivery container DT.

It will be appreciated that the raising means 46 may be used to raise a delivery container DT in to the cavity 40 within the picking device 430 and the picking means 150 used to pick inventory items 28 from bins 10 located underneath the grid and place said inventory items in the delivery container DT within the cavity 40 of the picking device 430.

Once all the required picking steps are complete, the robotic picking device 430 returns to the grid square above the raising means 46, the raising means 46 is raised, the bin 10 or the delivery container DT is unlatched from the device 430 and lowered beneath the grid space. The bin 10 or delivery container DT is then positioned in the required place by a load handling device 30 where it awaits its next action.

FIGS. 10a to 10d show a further embodiment of a robotic device 30. As can be seen in FIG. 10a, the robotic device 330 comprises a cavity 40 that extends through the body of the robotic device 330. In order to achieve this, the lifting means 44, bin gripping mechanism 39 and all other mechanics and electronics required to operate the robotic device 330 have been moved to the sides of the device 330, creating a robotic device having overhanging sections. It will be appreciated that the overhanging sections shown in FIGS. 10a and 10b are exemplary embodiments only and there may be only one overhanging section disposed on one side of the robotic device. However, it should be noted that the cross-sectional area defined by the wheels of the device 330 occupy a single space of the grid 22 only.

In use, a bin 10 or a delivery container DT may be lifted from the storage system in to the extended cavity 40 of the device 330. As shown in FIG. 10b, when in situ the delivery container DT, in this example, is exposed at the top surface of the device 330. Therefore, it is possible for inventory items to be picked directly in to the delivery container DT.

It will be appreciated that there are many ways of picking inventory items directly in to the delivery container DT and FIGS. 10 c and 10 d shown two ways in which items may be picked directly in to the device 330 of FIGS. 10a and 10b.

In the embodiment of FIG. 10c, robotic picking means 250 is suspended above the storage system. A number of robotic devices 330 containing bins 10 comprising inventory items 28 required to fulfil customer orders are positioned within reach of the picking means 250. The picking means 250 may efficiently pick from the bins 10 located in the devices 330 directly in to the delivery container DT located in the central robotic device 330.

It will be appreciated that if the robotic picking means 250 has sufficient reach, inventory items 28 may be picked directly from the bins 10 located beneath the grid 22 of the storage system. Furthermore, in this example it will be appreciated that the picking means 250 may be suspended at a fixed point from the ceiling above the storage system. It will be appreciated that multiple picking means 250 may be suspended from the ceiling above the storage system.

Alternatively, a single picking means 250 may be located on a moveable beam moveable in the X-Y direction above the storage system in order that the single picking means 250 may be moved to required points above the storage system under the control of a centralised control utility.

It will further be appreciated that robotic picking means 250 may be positioned around the edges of the storage system to allow for picking at the extremes of the system.

In the embodiment of FIG. 10d a further robotic picking device 550 is shown picking goods directly from one robotic device 330 comprising a bin 10 in to a robotic device 330 comprising a delivery container DT. The robotic picking device 550 is mounted on a form of robotic load handling device 630. It will be appreciated that the device 630 does not have the ability to handle bins 10 or delivery containers DT and is more a means for moving picking means 550 around the grid 22 above the storage system to a position where picking can take place. It will be further appreciated that the robotic picking device 550 mounted on the robotic load handling device 630 may be moved around the grid and be used to pick inventory items from bins 10 in all locations, as long as the inventory items 28 are accessible to the picking means. For example, in one example, a bin 10, may be lifted from one of the stacks 12 in the system and releasably latched such that it is disposed above the level of the grid. A mobile robotic picking device may then pick a number of inventory items 28 as required and deposit them individually or in combination in to a target delivery container DT. The bin 10 may then be returned to an appropriate stack 12. The latching means supporting the bin 10 on the grid 22 may be of any suitable form capable of supporting the bin 10 on the grid 22 and may be remotely operable.

It will be appreciated that the advantage of this aspect of the invention is that the bins 10 and delivery containers DT are lifted from the stacks 12 once and retained in the robotic devices 330. The bins 10 and delivery containers DT do not need to be picked up from one location and temporarily placed at an appropriate point of the system whilst picking occurs. In this embodiment it is possible for the centralised control utility to position the bins 10 and the delivery containers DT within the devices 330 in a relatively uncongested part of the system. In this way the grid 22 may be used to its fullest capacity.

It will be appreciated in the case of all the robotic picking devices described above, the picking means 50, 150, 250, 350, 450, 550 and 650 have been described as picking single inventory items 28 from a bin and placing it in a delivery container DT. However, in a further aspect of the invention the picking means 50, 150, 250, 350, 450, 550 and 650 may be adapted to pick multiple inventory items 28, either multiple inventory items 28 from a single bin 10 or single items 28 from multiple bins 10. The multiple inventory items 28 picked may be for the same destination delivery container DT or may be for multiple delivery containers DT.

In order that the picking means 15 may pick multiple items from a single bin 10, it will be appreciated that the robotic picking devices described above may be provided with storage means within the cavity 40 of the device.

In use, a robotic picking device as described above is moved in to position above a bin 10 containing inventory items 28 to be picked. In the situation where a single customer has ordered a plurality of a single inventory item 28, the picking means 150 picks the first item 28 and places said item 28 in the storage means within the cavity 40. The picking means 150 is then manipulated to pick a further inventory item 28 and places said second inventory item 28 in the storage means within the cavity 40 of the device. This is repeated until all the required inventory items 28 are in the storage means. The robotic picking device then moves in to position above the delivery container DT beneath the grid and the picking means used to move the items 28 from the storage means to the delivery container DT, placing the items as required, assisted by suitable sensor means or camera means as required.

In the case where several inventory items 28', 28" and 28'" of different categories located in a number of bins 10, the robotic picking device is moved in to position above the first bin 10' and the first inventory item 28' is picked by the picking means and placed in the storage means within the cavity 40 of the device. The robotic picking device is then moved to a second bin 10" where the second inventory item 28" is stored. The second item 28" is then picked by the picking means and placed in the storage means in the cavity 40 of the device. Finally the device is moved in to position over the third bin 10'" and the third item 28'" is picked. The robotic picking device is then moved in to position over the target delivery container and the items 28', 28" and 28'" transferred by the picking means 150 from the storage means to the delivery container DT.

It will be appreciated that the multiple inventory items 28 need not be for the same customer order and as the items 28 can be picked from multiple bins, they can be deposited in multiple delivery containers DT.

This may be particularly useful if inventory items 28', 28" and 28'" are located closely together in the storage system.

FIG. 11a shows a further aspect of the invention. As can be seen in FIG. 11a, the storage system or a part thereof comprises robotic picking means 350 located at one edge of the system. The robotic picking means 350 is movably mounted on track means 360. The picking means 350 may be moved along the track under the control of a central utility. The robotic device 350 may be powered directly from a suitable fixed power supply. Advantageously in this aspect of the invention, the robotic picking means 350 need not be battery powered and may be more substantial than the picking means 150 contained in the cavity of a robotic picking device. It will be appreciated that the robotic picking means 350 may be fixedly mounted to suitable mounting means. The mounting means may include be not be limited to structural members of the building or installation containing the storage system or purpose built mounting means such as cross beams or RSJs.

In use, robotic load handling devices 30 position bins 10, containing inventory items 28 to be picked, and delivery containers DT, requiring the inventory items 28 in the bins 10 positioned by the robotic load handling devices 30, adjacent the robotic picking device. Under the control of the centralised control utility, the picking means 350 picks an inventory item from a bin 10 and places it in a target delivery container DT. The picking process continues in this manner until all the delivery containers requiring said inventory items 28 have been serviced. At this point, load handling devices 30 may remove the delivery containers DT that do not require further inventory items and move to dispatch or in to a storage part of the main grid.

It will be appreciated that this method of on grid picking requires substantially less movement of robotic devices around the grid to pick inventory items.

FIG. 12 shows an alternative arrangement of the robotic picking means 350 described above with reference to FIGS. 11a and 11b. In FIG. 12 the robotic picking means 450 is suspended from a gantry crane 480. The robotic picking means 450 is suspended from suitable beams located around the periphery of the grid 22. As shown in FIG. 12a, the robotic picking means 450 can pick from any of the bins 10 or delivery containers located on the top of the stacks 12 beneath the grid.

The picking means 450 operates in a similar fashion to that described with reference to FIG. 11b with the advantage that the whole grid 22 can be accessed.

Should the removal of an inventory item 28 from a delivery container 10 result in the delivery container DT being empty, it may become a delivery container DT for a different customer order or be returned to storage or to goods inbound to have further inventory items 28 located therein.

In this way, congestion at a manual pick station is avoided. In addition, a pick station, whether for manual or robotic picking, represents a significant investment. For items which can effectively be picked using the present invention, the overall investment for a given picking capacity can be significantly reduced. It will be appreciated that certain orders may be completely pickable without accessing the normal pick stations.

It will further be appreciated that using a robotic picking-area that is only, for example, one bin 10 deep as shown in FIG. 5, may allow the overall capacity of a given warehouse to be increased, since otherwise unused space may become productive.

Moreover, the robotic picking portion 100 of the storage and picking system may comprise chilled or ambient sections to enable picked orders to be retained for a period of time before being loaded to delivery vehicles and dispatched. It will be appreciated that grid size and average stay time in the DT dispatch area is driven by the density of the robotic load handling devices 30, 130 on the grid so shorter lead times could be accommodated, especially if low frequency items could also be picked manually at the pick stations.

Furthermore, the above mentioned aspect of the invention may be combined with high speed stationary robotic load handling devices for certain inventory items 28 that are considered to be fast moving, as previously disclosed in UK Patent Application No. GB1502123.1—Ocado Innovation Limited.

Furthermore, it will be appreciated that the picker devices 30, 130, 230, 330 and 430 may further comprise sensor means to ensure the picked inventory item 28 is delivered to the correct delivery container DT and/or the correct part of the delivery container DT. Delivery containers DT may comprise a number of bags and said sensor means may be used to ensure correct positioning of inventory items 28 within bags in the delivery containers DT.

It will be appreciated that whilst the above embodiments are described with reference to the bins 10 being of substantially the same shape and configuration, the system may be adapted to utilise bins and delivery containers of alternative shapes, sizes and configurations. In this situation, robotic load handling devices and robotic picking devices would need to be provided within the system capable of handling differently shaped and sized bins and containers. Furthermore, certain areas of the storage system may be adapted to handle alternative sizes of containers and bins.

It will further be appreciated that the picking means disposed above the grid 22 need not be a robotic device 30 but may comprise an operator having access to the grid 22 to pick inventory items 28 directly from bins 10 to transfer them to delivery containers DT. The operator may travel on a robotic service device.

In a further aspect of the invention, the robotic picking and storage system described above with reference to FIGS. 1 to 4 comprises bins 10 performing different functions. It will be appreciated that the bins 10 described below may be used in association with any of the robotic load handling devices 30 described above.

In the further embodiment of the invention, derivatives 410 of the bins 10 comprise a mechanism for dispensing one or more of a plurality of inventory items 28 from the base of the bin 410. As shown in FIGS. 13 through to 18 a bin 410 may comprise numerous mechanisms for achieving this. Each mechanism is described in detail below. However, it will be appreciated that the object to be achieved in all cases is substantially the same—the ability to deposit an inventory item 28, or similar in to a delivery container DT located beneath a bin 410, thereby avoiding the need to transport bins 10 containing inventory items 28 to pick stations beneath the framework 14 of the storage system.

With reference to FIG. 13, a bin 410 is shown having 8 dispensing devices 56 disposed within a single bin 410. It will be appreciated that the number of dispensing devices may be varied according to the size and shape of the inventory items 28 to be stored in the bins 410.

The dispensing devices 56 disposed within the bin 410 of FIGS. 13a, 13b and 13c comprises a conventional vending machine mechanism whereby a single inventory item 28 may be dispensed from a given dispensing device 56. It will be appreciated that the inventory items 28 stored may comprise a number of different items of a number of different categories in each bin 410. Alternatively every dispensing device within a single bin 410 may comprise the same inventory item 28.

In use, in response to an electrical, mechanical or electromechanical input to the dispensing means, a single or several inventory items 28 may be dispensed from the base of the dispensing means via an opening in the base of the bin 410. The base of the dispensing means must cooperate with the base of the bin 410 to ensure the inventory item to be dispensed is ejected from the base of the bin 410. It will be appreciated that the number of dispensing means disposed within each bin depends on the size of the inventory items 28 to be dispensed. Furthermore, it will be appreciated that any given customer order may require a plurality of the same inventory items 28 therefore the dispensing device must be able to dispense single or multiple inventory items 28 of a given variety.

The opening in the base of the bin 410 may be a flap, two co-operating flaps, a rolling shutter or any other suitable opening or closing means capable of remote or autonomous. It will be appreciated that the load handling device 30 carrying such a dispensing bin 410 may receive a command from the central utility to transport the dispenser-type bin to a given position above a delivery container DT in a robotic picking area. The robotic load handling device 30 may then be provided with means for activating the dispensing device in the bin 410 in order for the inventory items 28 to be deposited in delivery containers DT deposited below the dispenser bin 410. The command received and transmitted via the robotic load handling device may be controlled via mechanical, electrical, electromechanical or wireless means with the appropriate sensors being disposed in the bins 410 or the robotic load handling devices 30 described above. The sensors may be located in the bin gripper assembly 39 described above, however other suitable means may be used.

It will further be appreciated that the command may be given in numerous ways. For example, the command may be "Go to position x there and dispense on arrival", or the command may be issued in two sections, rather first "go to position x" and then "dispense".

Furthermore, as shown in FIGS. 13*a*, 13*b* and 13*c* the bin 410 may comprise a permanent opening 58 in the base 58, the dispensing means 56 acting so as to move and eject the target inventory item 28 out of the permanent opening 58.

It will be appreciated that the inventory items 28 packed in to cassettes in the dispenser bin 410 may be the same or may be different. Furthermore, it will be appreciated that the any of the robotic picking devices described above may pick cassettes 56 from a bin 10 and compile them in to a single bin thereby creating a customised bin 10 that may then be transported by a suitable picking device to multiple delivery containers DT and the required number of items 28 be dispensed. In this way the robotic picking device makes a customised bin 10 such that the bin may be transported around the system in the manner described above to deposit inventory items 28 in delivery containers.

In use, in the storage, picking and dispatch system described above, such a dispensing bin 410 may be used in several circumstances. Firstly, inbound inventory items 28 may be unpacked and loaded in to dispensing bins 410. Once loaded with required inventory items 28, a robotic load handling device of any of the types described above may be used to transport the dispensing bin to the robotic picking portion of the storage system. However, it will be appreciated that the load handling device 30 will require means for activating the dispensing means 56 to deposit the or each inventory item through the opening 58 in the base of the bin 410.

As shown in FIG. 13*d*, once in position above a delivery container DT requiring an inventory item from said dispensing bin 410, the dispensing mechanism is activated by appropriate communication means between the robotic load handling device 30 and the dispensing bin, and a required inventory item 28 is deposited in to the delivery container DT located beneath the grid in the robotic picking portion of the storage system.

Once the inventory items 28 have been deposited in the required delivery containers DT the dispensing bin 410 may be returned by the robotic load handling device 30 to the goods inbound portion of the system to be refilled or it may be returned to the main storage system for storage in a stack 12 until the inventory items 28 are required again.

In this situation, the order in the delivery container DT may be complete in which case the container DT may be transported by robotic load handling devices 30 to a van or a dispatch station for onward delivery. However, if the order has not been fulfilled the delivery container DT may be kept in the robotic picking portion of the storage system awaiting further inventory items 28 to be deposited therein. Moreover, the delivery container DT may require transport to a conventional pick station to have further inventory items 28 added thereto in a manual or robotic manner. Furthermore, if the order is completed but there is a delay before dispatch can occur, the delivery container DT may be transported to the main storage system and stored therein until a delivery time is known.

In a further embodiment of the third aspect of the invention, as shown in FIG. 14*a* bin 510 has one or more opening or hatch 60 in its base to allow items contained in the bin 510 to fall from the bin 510 to a delivery container DT located below in the bin 510. In this manner the bin 510 may be considered a dispenser bin 510 as described above. However, in this form of bin 10, the entire contents of the bin 510 is deposited in the delivery container DT when the bin 510 is in situ over the required delivery container DT Referring to FIGS. 14*a*, 14*b* and 14*c* preferably the whole of the base 75 is comprised of one or more moveable panel 65. When the one or more moveable panel or panels is in its fully open second position shown in FIGS. 14*a*, 14*b* and 14*c* the hatch 60 extends across the whole of the base 75 of the bin 10. As the hatch is the same size as the base of the bin 510 even very large items can be reliably dispensed to the delivery container DT underneath the bin 510.

As shown in FIGS. 14*a*, 14*b* and 14*c* one or more slideable panel moves from a first closed position shown in FIG. 14*a* to a second open position shown in FIG. 14*b*. In the first position the panels 65 abut the sides of the bin 10 as shown in FIG. 14*a* to form a continuous base.

This embodiment has the advantage that there is little risk of items becoming stuck between the panel and the side 70 of bin 510. It has the further advantage that there is little or no risk of the slideable panels being impeded by the contents of bin 510 or the contents of the delivery container DT underneath bin 510.

One form of mechanism for moving the panel 65 from a closed to an open position is shown in FIG. 14*d*. The mechanism comprises a roller type mechanism for rolling the panel 65 from an open position to a closed position as shown in FIG. 14*e*.

As shown in FIG. 14*e*, in use a robotic load handling device 30 carries a dispenser bin 510 in accordance with one form of the invention and is moved in to position above a target delivery container DT. The dispenser bin 510 is activated via the central control utility and/or via the robotic load handling device and the item stored in the bin 510 drops through the opening in the base of the bin 510 in to the delivery container located below.

In another preferred embodiment as shown in FIGS. 15*a* and 15*b*, shown one or more slideable panels is provided. In the first position the panels abut or overlap against one another or the side 70 of the bin 510 as shown in FIGS. 15*a* to 15*c* to form a continuous base and close the hatch 60. In the second position the slideable panel or panels may be independently opened thereby allowing the content of the bin 510 immediately above the panel activated to be deposited in the delivery container DT beneath the robotic load handling device 30 carrying the bin 510.

The bin 510 of FIGS. 15*a* and 15*b* may comprise an inventory item 28 per movable panel as shown. Alternatively there may be a plurality of items per panel, the panel only being opened enough to allow a single item to be dispensed In a further embodiment of dispenser bin 610, for example, as shown in FIGS. 16*a* and 16*b*, the bin 610 comprises a hatch 60 which is releasably opened and closed by one or more moveable panels or flaps 65. The panels may be flexible, elastic, deformable, continuous or discontinuous or of any suitable form for moving from an open to a closed position.

The panels can be moved between a first or closed position shown in second or open position where the hatch 60 is fully or partially open under the control of the controller utility or the load handling device 30.

In a preferred embodiment shown in FIG. 16 the bin 610 has sides 70a, and 70b and a base 75 formed by a pair of pivotable panels or flaps 65a and 65b.

In the first closed position the flaps abut or overlap one another to form a continuous base 65 which retains the contents of bin 610 as shown in FIG. 16.

In the second open position the flaps 65a and 65b pivot and open outwards towards the delivery container DT beneath the bin 610 to allow the contents of the bin 510 to fall into the delivery container DT underneath bin 610.

The two or more pivotable panels 65a and 65b can be moved together or independently by the controller utility in direct communication with the bin 610 or via a communication with the robotic load handling device 30 carrying the bin 610, from the first position to the second open position to dispense the contents of the bin 610 into the delivery container DT underneath bin 610. The panels 65a and 65b can then be returned to the first closed position to ready the bin 610 to receive other inventory items 28.

It will be appreciated that pivotable panels 65a and 65b may be provided which open inwardly.

It will further be appreciated that pivotable panels 65a and 65b may be provided which can open inwardly and outwardly.

In an alternative embodiment, the bin 510 may be divided into two or more compartments A and B each of which is provided with one or more pivotable panels 65 which can be independently moved from a first closed position to a second open position to dispense the contents of one of the compartments to the bin underneath bin 510A.

In an alternative embodiment, several abutting or overlapping panels form the base of the bin 510 in the first closed position. The panels can be rotated by the controller to a second position so that they overlap in the case of the abutting panels or overlap more in the case of the overlapping panels to provide a hatch 60 through which items can be dispensed from bin 510 to the delivery container DT underneath the bin 510. The size of the hatch can be varied by varying the amount of overlap of the panels in the second open position.

In an alternative embodiment the hatch 60 only extends across a part of the base 75. One or more moveable panels 65 are provided which in a first or closed position cover the hatch 60 and retain the contents of bin 510. The one or more panels 65 can be independently moved away from the hatch to a second position where the hatch is partially or fully opened so that items in bin 510A fall through the hatch to the bin underneath bin 510A.

In further embodiments the one or more panels 60 move laterally from the first to the second position. It will be appreciated that alternatively a single panel 60 may be provided which moves bilaterally.

It will be appreciated that when two or more panels 60 are provided they can abut or overlap one another in the first position to close the hatch.

It will be appreciated that when two or more panels 65 are provided each panel can be moved independently of the others.

It will be appreciated that several hatches may be provided in the base each closed by one or more moveable panel.

It will be appreciated that by varying the second position of the one or more panels the hatch can be partially or fully opened to dispense some or all of the contents of bin 510 into the delivery container DT underneath. This may be especially preferred when there is a need to dispense small items and retain larger items. Alternatively this may be especially preferred when dispensing fluids or free flowing items such as by way of example only grain, detergent, sugar, or like powders, packaging materials or beads, novelty items such as sweets, glitter or small toys, or liquids.

It will be appreciated that a flexible, or elastic layer may extend from the hatch to act as a funnel or channel to direct items towards the hatch.

It will be appreciated that in an alternative embodiment the base of the bin comprises an elastic layer having openings or valves through which heavier items can be dispensed. The opening or openings may be sized such that the weight of the item to be dispensed is sufficient to convey the item through the opening 60. Alternatively the opening or openings may be sized and shaped to only dispense items from bin 510 to the delivery container DT under bin 510 when other items in the bin 510 press on the item or items to be dispensed.

It will be appreciated that in an alternative embodiment the base of the bin comprises a net so that small items fall through the bin 510 to the delivery container underneath the bin 510.

It will be appreciated that dispenser bins described in this embodiment may only carry a single item. However, the dispenser bin 510 may carry a number of items each located on a separately openable and closeable portion of the base of the bin, as shown in FIG. 14a.

With reference to FIG. 17, the bin 710 comprising a swingable mechanism movable from a first closed position to a second closed position. It will be appreciated that this mechanism preferably may be used with single items contained within the bin 710.

In use, the mechanism is swung from the closed position where the item 28 is retained within the bin 710 to a second open position where the item 28 may drop from the bin 710 to a delivery container DT (not shown) positioned below.

In use, a robotic load handling or picking device 30 as described in any of the embodiments above transports the dispensing bin 410, 510, 610, 710 to a grid position on the robotic picking grid above a delivery container requiring the inventory item 28 in the dispenser bin. A signal is applied to a releasable opening mechanism in the dispensing bin 410, 510, 610, 710 or to the robotic load handling device carrying the bin 410, 510, 610, 710, the signal acting so as to release the opening mechanism in the dispensing bin, the inventory item or items 28 being deposited in the delivery container DT positioned below the dispensing bin.

In a further aspect of the invention as shown in FIGS. 18a and 18b, the bin 10 comprises a form of hopper for containing 'free flowing' inventory items such as sweets, liquids, flour, nuts and bolts or other such inventory items 28. The bin 810 may comprise separate hopper-type sections containing different categories of inventory item 28 or may comprise a bin 910 having a single hopper type unit containing a single category of inventory item 28.

In use, the bin 810, 910 comprising said hopper-type dispenser bin is transported by a robotic load handling or picking device 30 as described in any of the embodiments above. The device transports the dispensing bin 810, 910 to a grid position on the robotic picking grid above a delivery container DT requiring the inventory item 28 in the dispenser bin 810, 910. A signal is applied to a releasable opening mechanism 61 in the dispensing bin 810, 910 or to the robotic load handling device carrying the bin 810, 910, the signal acting so as to release the or each opening mechanism 61 in the dispensing bin, the inventory item 28 being deposited in the delivery container DT.

The dispenser bin 410, 510, 610, 710, 810 may be provided with verification means to verify that the item or items dispensed are deposited in the correct delivery container DT or in the correct portion of the correct delivery container DT.

It will be appreciated in the case of the dispenser bin 810 that each section requires a releasable opening mechanism 61 such that inventory items 28 may be dispensed, using sensor and camera means as appropriate, in to the correct section of the delivery container DT.

It should be noted that the delivery container DT may be an actual delivery container for onward transmission to the customer or be a bin 10 with "post pick" items destined for delivery to somewhere else, for instance to an alternative fulfillment centre. The term delivery container DT is used to distinguish bins 10 from delivery containers DT. However, it will be appreciated that bins and DTs may be of a similar or substantially the same shape and configuration, the function of the bin defining the definition rather than any change in the actual shape or size of the bin.

It will also be appreciated that the delivery container DT may be contained within a bin 10 to ensure that the robotic load handling devices can handle the movement of all bins whether in the stacks 12 of the main storage system or in a nominal robotic picking area.

It will further be appreciated that whilst many of the above embodiments are described with reference to a remote or separate robotic picking area, it is possible that the main storage system be used as a robotic picking area at the same time as functioning as a conventional picking and storage system.

The invention claimed is:

1. A storage system comprising:
   a first set of parallel rails or tracks and a second set of parallel rails or tracks extending substantially perpendicularly to the first set in a substantially horizontal plane to form a grid pattern comprising a plurality of grid spaces;
   a set of uprights, the uprights supporting the rails or tracks, the uprights and rails or tracks together defining a framework;
   a first container for storing at least one item within the storage system; and
   a delivery container arranged within the framework and configured in the system to be filled with items and removed from the framework for delivery to a customer; wherein the first container includes:
      a configuration for placement beneath the rails or tracks and within the storage system framework, a part of said first container being configured to occupy a space below a grid space;
      means for transferring at least one item, once placed in the first container, from the first container directly to the delivery container, the means for transferring at least one item including a portion of the first container movable from a first closed position to a second open position such the at least one item once placed within the first container is moveable from the first container to the delivery container; and
   at least one load handling device, the load handling device having lifting means for lifting the first container from beneath the grid and transporting it to a position above the delivery container, the load handling device including a sensor for monitoring accuracy of positioning of the at least one inventory item in the second container on its deposition from the first container.

2. The storage system according to claim 1, the portion of the first container comprising:
   a base portion of the first container.

3. The storage system according to claim 2, the base portion of the first container comprising:
   at least two shutters, configured to roll from the first closed position to the second open position, each shutter being independently operable with respect to another shutter.

4. The storage system according to claim 2, the base portion of the first container comprising:
   at least one panel, each at least one panel being pivotally movable from the first closed position to the second open position.

5. The storage system according to claim 2, the base portion of the first container comprising:
   an arcuate panel movable from the first closed position to the second open position.

6. The storage system according to claim 2, the first container comprising:
   at least one hopper for storing free flowing items.

7. The storage system according to claim 6, the first container comprising:
   a rotating panel movable from the first closed position to the second open position beneath each at least one hopper.

8. The storage system according to claim 1 in which the portion of the first container is configured to move from the first closed position to the second open position on command from a centralised control utility.

9. The storage system according to claim 1 in which the first container comprises:
   a sensor to verify the portion has moved from the closed position to the open position and to verify when the at least one item has been deposited correctly from the first container to the delivery container.

10. The storage system according to claim 1, the first container comprising:
    dispensing means for dispensing at least one item from said dispensing means through an open portion of the first container.

11. The storage system according to claim 10, the dispensing means comprising:
    at least one cartridge, each at least one cartridge having a plurality of items for dispensing from the first container.

12. The storage system according to claim 10, comprising:
    a sensor to verify the portion of the first container has moved from the first closed position to the second open position and to verify when the at least one item has been deposited correctly from the first container to the delivery container.

13. The storage system according to claim 10 in which the portion of the first container is configured to move from the first closed position to the second open position on command from a centralised control utility.

14. The storage system according to claim 1, wherein load handling device includes:
    means for communicating a signal to the first container to activate the portion of the first container to move from the first closed position to the second open position.

15. The storage system according to claim 1, the load handling device being configured to be movable under the control of a centralised control utility.

16. A method of dispensing items from a container, the container forming part of a storage system, the storage system having a series of containers located in stacks within a framework beneath a grid system, the container having a movable base portion, the method comprising:
   storing at least one item within the container;
   positioning the container above a delivery container, and moving the base portion from a first closed position to a second open position, the delivery container arranged in the framework and configured in the system to be filled with items and removed from the framework for delivery to a customer; and
   monitoring the at least one item as it is deposited in the delivery container to ensure it is positioned in the correct location.

17. A method according to claim 16, comprising:
   moving the base portion from the open position to the closed position and moving the at least one item to a stack in the storage system.

* * * * *